US012492864B1

(12) United States Patent
Ebert

(10) Patent No.: US 12,492,864 B1
(45) Date of Patent: Dec. 9, 2025

(54) APPARATUS AND PROCESS FOR LIQUEFYING GASES

(71) Applicant: Terrence J. Ebert, Freemansburg, PA (US)

(72) Inventor: Terrence J. Ebert, Freemansburg, PA (US)

(*) Notice: Subject to any disclaimer, the term of this patent is extended or adjusted under 35 U.S.C. 154(b) by 664 days.

(21) Appl. No.: 17/558,524

(22) Filed: Dec. 21, 2021

Related U.S. Application Data

(63) Continuation-in-part of application No. 17/107,850, filed on Nov. 30, 2020, now Pat. No. 11,204,196.
(Continued)

(51) Int. Cl.
F25J 3/04 (2006.01)
F25J 1/00 (2006.01)
F25J 1/02 (2006.01)

(52) U.S. Cl.
CPC ......... *F25J 3/04357* (2013.01); *F25J 1/0015* (2013.01); *F25J 1/0017* (2013.01); *F25J 1/0037* (2013.01); *F25J 1/005* (2013.01); *F25J 1/0052* (2013.01); *F25J 1/0072* (2013.01); *F25J 1/0204* (2013.01); *F25J 1/0234* (2013.01); *F25J 1/0271* (2013.01); *F25J 3/04224* (2013.01); *F25J 3/04315* (2013.01); *F25J 3/04321* (2013.01); *F25J 3/04393* (2013.01); *F25J 3/04412* (2013.01); *F25J 3/04769* (2013.01); *F25J 3/04781* (2013.01); *F25J 3/0489* (2013.01); *F25J 3/04945* (2013.01); *F25J 1/0202* (2013.01); *F25J 3/04084* (2013.01); *F25J 3/04678* (2013.01); *F25J 3/04872* (2013.01); *F25J 2205/84* (2013.01); *F25J 2235/02* (2013.01); *F25J 2235/42* (2013.01); *F25J 2235/50* (2013.01); *F25J 2240/04* (2013.01);
(Continued)

(58) Field of Classification Search
CPC ........ F25J 1/0015; F25J 1/0017; F25J 1/0035; F25J 1/1004; F25J 1/0045; F25J 1/0072; F25J 1/0202; F25J 1/0204; F25J 1/0234; F25J 1/0274; F25J 3/04357; F25J 3/04393; F25J 2240/04
See application file for complete search history.

(56) References Cited

U.S. PATENT DOCUMENTS

2018/0335256 A1* 11/2018 Ebert ..................... F25J 3/0486

* cited by examiner

*Primary Examiner* — John F Pettitt, III
(74) *Attorney, Agent, or Firm* — Wilkinson Law Office; Clinton H. Wilkinson

(57) ABSTRACT

A liquefier device which may be a retrofit to an air separation plant or utilized as part of a new design. The flow needed for the liquefier comes from an air separation plant running in a maxim oxygen state, in a stable mode. The three gas flows are low pressure oxygen, low pressure nitrogen, and higher pressure nitrogen. All of the flows are found on the side of the main heat exchanger with a temperature of about 37 degrees Fahrenheit. All of the gases put into the liquefier come out as a subcooled liquid, for storage or return to the air separation plant. This new liquefier does not include a front end electrical compressor, and will take a self-produced liquid nitrogen, pump it up to a runnable 420 PSIG pressure, and with the use of turbines, condensers, flash pots, and multi pass heat exchangers. The liquefier will make liquid from a planned amount of any pure gas oxygen or nitrogen an air separation plant can produce.

13 Claims, 10 Drawing Sheets

Related U.S. Application Data which is a continuation of application No. 15/981,819, filed on May 16, 2018, now Pat. No. 10,852,061.

(60) Provisional application No. 62/506,932, filed on May 16, 2017.

(52) U.S. Cl.
CPC ........ *F25J 2250/42* (2013.01); *F25J 2270/06* (2013.01); *F25J 2270/16* (2013.01); *F25J 2290/62* (2013.01)

Air Separation Unit

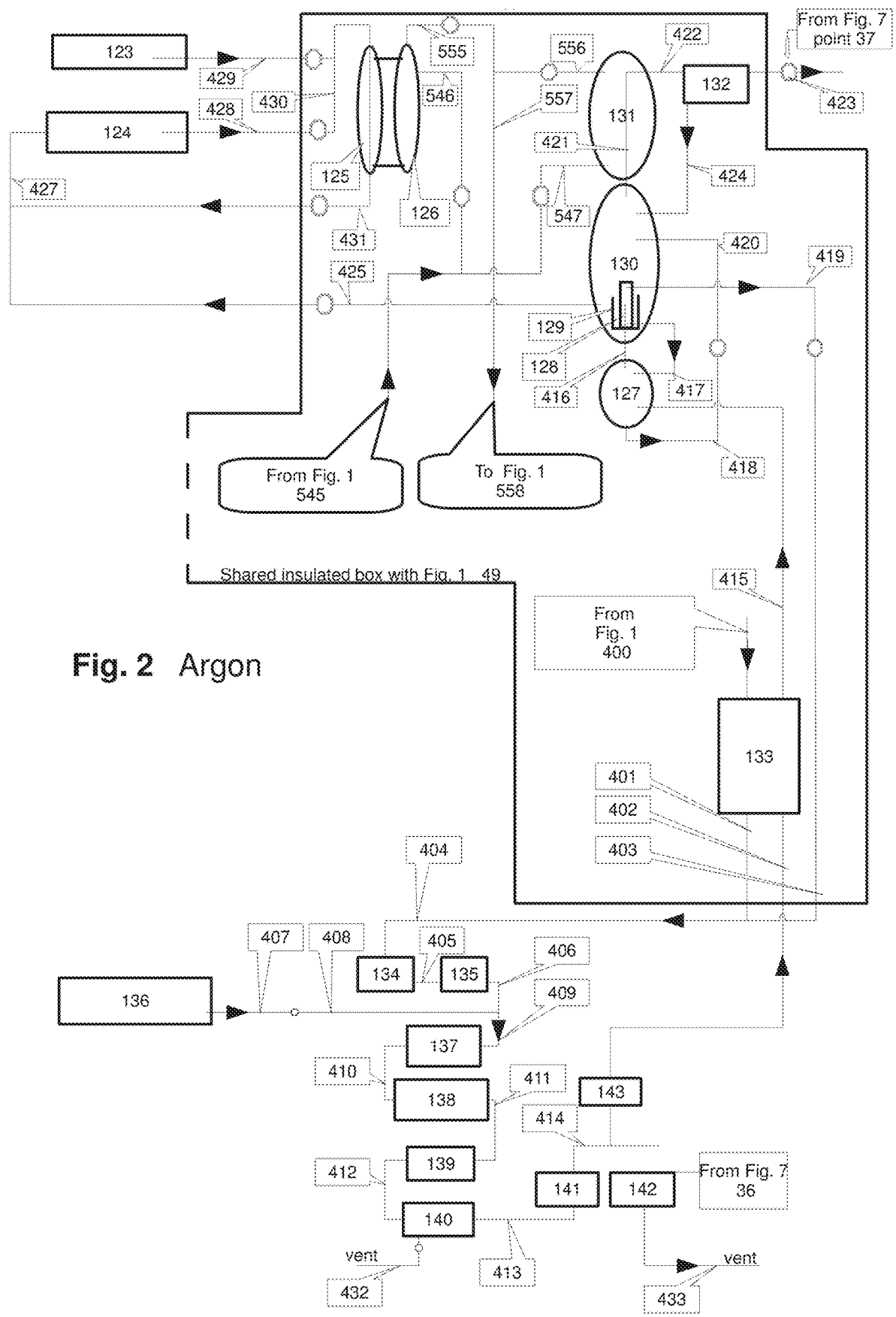
Fig. 2 Argon

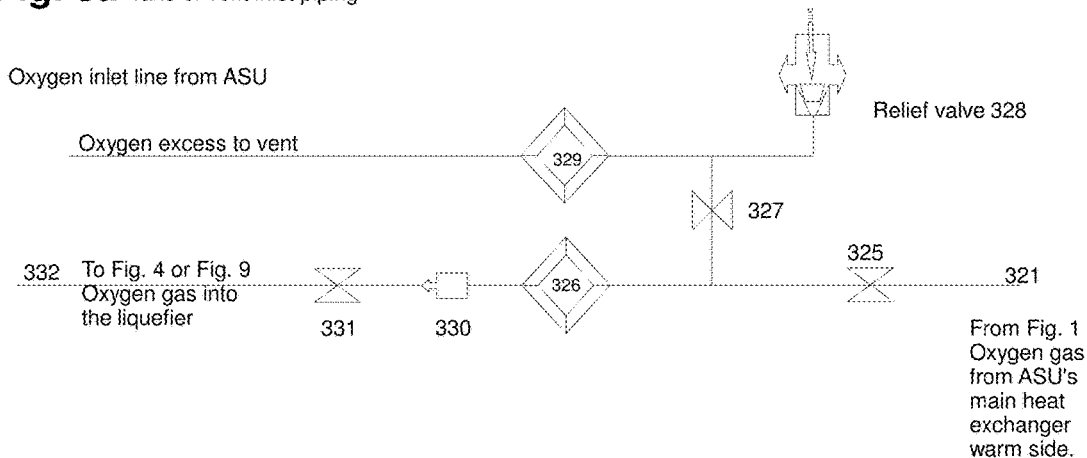
Fig. 3a Take or vent inlet piping
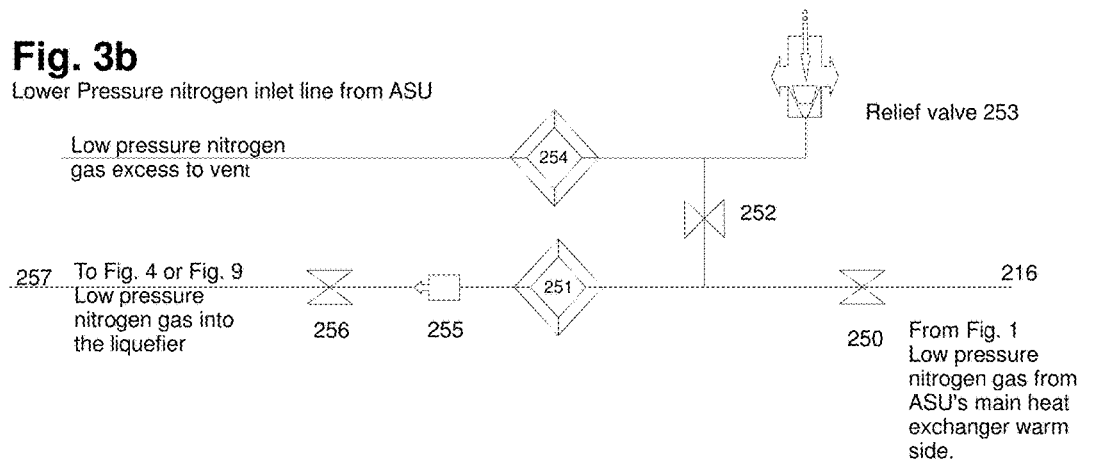
Fig. 3b
Lower Pressure nitrogen inlet line from ASU
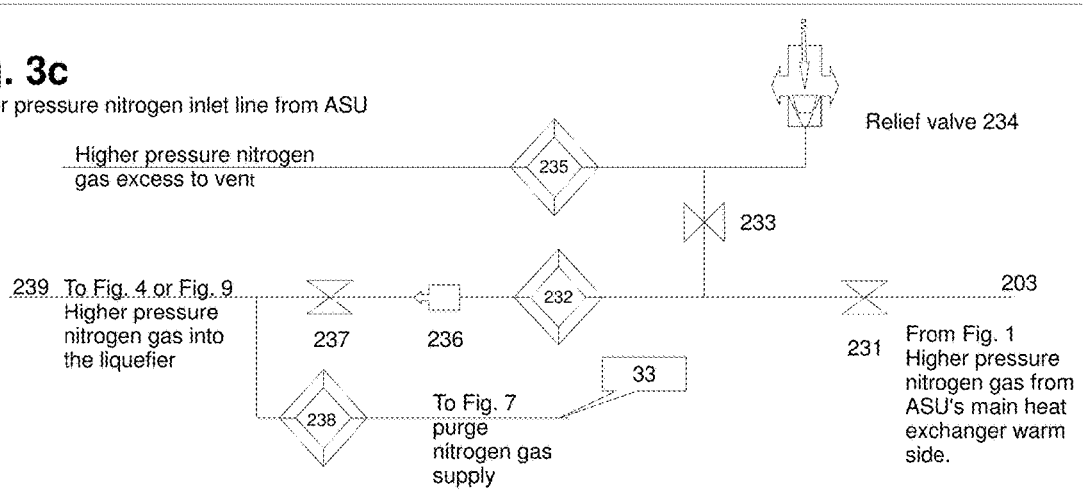
Fig. 3c
Higher pressure nitrogen inlet line from ASU

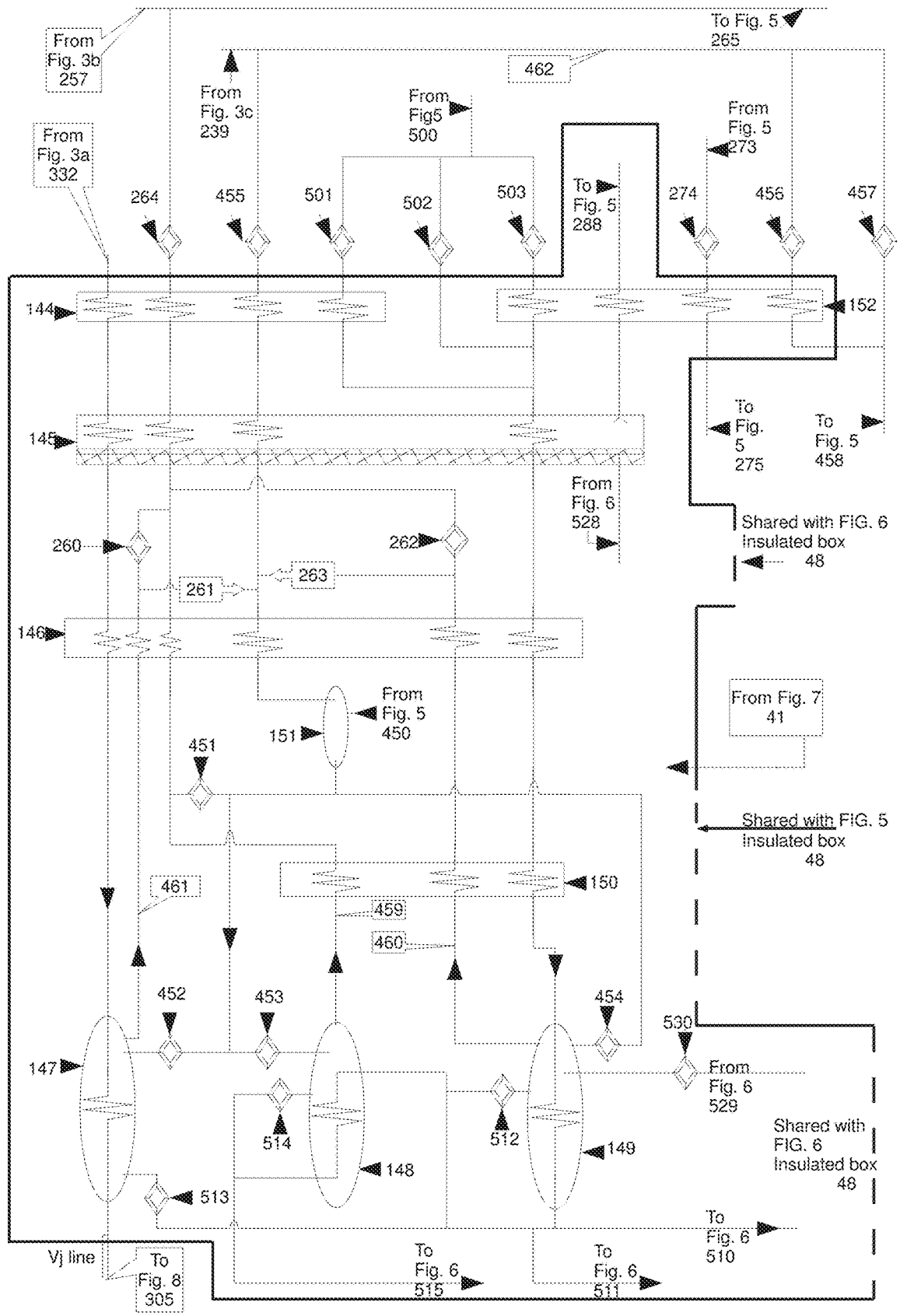
Fig. 4 THE LIQUEFIER HEAT EXCHANGERS.

Fig. 5 Turbine Package
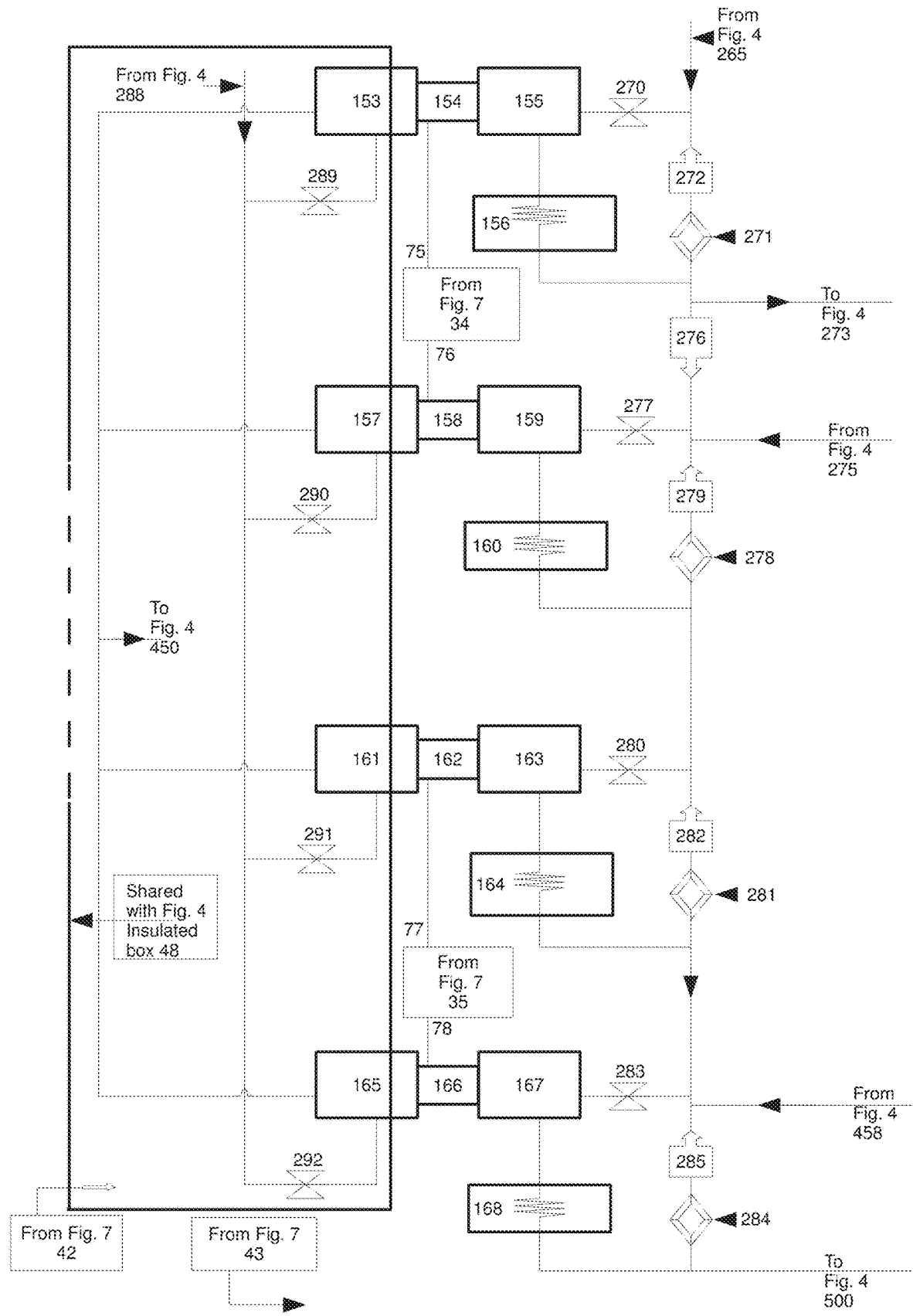

Fig. 6 Nitrogen pump systems
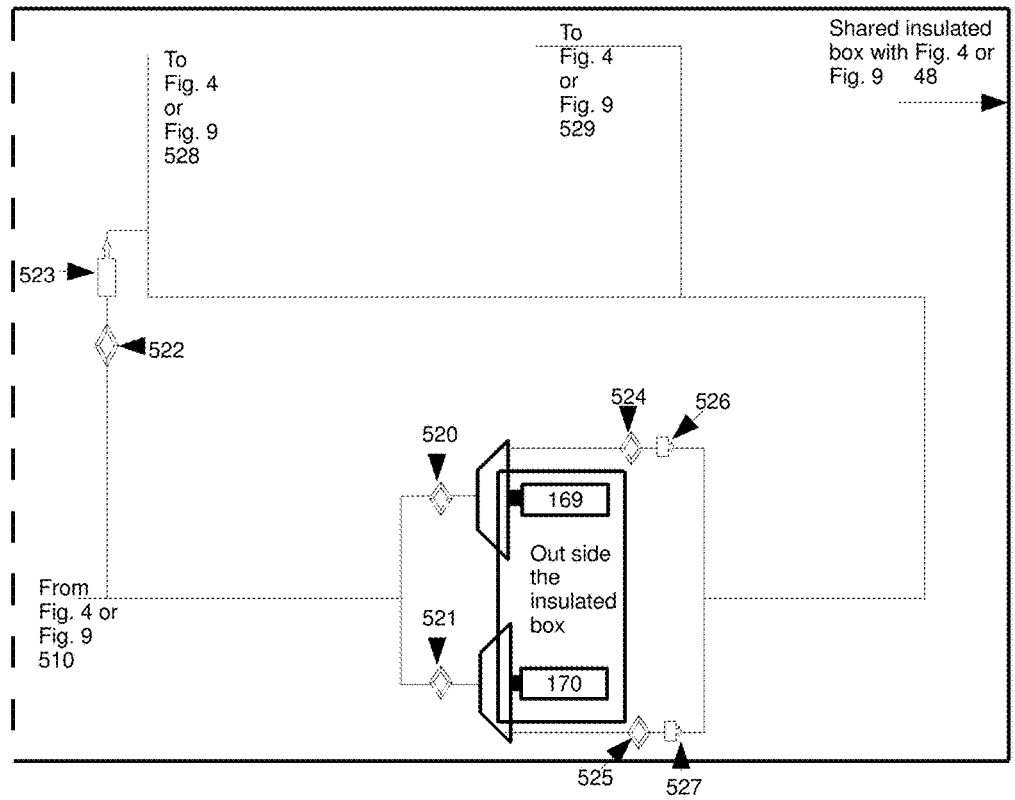
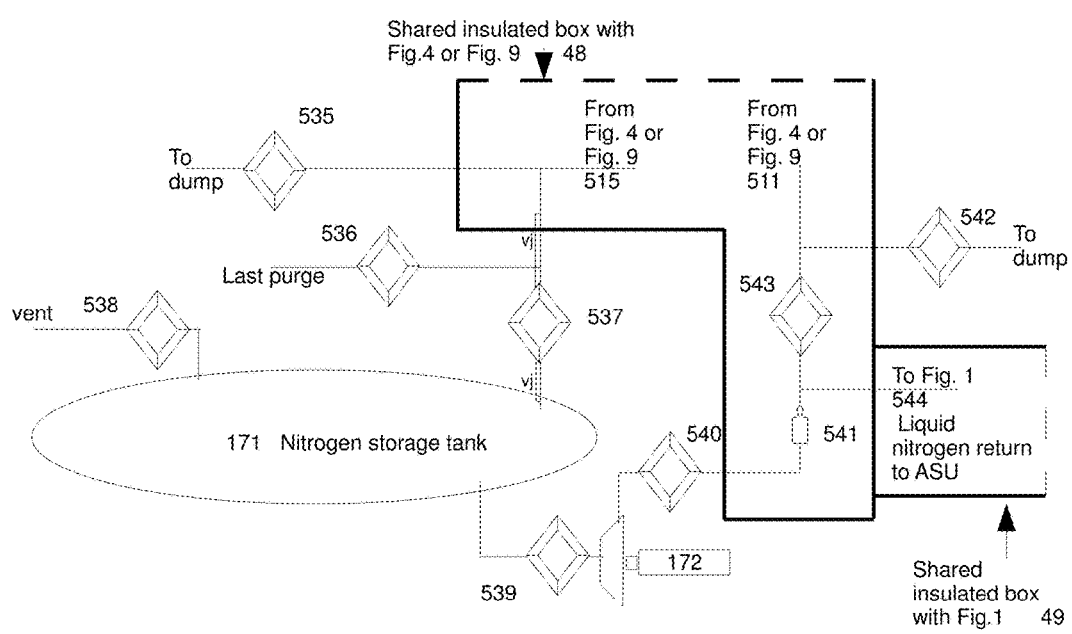

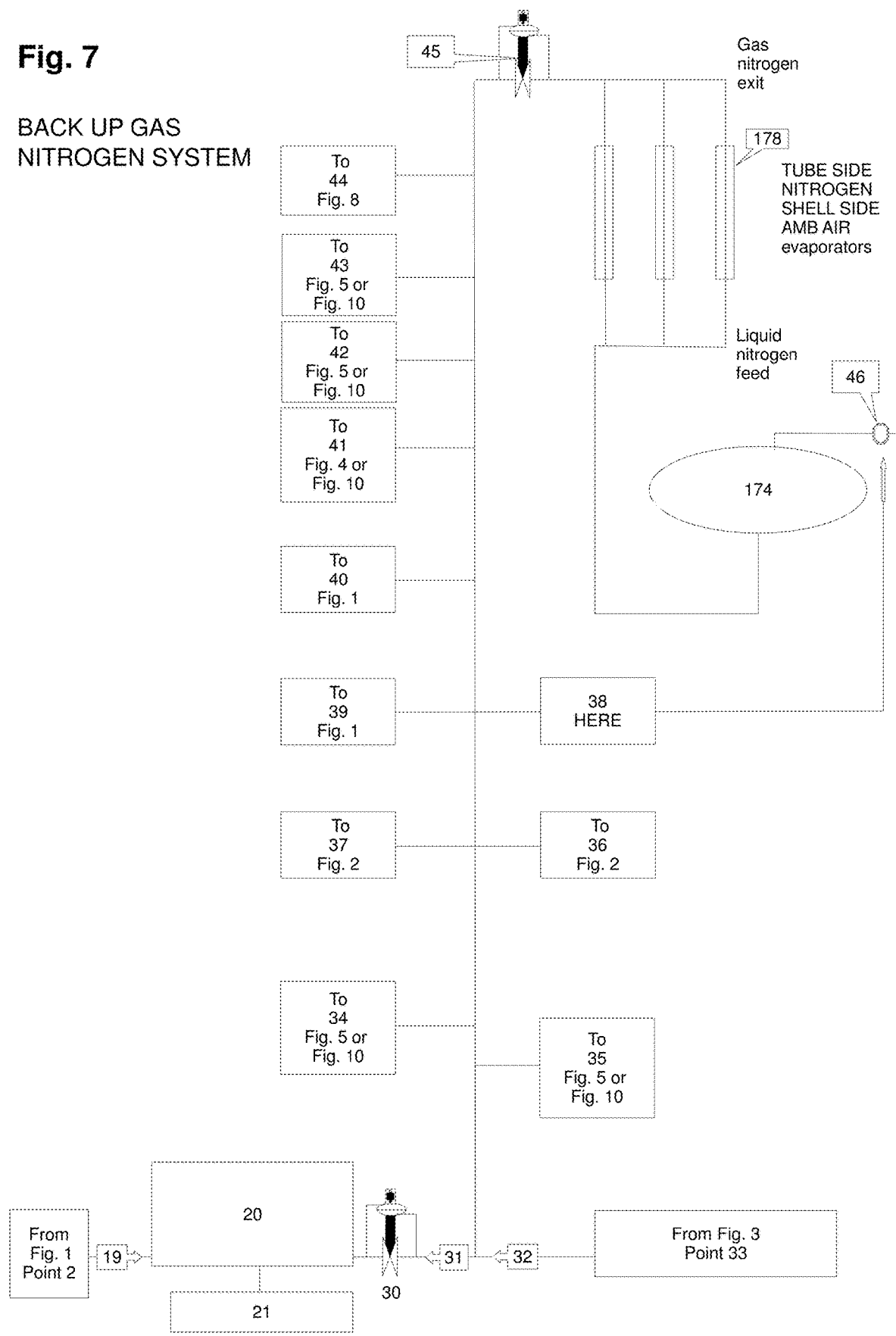

Liquid Oxygen Filters

Fig. 9 THE LIQUEFIER HEAT EXCHANGERS.

APPARATUS AND PROCESS FOR LIQUEFYING GASES

CROSS REFERENCE TO RELATED APPLICATIONS

This application is a continuation-in-part of U.S. patent application Ser. No. 17/107,850, now U.S. Pat. No. 11,204, 196, issued Dec. 21, 2021, which is a continuation of U.S. patent application Ser. No. 15/981,819, now U.S. Pat. No. 10,852,061, issued May 16, 2018, which claims priority and the benefit of U.S. provisional application Ser. No. 62/506, 932, filed May 16, 2017, each hereby incorporated by reference herein in its entirety.

FIELD OF THE INVENTION

The present invention relates to liquefying gases, and more particularly to an apparatus and process for liquefying gases such as nitrogen and oxygen using an air separation plant for the source of the nitrogen and oxygen, and having a top running pressure of about 420 PSIG without requiring electrical compressors to build this pressure. This is made to reduce the power bill.

BACKGROUND OF THE INVENTION

Systems and methods for liquefying gases such as nitrogen and oxygen are well-known. The main process of producing large amounts of liquid nitrogen, oxygen, and argon is with an air separation plant. An air separation plant takes in atmospheric air and through a process of fractional distillation at cryogenic temperatures the component gases, or fractions, can be separated by their boiling points. There are other processes to separate air into its different gases, such as pressure swing absorption, vacuum pressure swing absorption, and others, but these are not making a transportable liquid. Today, the production of a transportable liquid gas in large quantities requires a large number of compressors and expanders with all of the associated equipment such as cooling towers, that all require large amounts of electrical power to run at a high cost.

The process of making liquid gas today is to take gaseous pure nitrogen from two exiting streams of the main heat exchanger's warm side, one stream being the larger flow which is the low pressure nitrogen stream, and the other nitrogen stream having about half the flow but being higher in pressure. The larger flow, lower pressure 2 PSIG+/−1.5 PSIG nitrogen gas, along with the flash pot return flow from the liquefier section, this multi low pressure flow comes from the exit of two heat exchanger's warm sides. This low pressure flow is not all used, and some is vented back to the atmosphere, while the remaining flow is sent to a low pressure nitrogen compressor, where the exit of the compressor is equal in pressure to the higher pressure multi feeds. The higher pressure flow is made of the exit of the main heat exchanger along with the exit of the low pressure nitrogen compressor and the gas off of the liquefier heat exchanger turbine return's warm side. All of the gas is sent to the recycle compressor, and then all of the gas is split to two turbine boosters. After each stage of compression, the heat of compression is removed. This flow will be cooled down in four steps. The first step is the split off of gas to the warm turbine expander, and the second step is the split off of gas to the cold turbine. The remaining flow exits the liquefier heat exchanger where the gas is called a Soto liquid. The third step is to reduce the flow in pressure through a needle valve causing a Joule Thompson effect. The exit of the needle valve provides a two-phase liquid. The fourth step is to cool the liquid and gas down to all liquid, which is done in the flash pot. That is all the refrigeration needed.

Existing air separation plants designed to make liquids for sale in the industrial gas market normally use a liquefier. Current liquefiers make only a small amount of liquid per recycle pass (about 15.2% of the recycle compressor flow). Once the liquid is made, it is flash potted to become subcooled, and a small amount of liquid is returned to the air separation plant for refrigeration, while the larger part of this liquid is sent to a storage tank. No liquid nitrogen is returned to the liquefier. There remains a need for an improved liquefier device.

BRIEF SUMMARY OF THE INVENTION

The present invention is directed to a system, apparatus and process for liquefying gases such as nitrogen and oxygen. The presented system is an open loop refrigeration system which uses far less electrical power than existing liquefaction systems, and can be gradually implemented to replace existing systems, as existing power contracts which typically have a term such as five years expire.

In an embodiment, the liquefier device is one part of an air separation plant, and in another embodiment is a retrofit to an existing plant. The same process can take almost any gas to a liquid. For purposes of illustration, there is shown diagrammatically in FIG. 1 an air separation plant having an air flow coming in of 780,000 SCFH at the inlet meter point 111. The nitrogen, points 203 and 216 in FIG. 1, and oxygen, point 321 in FIG. 1, utilized by the liquefier device of the invention is produced by high pressure column 114 and low pressure column 116 (there are some plants that have three main columns) of the air separation plant. These nitrogen and oxygen flows will exit from a stable running air separation plant's main heat exchanger 113 warm side as pure oxygen gas at 321, and the two streams of nitrogen gas at 203 and 216 in FIG. 1 to be liquefied. In the illustrated embodiment, the liquefier device will be part of a retrofit to an existing air separation plant. All air separation plants can use this liquefier. In FIG. 1, the oxygen at point 321 exits the main heat exchanger 113 warm side with a temperature of 37 degrees Fahrenheit at a pressure of 19.9 PSIA and a flow of 161,521 SCFH. The nitrogen stream exits the main heat exchanger 113 to point 216 at 14.94 PSIA with a flow of 371,185 SCFH holding 37.29 degrees Fahrenheit, and the nitrogen stream exits heat exchanger 113 to point 203 at a pressure of 67 PSIG with a flow of 211,000 SCFH holding 37 degrees Fahrenheit.

The oxygen stream 321 and the nitrogen streams 203 and 216 are fed to the liquefier device, which is an open loop refrigeration unit that takes in the separate streams as a pure gas and which streams will exit the liquefier device as a saleable liquid nitrogen at point 537 (see FIG. 6) and liquid oxygen at point 381 (see FIG. 8). The liquefier device of the present invention has significantly reduced power requirements as compared to conventional liquefiers and therefore can produce saleable liquids less expensively.

The present system takes advantage of many properties of liquid nitrogen. One of these properties is that liquid nitrogen is mostly a non-compressible fluid that can be pumped up in pressure which occurs in the liquefier device at point 528 (FIG. 6), which will take less force than compressing a compressible gas to achieve runnable pressures. The liquid nitrogen streams can be brought up in pressure by a pump (either liquid nitrogen pump 169 or 170 in FIG. 6), which pump in the embodiment shown is using less than 100 horsepower. Then, the liquid is brought to a heat exchanger (boiler 145 in FIG. 4) where the pumped liquid at point 528 in FIG. 4 is boiled to a vapor point. The pressure vapor point of the vapor is held back by the four variable guide vanes 154, 158, 162, and 166 in the turbines, all of which are shown in FIG. 5. The vapor produced can then be used to run the four turbine expanders 153, 157, 161, and 165, also shown FIG. 5. The exit of the turbine expanders at point 450 in FIG. 5 yields a lower pressure gas, with a temperature almost at its boiling point, which is directed into a phase separator 151 and then to add refrigeration to the condenser 146 in FIG. 4, which makes more liquid. The turbine expanders' exiting gas will remove the latent heat of vaporization from the higher pressure nitrogen stream at point 500 to the point 149, and the lower pressure oxygen stream at point 332 to the point 305 all in FIG. 4.

Some conventional air separation plants might have an oxygen and/or nitrogen pipeline which will take the gas described here to another compressor for the pipeline's use. The remaining gas can be used along with any gas the pipeline compressor would vent from time to time. Although not illustrated, it will be understood that these types of changes are able to be performed with a minimum number of modifications or changes to the air separation plant and the liquefier device of the present invention.

In another embodiment of the liquefier device shown in FIGS. 9 and 10, the overall flow to the turbine boosters is reduced, which in turn will further reduce the cost of running the turbine expanders and boosters. As another benefit, a smaller turbine and booster can be used. A flow of high-pressure column nitrogen gas from the air separation unit is combined with an equal pressure flow exiting the third turbine booster 163 connected in series. The combined flow may be directed through an auto pressure control valve 455 and passed sequentially through the heat exchangers from the warm side. This will cool the combined flow, with a phase change in the condenser 1400, which flow is directed into the nitrogen production flash pot 148. The flow will then join a flow in another line coming off the auto control valve 1015 in a single tube bank such that both flows will exit the production flash pot 148 as a subcooled liquid nitrogen. This subcooled liquid nitrogen will then combine with another flow of subcooled liquid nitrogen from a load control nitrogen flash pot 1018 tube side exit, which liquid nitrogen is then directed to a nitrogen low pressure storage tank 171. In this embodiment, there is no need to boost the pressure of the flow of the high-pressure column nitrogen gas (FIG. 2c, 239) from the air separation unit higher, as it can be liquified at exiting pressures. Also, the exit pressure of the nitrogen gas flow out of the third booster 163 is the same as the high-pressure column nitrogen gas inlet flow from the air separation unit. This is another way to unload the last turbine booster 167 connected in series, which will also unload the turbine expander side. At times, the daily ambient temperature will vary higher and lower, which will lead to loading or unloading the last turbine 167. The last turbine 167 will be designed to normally run at about 85% full load.

Additional areas of applicability for the present invention will become apparent from the detailed description provide hereinafter. It should be understood that the detailed description and specific examples of this preferred embodiment of the invention are intended for purposes of illustration only, that the temperatures, pressures, and purities shown here are close to actual readings but may not be exact, and are not intended to limit the scope of the invention. Other embodiments could be, for example, for the production of liquefied natural gas.

BRIEF DESCRIPTION OF THE DRAWINGS

The present invention will become more fully understood from the detailed description and the accompanying drawings, wherein:

FIG. 2 is a schematic diagram of the general operation of the argon liquefaction system in accordance with the present invention.

FIGS. 3a-3c are schematic diagrams of the oxygen and low and high pressure inlet piping for the liquefier device of the present invention.

FIG. 4 is a schematic diagram of the heat exchangers of the liquefier device of the present invention.

FIG. 5 is a schematic diagram of the turbine and booster system of the liquefier device of the present invention.

FIG. 6 is a schematic diagram of the liquid nitrogen pump system of the liquefier device of the present invention.

FIG. 7 is a schematic diagram of the backup gas nitrogen system of the liquefier device of the present invention.

DETAILED DESCRIPTION OF THE INVENTION

Figure 1:
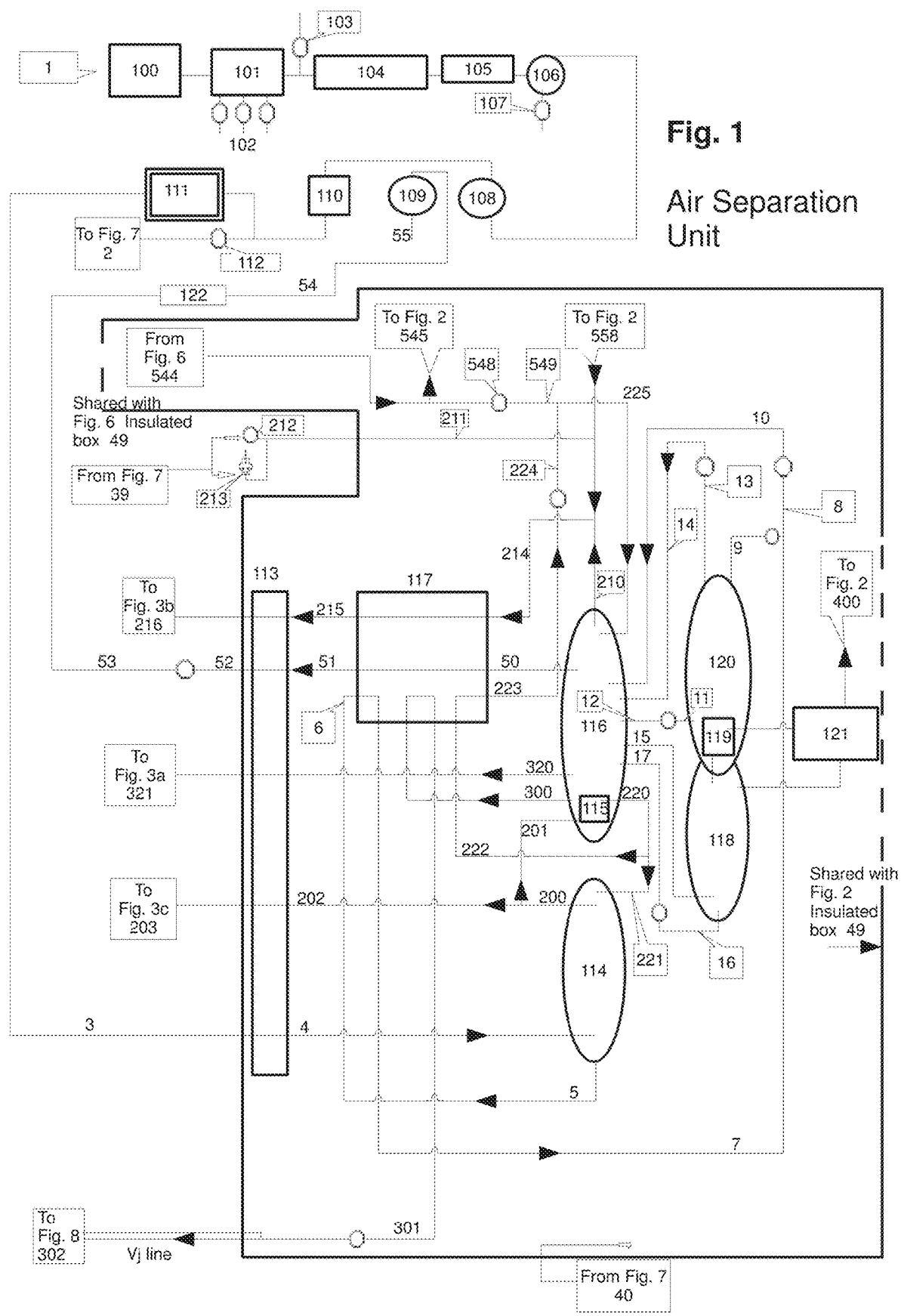
FIG. 1 is a schematic diagram of a main plant air separation unit configured for operation with the liquefier device of the present invention.

The following detailed description is of the best mode or modes of the invention presently contemplated. Such description is not intended to be understood in a limiting sense, but to be a non-limiting example of the invention presented solely for illustration thereof, and by reference to which in connection with the following description and the accompanying drawings one skilled in the art may be advised of the advantages and construction of the invention. Wherever possible, like numerals will be used throughout the drawings to refer to like and corresponding parts (elements) of the various drawings.

The following detailed description will describe the liquefier device of the present invention with reference to an air separation plant site having an inlet gas air flow of 780,000 standard cubic foot per hour at the inlet meter box, and will make over 650 tons a day of saleable liquids, running with the liquefier device.

THE BASE LINE. The inventor will first explain one way an air separation plant making over 650 ton a day of liquid product could run. The following explanation is based on an oxygen content of 4 ppm and zero argon on all pure nitrogen streams, and on a standard cubic foot of gas at one atmosphere and at 70 degrees Fahrenheit. The plant site location is around sea level, with an 80 degree Fahrenheit dry bulb temperature and a 70 degree Fahrenheit wet bulb temperature. In addition, the Table included herein provides temperature, pressure, and flow readings for each reference numeral point or step within the air separation plant and liquefier device assembly as described herein with reference to FIGS. 1 through 8, as well as the Figure location.

THE AIR SEPARATION PROCESS. Referring now in particular to FIG. 1, the air around us is the air 1 used by the air separation plant to make saleable liquids, and initially is to be filtered at filtering system 100. Normally there is a four-stage compressor 101 used to bring up the air to a runnable pressure, and three intercoolers that will remove condensed water at 102. After the fourth compression stage there is a possible vent valve 103 which is normally closed. The compressed air is now cooled with a fan cooled aftercooler 104, then cooled again with refrigeration unit 105. Water is condensed during compression and is sent to the water separation unit 106 where the water is removed at 107. The air is still holding a lot of moisture and must be dried down to −110 degrees Fahrenheit due point, which is achieved by a molecular sieve bed 108. The drying action will break up a small amount of the sieve material into a fine dust that is now removed by the dust filter 110. The air is now ready to use.

There is a line to the instrument air supply header controlled by an on/off valve 112 normally open to send a supply of filtered air to the backup gas nitrogen system (see FIG. 7) at point 2. All the rest of the air is metered at 111 and sent through line 3 entering the insulated cold box 49 to the main heat exchanger 113. The air exiting the main heat exchanger 113 in line 4 is sent to the third tray of the high pressure column 114. Condensed liquid will fall to the bottom of the high pressure column 114 and will be removed in line 5. This liquid at point 6 must be cooled by a subcooler 117 prior to being elevated in line 7 to point (8) and split into either line 9 to the top of crude argon condenser 120 or into line 10 to the 44th tray of the low pressure column 116. Referring again to the high pressure column 114, the rest of the gas that entered into the column 114 moves up the column through 38 trays and is removed at the top of the column 114 in line 200 as pure nitrogen gas. The nitrogen gas in line 200 splits off to line 201 which leads into the tube side of the reboiler 115 inside the low pressure column 116 bottom liquid. The reboiler 115 will condense the gas nitrogen to a liquid nitrogen. This liquid nitrogen flow exiting the reboiler in line 220 will also be split, with most of the liquid nitrogen to be returned to the high pressure column 221, and the rest will be directed in line 222 to the subcooler 117.

In addition to splitting off to line 201, there is a stream of pure nitrogen gas off the high pressure column 114 in line 200 that will be removed in line 202 to the main heat exchanger 113, where the gas nitrogen stream is warmed and exits the main heat exchanger 113 at point 203. The gas is then directed to the high pressure nitrogen inlet line to the liquefier, shown in FIG. 3c. Referring again to FIG. 1, most of the liquid nitrogen flow in line 220 exiting the reboiler 115 is directed in line 221 to the high pressure column 114, but the remainder is directed in line 222 to the subcooler 117. The subcooler 117 will remove more heat from the liquid flow so that upon exiting the subcooler 117 in line 223, the flow can be used in the low pressure column 116 without a major flash off. The liquid is elevated to the top of the low pressure column 116 to a control valve in line 224 that will meter and depressurize the flow. The amount of liquid nitrogen needed to make up the heat loss of the main operation is added at point 549 from point 544 (FIG. 6), which is the flow from the new liquefier. Prior to reaching point 549, the flow of liquid nitrogen from point 544 is split, such that one flow is directed to the pure argon system (FIG. 2 point 545) and another flow is directed to a control valve 548 that will meter and depressurize the flow at point 549, which as indicated above is joined by the flow in line 224 resulting in a joined flow in line 225.

The joined flow 225 will enter the low pressure column 116 at tray 65. The gas at the top of the low pressure column 116 exiting in line 210 is mostly nitrogen. The liquid nitrogen from the liquefier device in line 544 that is directed to the pure argon system (FIG. 2, point 545) will return as a low pressure nitrogen gas (FIG. 2 point 558) and is joined with the low pressure 210 nitrogen gas exiting the low pressure columns 116 in line 210, and the joined flow in line 214 is directed to the subcooler 117. The exit of the gas nitrogen from the subcooler 117 in line 215 will now enter the main heat exchanger 113, and the low pressure nitrogen gas then exits the main heat exchanger 113 to the low pressure nitrogen inlet line to the liquefier device of the present invention, shown at point 216 in FIG. 3b.

Referring again to the low pressure column 116 in FIG. 1, going down the column to tray 55, this is the point where waste nitrogen and a large amount of carbon monoxide will exit the process. The waste nitrogen stream 50 exits the low pressure column 116 to the subcooler 117. At the exit of the subcooler (117) in line 51 the waste nitrogen stream enters the main heat exchanger 113, and then exits the main heat exchanger 113 in line 52 as a warmed stream to a control valve where the flow is metered. After the control valve the warmed waste nitrogen stream in line 53 is then used to reactivate the molecular sieve bed 109, which is offline. The waste nitrogen stream 53 is therefore sent to the tube side of a gas fired heater 122 and then will exit in line 54 to the top of the offline molecular sieve bed 109. The bed is first heated, then cooled by the waste nitrogen, and the gas will exit to atmosphere at line 55. Referring still again to the low pressure column 116, going down the column to tray 44, this is the location where the liquid in line 10 from the bottom of the high pressure column 114 will enter. The liquid in line 9 from the bottom of the high pressure column 114 enters the crude argon condenser 120, where it is used to condense the crude argon in the tube side of the reboiler 119. A small amount of the liquid from the bottom of the high pressure column feed in line 9 will be removed in line 11, where it is metered and then sent in line 12 to the low pressure column 116 tray 42. The rest of the liquid from line 9 exiting the bottom of the high pressure column 114 is vaporized during the condensing of the crude argon in the reboiler 119. The gas formed from such vaporization exits the high pressure column 114 in line 13 and is metered by a control valve and afterwards is brought line 14 to the 43rd tray of the low pressure column 116. Going down the low pressure column 116 to tray 24, this is the location where the amount of argon gas is the highest in the low pressure column. This gas is fed line 15 to the crude argon column 118. The liquid at the bottom of the crude argon column 118 exits in line 16 to a metered control valve. After the control valve the liquid in line 17 is sent back to the 24th tray of the low pressure column.

Staying with the crude argon column 118, the gas in line 15 from the low pressure column 116 enters the crude argon column and rises to the reboiler 119 through 38 trays. The gas will turn into liquid and gas in the reboiler 119 tube side. The liquid and gas will exit to the phase separator 121, and the gas off of the phase separator 121 is directed to the argon liquefaction system (FIG. 2, point 400). The liquid from the phase separator 121 is directed to the crude argon column 118, tray 38. Back to the low pressure column 116, going down the column to just below the tray number one, the gas found here is called "pure oxygen." The gas oxygen will be removed from the low pressure column 116 in line 320 to the main heat exchanger 113 where the gas is warmed. After the heat exchanger, the warmed gas is directed to the oxygen inlet line to the liquefier device (see FIG. 3a, point 321). Back to the low pressure column 116, the bottom liquid is "pure liquid oxygen." The reboiler 115 is changing the liquid oxygen into gaseous oxygen that drives the low pressure column 16. Most of the gas will go up the column, but the process of removing a large amount of gas oxygen will cause a lower pressure. The lower pressure will mean a lower temperature, which will lower all running pressures all the way back to the main air compressor 101. The small amount of liquid oxygen will need to be removed in line 300 to flush out the solid contamination. This liquid oxygen will be sent to the subcooler 117, and after the subcooler 117 the flow in line 301 will be metered but the level control of the reboiler height will be valves 336, or 343, or 357 in FIG. 8. The liquid oxygen flow is sent to FIG. 8 at point 302. Also referred to at the bottom of FIG. 1 is point 40 from FIG. 7, which is a cold box nitrogen purge used to keep a positive pressure on the insulated cold box 56 to keep out the wet air. Another set of points come around the low pressure column 166 feed 211 to the safety relief valve 213 and burst disk 212, which set up is cold and needs a warming nitrogen flow which it receives from FIG. 7 point 39 to ensure it works when needed.

THE PURE ARGON SUBSYSTEM. Referring now primarily to FIG. 2, there are two major flows shown, one of which is the nitrogen for cooling, and the other is the argon to process. The nitrogen flow comes in from FIG. 1, point 545 as a cool liquid nitrogen that will branch off to two control valves, both of which control valves control the liquid nitrogen baths they are supplying. The flow out of line 546 is to the pure argon recondenser holding tank 126 that will bottom fill the heat exchanger 125 shell side. The liquid nitrogen will be vaporized and exit in line 555 to a pressure control valve and then to line 557. The second flow from FIG. 1, point 545, goes to another control valve set to hold a liquid level in line 547 on the shell side of the pure argon column condenser 131. This liquid nitrogen will be vaporized and exit the condenser 131 in line 556 to a pressure control valve, after which it will join line 557 and head back to the main air separation unit at FIG. 1, point 558.

The argon to process comes in from FIG. 1, point 400. This crude argon flow will enter the cold side of argon heat exchanger 133 and exit warm in line 401 heading to a joined flow with line 403 of hydrogen. The joined flow 404 is directed to the argon compressor 134, which is a two stage compressor with one intercooler. The compressed argon hydrogen flow exiting the argon compressor 134 in line 405 is cooled by an after cooler 135 and exits the aftercooler 135 in line 406 to be joined by a make-up flow of hydrogen. The make-up flow of hydrogen comes from a tube trailer 136, exits to a small line 407 then is pressure regulated to supply 408 to the compressed argon hydrogen flow 406 to make the combined flow 409 to the argon flash arrester 137. Upon exiting the flash arrester 137 at line 410, the flow is directed to a deoxo-catalyst bed 138 where the hydrogen and oxygen in the argon will be combined to make water vapor. The name of the flow at this point changes to combusted argon. The exit of the deoxo-catalyst bed 138 in line 411 is very hot with a lot of humidity. The combusted argon flow is now cooled by an aftercooler 139, after which the high humidity will now be water in line 412. Next, the water is removed using a phase separator 140 with a bottom water drain control valve exiting to atmosphere at 432. The combusted argon is still at 100% relative humidity upon exiting the phase separator 140 in line 413. The combusted argon must be dried to −110 degrees Fahrenheit dew point, and so the flow is sent to a drier bed 141. At the exit of the drier bed 141 in line 414 there is some dust with the combusted argon, which is removed by a dust filter 143. Now the combusted argon in line 402 is dry, dust free and ready to be used, and is directed to an argon heat exchanger 133.

The combusted argon 402 is warm as it enters the argon heat exchanger 133. At the cold side of the argon heat exchanger 133 the flow 415 is directed to a hydrogen separator 127 and is almost forming a liquid as it enters the hydrogen separator 127. The gas in line 416 upon exiting the hydrogen separator 127 will rise to the tube side of the argon reboiler 128 due to the condensing action of the reboiler. The reboiler 128 is not cold enough to liquefy the left over hydrogen from the deoxo-catalyst bed 138, and therefore will collect at the top of the reboiler tube side and all the argon and nitrogen will liquefy and fall at 417 to the bottom of the hydrogen separator 127, as there are no trays here. The hydrogen at the top of the reboiler is removed at 419 to a flow control valve and is sent back in line 403 to joined suction flow 404 of the argon compressor.

The liquid at the bottom of the hydrogen separator 127 is removed at 418 to a level control valve that in line 420 feeds the pure argon column 130. This flow contains argon and nitrogen, with a trace of oxygen and hydrogen. This liquid was not subcooled and will flash after decompression. The liquid and gas mixture will separate, and the gas will rise through distillation trays and the liquid will overflow the tray to the tray below until it collects at the bottom.

The liquid at the bottom of the pure argon column will first collect around the outer shell ring 129 of the reboiler shell side 128, and after that ring is full, the liquid will fill the bottom of the pure argon column 130. This liquid is then removed at 425 to a level control valve and is joined at 427 with the recondensed argon in line 431 heading to the pure argon tank 124. The gas that entered the pure argon column 130 will rise through distillation trays until it is condensed in the tube side of the condenser 131. The condenser 131 shell side is full of liquid nitrogen, and this makes it cold enough to liquefy in line 421 the nitrogen in the argon but will not liquefy the hydrogen. The liquid and gas bubbles will be removed in line 422 to the phase separator 132. A small amount of gas is removed to a flow control valve that exits at 423 to atmosphere. This valve is always very cold and needs a warming purge flow, which is received from the backup gas nitrogen system (FIG. 7, point 37). The liquid of the phase separator 132 exits in line 424 back to the pure argon column 130 top tray and acts as a cold cap stopping gas argon from passing.

The argon in the storage tank 124 has a vent line 428, and the argon transport trailer 123 has a similar vent line 429 both of which will vent excess pressure through a vent auto pressure control valve. The vented gas will share the same line at 430 to the tube side of the argon recondenser 125 where it will be liquefied, and in line 431 the liquid is returned to the joined line 427 to the argon storage tank 124.

There are two argon dryer beds used in this process, identified in FIG. 2 at 141 and 142. As illustrated in FIG. 2, dryer bed 141 is shown as the dryer being used, and dryer 142 is on reactivation. The reactivation is performed by the nitrogen off of the purge header from FIG. 7, point 36. The dryer vessels have their own heaters and only need a dry gas nitrogen to move the contamination out to vent at 433.

THE TAKE OR VENT INLET PIPING TO THE LIQUIFER. As illustrated in FIGS. 3a-3c, there are three inlet flows to the liquefier, all three of which come from the air separation plant main heat exchanger's warm side (FIG. 1). These are the gas oxygen inlet flow, the gas nitrogen inlet flow from the low pressure side of the air separation plant main heat exchanger's warm side, and the gas nitrogen inlet flow from the high pressure column.

Referring now to FIG. 3a, the gas oxygen inlet flow as shown comes from the warm side of the main heat exchanger, FIG. 1, point 321. This gas oxygen flow is now controlled by a flow meter 325 in order to prevent or stop an over draw of production. The flow is set by the air separation plant, and if the reading of flow meter 331 is not equal to flow meter 325 then any excess flow will be vented. The venting of excess gas oxygen is seen by flow meter 327, which controls the vent valve 329. If the pressure is too high the relief valve 328 will open. If the flow meter 327 shows a flow, then there is a problem. Valve 326 is the main flow control. There is a check valve 330 feeding the flow meter 331. The exit of the inlet process is oxygen gas to the liquefier at FIG. 4, point 332.

In FIG. 3b, the low-pressure gas nitrogen flow is shown coming from the warm side of the main heat exchanger in FIG. 1, point 216. This low-pressure nitrogen flow is now controlled by flow meter 250 to stop an over draw of production. The flow is set by the air separation plant, and if flow meter 256 is not equal to flow meter 250 then any excess will be vented. The venting of excess is seen by flow meter 252 which controls the vent valve 254. If the pressure is too high the relief valve 253 will open. If the flow meter 252 shows a flow, then there is a problem. Valve 251 is the main flow control. There is a check valve 255 feeding the flow meter 256. The exit of the inlet process is to the liquefier at FIG. 4, point 257.

In FIG. 3c, the gas nitrogen flow from the high-pressure column comes from the warm side of the main heat exchanger in FIG. 1, point 203. This high pressure nitrogen flow is now controlled by flow meter 231 to stop an over draw of production. The flow is set by the air separation plant, and if flow meter 237 is not equal to flow meter 231 then any excess will be vented. The venting of excess is seen by flow meter 233 which controls the vent valve 235. If the pressure is too high, the relief valve 234 will open. If the flow meter 233 shows a flow, then there is a problem. Valve 232 is the main flow control. There is a check valve 236 feeding the flow meter 237. There is also a two-inch branch line feeding an on or off valve 238 that feeds a purge nitrogen gas supply to FIG. 7, point 33. The main exit of the inlet process is to the liquefier in FIG. 4, point 239.

THE LIQUIFIER. Referring now to FIG. 4, the heat exchangers and flash pots for the liquefier device are illustrated diagrammatically. This is located in a well-insulated box 48 with a nitrogen purge coming in from the backup gas nitrogen in FIG. 7, point 41. The three gas streams described with reference to FIGS. 3a-3c from the air separation unit will enter the liquefier at different points. The oxygen gas stream comes into the liquefier device cold box from FIG. 3a, point 332. The oxygen gas stream flow is passed sequentially through three heat exchangers, namely, oxygen cooler 144, boiler 145, and condenser 146, and then enters the tube side of oxygen flash pot 147. The exit of the flash pot tube side will be a subcooled liquid oxygen, which is directed to the liquid oxygen filter house shown in FIG. 8, point 305. The draw of oxygen will be the change of state from gas to liquid. There is a change of pressure needed to make the pressure of the liquid oxygen here higher than the low-pressure column's feed. This change in pressure is accomplished by the height of the flash pot 147. The flash pot 147 should be about fifteen feet higher than the low pressure liquid oxygen line off of the low pressure column heading to the oxygen filter house. This means the gas oxygen stream to the flash pot should not be cold enough to condense prior to the entrance to the flash pot 147.

The low pressure nitrogen gas stream to the liquefier device comes in from FIG. 3b, point 257. This low pressure nitrogen stream joins the flow downstream from pressure exit control valve 264, and the combined flow in line 265 exits to the turbine boosters in FIG. 5, at point 265.

The high pressure column gas nitrogen stream to the liquefier device comes in from FIG. 3c, point 239. This stream joins the equal pressure flow downstream from the line exit of control valve 455, forming the combined flow 462. This combined nitrogen stream flow 462 will now branch off to two lines containing control valves 456 and 457. Control valve 456 will add heat to the heat exchanger 152 called the preheater. The exit of the preheater 152 and the exit of the auto control valve 457 will join and exit to turbine package in FIG. 5, at point 458.

In addition, there is a flow from the turbine package or assembly, FIG. 5, point 273, to an auto control valve 274 (FIG. 4) that will add heat to the preheater 152 and exit back to the turbine at FIG. 5, point 275. There is also a flow off of the boiler 145 going to the preheater 152 that needs to be warmed prior to being decompressed as shown FIG. 5, point 288.

The major flow of compressed nitrogen gas from the turbine assembly at FIG. 5, point 500 branches off to three auto control valves 501, 502, and 503. Auto control valve 501 will be set to warm the oxygen cooler 144. The exit of the flow 501 will join the exit flows of 502 and 503. The exit of auto control valve 503 will warm the preheater 152. The auto control valve 502 will bypass the heat exchangers and move a warm gas flow into the boiler 145. The boiler 145 has a liquid nitrogen bath that must be boiled away. The gas nitrogen from the three auto control valves (501, 502, and 503) will boil the liquid nitrogen in the boiler 145. The gas from line 500, FIG. 5 will be cooled off but will not condense, but the liquid nitrogen bath in the boiler 145 will turn to gas nitrogen. The cooled-off gas nitrogen from point 500 will go to the next heat exchanger 146 called the condenser, where the gas nitrogen is exchanging its heat with the exhaust of the four turbines, making the gas into a two-phase liquid gas nitrogen stream.

The two-phase stream is sent to the next heat exchanger 150 called the added cooling heat exchanger. Here the two-phase nitrogen stream will be cooled a little more but will still be a two phase stream at the exit. The two-phase stream is then directed into the pump flash pot 149 tube side where the nitrogen stream will be all liquid. The exit temperature at the pump flash pot 149 will be set to hold a boiling point of the boiler 145 after the pump. The liquid nitrogen is cold enough to be used. The liquid nitrogen off of the pump flash pot 149 will branch off to five places, which are to the liquid nitrogen pump (FIG. 6 point 510), then to the air separation plant (FIG. 6 point 511), then to the auto control valve 512 back feeding the pump flash pot 149, then to the tube side of the nitrogen production flash pot 148, and lastly to the auto control valve 513 feeding the shell side of the oxygen production flash pot 147.

Transition from FIG. 4 to FIG. 6. Following the flow of liquid nitrogen off of the pump flash pot 149 to the liquid nitrogen pump (FIG. 6 point 510), this liquid nitrogen flow can bypass the pump during start up, through a branch line containing valve 522. After the pump is running, there is a check valve 523 which will stop a back flow until the valve 522 is closed. A flow from the auto control valve 522 through check valve 523 can supply the boiler through line 528 (to FIG. 4) and the pump flash pot through line 529 to valve 530 in FIG. 4. [As an operation note, starting a pump sometimes needs priming, and the priming can be done to a low pressure point using the pump flash pot shell side through FIG. 4, point 529 opening valve 530 as valve 522 (in FIG. 6) is closing.]

Two separate liquid nitrogen pumps 169 and 170 are shown in FIG. 6, which are used for the movement of the liquid nitrogen to the boiler. Two pumps 169 and 170 are provided because the carbon seal on the pumps will wear out, and providing two pumps will allow the operation to stay running as the pumps are switched to replace the carbon seal. Only one pump should be running at a time. In FIG. 6, the inlet valve to the pump 169 is auto valve 520, and the exit valve is auto valve 524, which will feed a check valve 526. The inlet valve to the pump 170 is auto valve 521, and the exit valve is auto valve 525, which will feed a check valve 527. Flow from the pump in use will branch off to the heat exchangers in FIG. 4, point 529 to check valve 530 feeding flash pot 149, and FIG. 4, point 528, where it will feed the boiler 145. The amount of liquid to the boiler 145 will be regulated by the bypass level control valve 523 if the pump is off, or a slowly changing pump speed. The flow from FIG. 6, line 529 to FIG. 4 goes to auto control valve 530. The flow through level control valve 530 is to the shell side liquid level of the pump flash pot 149 and this is normally closed.

The next branch off of the pump flash pot 149 in FIG. 4 is to FIG. 6, point 511. There is a dump to atmosphere branching from line 511 through auto control valve 542. Line 511 also leads to a normal running open valve 543 this will close check valve 541 and go to line 544 as the liquid back to the air separation plant (see FIG. 1). If the liquefier is not able to feed the air separation plant, then liquid from the nitrogen storage tank 171 is used. A liquid flow off the nitrogen storage tank 171 is provided by opening valves 539 and 540. After starting the liquid pump 172 the nitrogen flow will go to check valve 541, then to a closed auto valve 543, then to line 544 feeding the air separation plant. At all times, the flow to the air separation plant is controlled by the level controls of the pure argon condenser 131 flow through line 547, the level controller of pure argon recondenser 126 flow through line 546, and the metered flow at line 549 to the low pressure column.

The next branch off from the pump flash pot 149 is to the level controller valve 512 (FIG. 4) sending liquid back to the shell side of the pump flash pot. This is normally closed. The next branch off from the pump flash pot 149 is to the level controller valve 513 (FIG. 4) sending liquid to the shell side of the oxygen production flash pot (147). This is also normally closed.

The last branch off from the pump flash pot 149 is to the tube side of the nitrogen production flash pot 148 (FIG. 4). The liquid nitrogen exiting the flash pot 148 branches to valve and to line 515 (see FIG. 6). The valve 514 is a liquid level control valve to control the liquid height of the shell side of the nitrogen production flash pot 148. This is normally closed. The branch off to line 515 is the production liquid nitrogen to the nitrogen storage system. If the production is not good, it will be sent to dump through valve 535. When the liquid nitrogen is found to be good there is a last purge valve 536 prior to the tank valve which is normally closed. The valve is the production nitrogen metering valve and is the entry to the nitrogen storage tank 171. The nitrogen storage tank 171 will be monitored to one PSIG. The tank venting will be through valve 538 to atmosphere. The liquid temperature to control the venting will happen in the production flash pot liquid level and the gas exit pressure 459 (see FIG. 4).

Referring now to the liquid nitrogen feed to the boiler 145 in FIG. 4 from line 528, FIG. 6, after the liquid nitrogen leaves the pump flash pot 149, the liquid must be cool enough to stay as single phase liquid thru the pumping stage then up to the boiler, but not be too cool to stop the boiling action when it enters.

Vaporized nitrogen coming out of the boiler 145 is routed to the preheater 152. The preheater 152 can be warmed by three flows, namely: the booster four aftercooler exit called the major flow controlled by valve 503, the booster one aftercooler exit controlled by valve 274, and the high pressure column and turbine exhaust flow controlled by valve 456. This can be monitored by the auto opening of valve 451. Valve 451 will drain excess liquid produced by the four turbines that is not used by the three flash pots.

The exit of the vaporized nitrogen flow from the preheater 152 goes to the turbine assembly illustrated in FIG. 5, at point 288. This nitrogen gas is sent to four flow meters 289, 290, 291, and 292. Each flow meter is connected to its own turbine expander and sets the variable guide vanes for each turbine expander. Flow meter 289 is the inlet to turbine expander 153. Flow meter 290 is the inlet to turbine expander 157. Flow meter 291 is the inlet to turbine expander 161. Flow meter 292 is the inlet to turbine expander 165. The guide vanes 154 of turbine expander 153 are set by flow meter 289, the guide vanes 158 of turbine expander 157 are set by flow meter 290, the guide vanes 162 of turbine expander 161 are set by flow meter 291, and the guide vanes 166 of turbine expander 165 are set by flow meter 292. All four turbine expanders exit to a common header with one exit (to FIG. 4, point 450).

Point 450 in FIG. 4 is where the exit from the four turbine expanders goes into a phase separator 151. The phase separator 151 will hold a liquid level controlled by the exit temperature of the turbines and the draining four auto control valves. The temperature of the turbine exit has to do with the pressure of the boiler 145 and the feed temperature from the preheater 152. The four auto control valves are the over flow valve 451, the filling of the shell side of the oxygen production flash pot 147, valve 452, the filling of the shell side of the nitrogen production flash pot 148, valve 453, and the filling of the pump flash pot 149, valve 454.

Filling of the oxygen production flash pot 147 shell side by a level control valve 452, this should be the only filling valve needed for the flash pot 147. Another valve 513 is provided in case it is needed but is closed on normal operation. The liquid nitrogen being supplied to the flash pot by level control valve 452 is not subcooled and will flash when decompressed. The rest of the liquid will boil away as the tube side liquid oxygen is cooled. The exit oxygen temperature control is from the liquid height of the nitrogen shell side bath, and the pressure held on the exit nitrogen gas in line 461. The vent valve 382 on the oxygen storage tank 177 (see FIG. 8) is the only a pressure control valve on the tank, but the valve should not be always open. The opening of the vent valve should be monitored and the temperature of the oxygen production flash pot 147 should be controlled. The oxygen storage tank should never run below 0.5 PSIG or above 1.5 PSIG without an adjustment, and the vent valve 382 will open at one PSIG.

Looking at the nitrogen production flash pot 148 in FIG. 4, auto level control valve 453 is the only valve that should be used to fill the shell side of the nitrogen production flash pot 148. Valve 514 is also there if needed but is closed during normal operation. This liquid nitrogen passing through control valve 453 will come in without subcooling and will flash when decompressed. The rest of the liquid to the shell side from valve 453 will be boiled off, as the liquid nitrogen on the tube side is cooled. There is a vent valve 538 on the nitrogen storage tank 171 (see FIG. 6). The exit production liquid nitrogen temperature control is from the liquid height of the nitrogen shell side bath, and the pressure held on the exit nitrogen gas in line 459. The vent valve on the nitrogen storage tank 171 is the only pressure control valve, but the valve should not always be open. The opening of the vent valve 538 should be monitored and the temperature of the nitrogen production flash pot 148 should be controlled. The nitrogen storage tank 171 should never run below 0.5 PSIG or above 1.5 PSIG without an adjustment, and the vent valve 538 will open at one PSIG.

The pump flash pot 149 has a level control valve 454 which should be the only liquid nitrogen supply to the shell side. Other valves, including valves 530 and 512, should be closed and are there if needed. The pump flash pot 149 tube side liquid nitrogen must be monitored to control its flash off point. The liquid should be a single phase as it exits the nitrogen pump, but not so cold that it stops the boiler as it enters. The tube side liquid nitrogen therefore has to be monitored, and the shell side liquid nitrogen height and pressure controlled.

After all three flash pots 147, 148, and 149 have taken what they need from the three percent of produced liquid off of the turbine exhaust phase separator 151, there should be a small amount left over. This is passed through a level control valve 451 and liquid that is not subcooled will flash when decompressed. The flashing liquid nitrogen is put into a low pressure line used by the nitrogen production flash pot exhaust gas. As this valve 451 opens and closes it will show how the exit temperature of the four turbines are doing. If the valve 451 closes a little, that shows more liquid is being used by the flash pots, or the preheater is running to warm, or the boiler pressure is changing to a lower pressure.

The three flash pots 147, 148, and 149 shell sides will exit gas nitrogen. The oxygen production flash pot 147 will exit the shell side nitrogen gas in line 461 to the condenser 146. At the exit of the condenser pass there is a branch off to a pressure control valve 260 or a check valve 261. Check valve 261 will take a small flow during startup to the turbine exhaust header but when the turbine exhaust pressure goes above the flash pot pressure auto pressure control valve 260 will move the gas to a low-pressure line. During normal operation, check valve 261 is closed and pressure control valve 260 is controlling. The nitrogen production flash pot 148 shell side will exit the shell side gas in line 459 to the added cooling heat exchanger 150, then join with the exhaust from valve 451, and the joined flow is to the condenser 146. The flow off of the condenser 146 will pick up the exit of the auto pressure control valves 260 and 262 and then enter the boiler 145. The gas off of the shell side of the pump flash pot 149 in line 460 will go to the added cooling heat exchanger 150. The exit off of this pass will go to the condenser 146 and exit to a branch off to a check valve 263 and to an auto pressure control valve 262. Check valve 263 will take a small flow during startup to the turbine exhaust header but when the turbine exhaust pressure goes above the flash pot pressure, an auto pressure control valve 262 will move the gas to a low pressure line. Normal operation is check valve 263 closed and pressure control valve 262 is controlling. Now the low pressure line off the three flash pots 147, 148, and 149 will go to the boiler 145, then to the oxygen cooler 144, and then to auto pressure control valve 264.

The four turbine exhaust flow at point 450 from FIG. 5, discussed in greater detail below, will go thru the turbine exhaust phase separator 151, and the gas off the top of the separator 151 will go into the condenser 146, while all of the liquid of the phase separator 151 will go to the three flash pots 147, 148, and 149 and the over flow valve 451. Upon the gas stream off of the turbine exhaust phase separator 151 exiting the condenser 146, during a startup mode of operation, this gas stream will pick up the exit of the two check valves 261 and 263, but during normal operation the pressure of the exhaust of the turbines will be much higher and close both check valves 261 and 263. The flow of gas from the condenser 146 will enter the boiler 145, and at the exit of the boiler 145 the gas will enter the oxygen cooler 144. The exit of the oxygen cooler 144 is to a pressure control valve 455.

The pressure control valve 264 should run wide open if all the flow from the low pressure nitrogen inlet line (FIG. 3b, line 257) can enter the liquefier. The flows from valve 264 and from FIG. 3b, line 257 will join, and go to the turbines (FIG. 5, point 265). This joined gas nitrogen flow will also join the flow from surge control check valve 272 (FIG. 5), then pass through the flow meter 270. The flow meter 270 is needed to predict a surge on the first booster 155. The booster 155 will draw in the nitrogen gas and compress the gas. The compressed gas will pick up the heat of compression and will exit to the aftercooler 156, which is a double air cooling fan system. Each fan in an embodiment is a 25-horsepower belt driven fan, one is a fixed pitch fan, and the other is a variable pitch fan. The aftercooler 156 is set to hold a 90 degree temperature on the compressed nitrogen gas exit.

The nitrogen gas exit from the aftercooler 156 will branch off to three places, namely, a flow to the surge control return gas flow through control valve 271, a flow 273 to warm the preheater 152 (FIG. 4), and a flow to the next booster 159 through check valve 276. The flow through the auto surge control valve 271 will open if the math surge curve is approached. If the surge control system is called into action, then valve 271 will slowly open and the check valve 272 will open, and the flow to the booster 155 will increase. The surge control system is normally not active but is used on startup. The next flow is to the preheater 152 at point 273 (FIG. 4). The pass through the preheater 152 is normally a small flow to keep the line active, but if the system is upset due to a failure of a nitrogen pump 169 or 170, the boiler 145 liquid will flash to gas, and the excess cold gas to the turbines will cause the turbines 153, 157, 161, and 165 to produce liquid across the blades, and the turbines will all fail. The control valve 274 (FIG. 4) is a temperature controller set to hold the flow in line 288 (FIG. 5) to about −155 degrees. The exit of flow from auto control valve 274 through the preheater 152 to line 275 (FIG. 4) is a very small flow now moved to line 275 in FIG. 5.

The last flow from the aftercooler 156 is to the check valve 276 heading to the next booster 159. The exit of the check valve 276 is joined with a small flow in from line 275 (from FIG. 4) that is a cold gas. The small flow of cold gas from line 275 will not move the inlet temperature to the booster 159 by even one degree during normal running. The gas of the check valve 276 will also be joined by the flow from surge control check valve 276 if the surge control system is active. All of the joined flows will enter the flow meter 277. The flow from flow meter 277 enters the booster 159. The exit of the booster will enter the aftercooler 160 (having the same design and operation as the aftercooler 156). Out of the aftercooler 160 the flow will branch to the auto surge control valve 278 and check valve 279 (having the same design and operation as the surge system 271), and the line to the flow meter 280.

The flow from the surge control system 282 check valve and the flow from the aftercooler 160 will enter the flow meter 280. The gas will be compressed by the next booster 163 and exit to the aftercooler 164. The exit of the aftercooler 164 will branch off to the surge control valve 281 and to the booster 167. The surge control system is normally closed, but for startup valve 281 slowly opens to a check valve 282 which will add flow to the booster 163 inlet.

The rest of the exit flow from aftercooler 164 will go to a joined flow of the surge control system exit check valve 285 and from line 458 from FIG. 4. All the flow is metered by flow sensor 283 used to predict the booster 167 surge. The flow is now called the major flow. In the booster 167 the gas will go up in pressure and temperature. The temperature will be controlled by an aftercooler 168 to hold the temperature at about 90 degrees. The exit of the aftercooler 168 flow will split to the surge control system 284. The surge control system 284 should be closed on normal operation, but on start up the valve 284 is slowly opened and that gas will move through check valve 285 to the booster 167 inlet. The flow that was not used by the surge controller system will exit to line 500 to FIG. 4 as the major flow.

FIG. 7 THE BACKUP GAS NITROGEN SYSTEM. Referring now to FIG. 7, the backup gas nitrogen system is shown, which includes a liquid nitrogen storage tank 174 having its own venting system 46. The liquid nitrogen will move from storage tank 174 into the tube side of evaporators 178 where the liquid nitrogen is changed into a gas nitrogen. At the exit of the evaporators 178 there is a pressure regulator 45. If the purge nitrogen header should fall below its normal running pressure, then the regulator 45 will open, but otherwise the regulator 45 is closed.

There is an air feed 2 coming from the air separation unit in FIG. 1 to the backup gas nitrogen system in FIG. 7, which is to the instrument air supply. In FIG. 1, valve 112 is an open and closed valve feeding air to the auto control valves to open and close the valves the computer is controlling. This flow has above 78 PSIG of air pressure. Check valve 19 (FIG. 7) is provided on air feed 2 to stop a back flow of air. The exit of the check valve 19 will enter the selector 20 which will allow the air to pass during normal operation to the instrument air system 21. If the instrument air supply falls to a lower pressure, then the set point, pressure regulator 30 will take over. Back flow is stopped by check valve 31.

The gas nitrogen supply coming into the back up gas nitrogen system from FIG. 3c, line 33 can supply all the purge and instrument nitrogen for the whole plant. After the gas nitrogen is supplied, there is a check valve 32 (FIG. 7) to protect the pure nitrogen. If instrument air supply point 2 is not up to set point pressure, then the check valve 31 will open and the pressure regulator 30 will now supply the instruments needing nitrogen, this will open to point 21. The main purge header, shown by the line extending vertically in FIG. 7, will wrap around the whole plant site with a two inch line. The purge header has many branch offs which are also illustrated in FIG. 7. The main supply to the purge header is the feed off of line 33, FIG. 3c, and if this is not up to pressure then regulator 45 off of the backup tank 174 will supply the nitrogen gas to the purge header.

Figure 8:
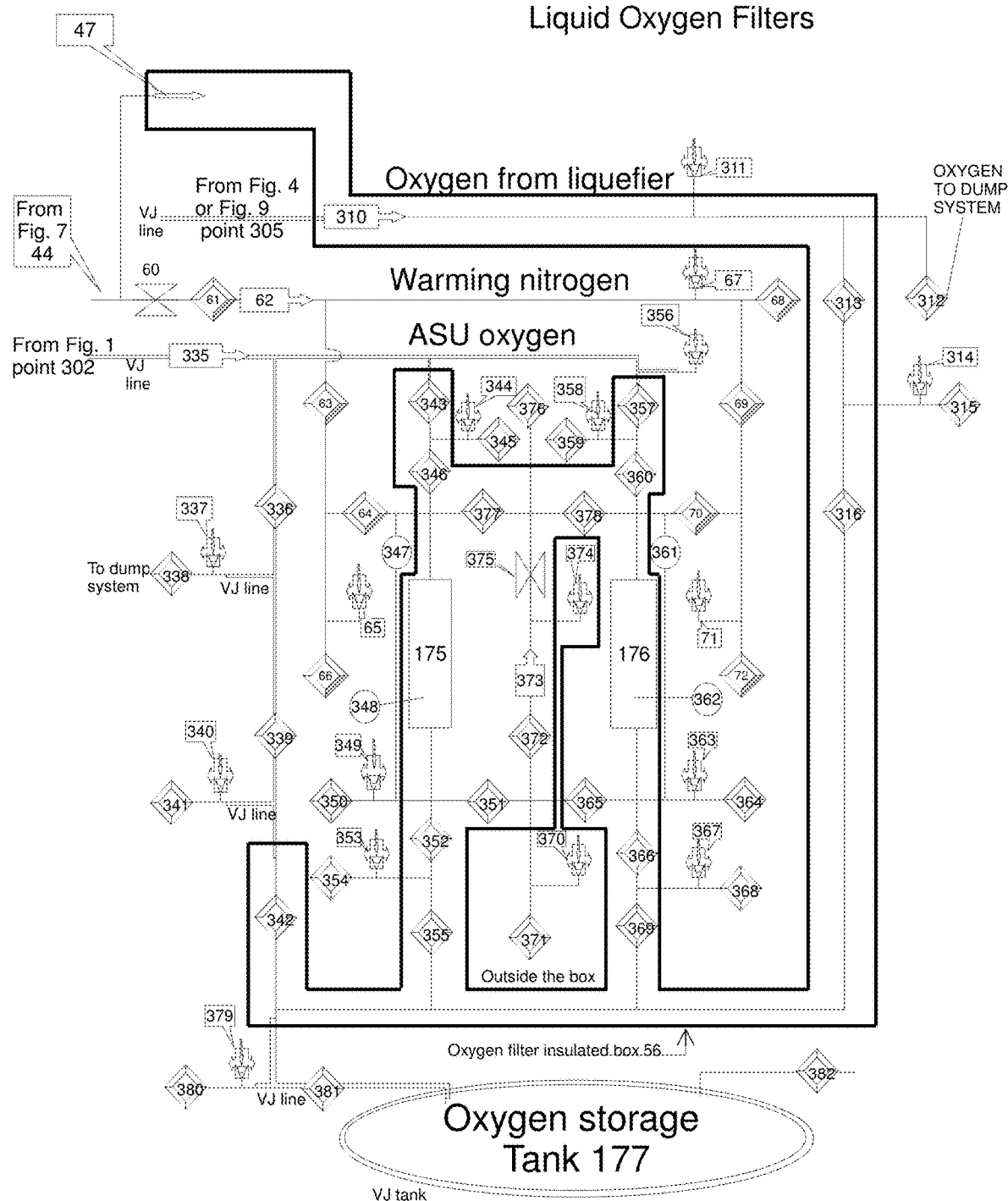
FIG. 8 is a schematic diagram of the air separation plant liquid oxygen filter house.

The purpose of each of the branches off of the main purge header will now be explained. As shown in FIG. 7, there is a branch to FIG. 8, point 44 off of the purge header which provides a nitrogen supply to the oxygen filter house. As shown in FIG. 8, the main flow is to the warming nitrogen flow through flow meter 60, to open or close auto valve 61, to check valve 62, to service the filters 175 and 176 as needed. There is also a branch flow from point 44 off to provide a nitrogen purge flow to the oxygen filter box at point 47.

There are four separate branches 34, 35, 42, and 43 off of the main purge header to the turbine package shown in FIG. 5. The branch off at point 34 is providing a sealing gas supply in line 75 to turbine 153 and in line 76 to turbine 157. The branch off at point 35 is similarly supplying a sealing gas supply in line 77 to turbine 161, and in line 78 to turbine 165. The branch off at point 42 is supplying the turbine case purge, and the branch off at point 43 is supplying the oil accumulator.

Another flow off of the main purge header is to point 41 in FIG. 4, which is to the liquefier cold box purge. The flow off of point 40 to FIG. 1 is to the cold box purge. The flow off of point 39 to FIG. 1 is to a warming purge flow to the low pressure column relief valve 213 and burst disk 212. The flow off of point 38 is a purge flow of warm gas to defrost the backup storage tank vent valve (46) as shown in FIG. 7. Finally, the flow off of points 36 and 37 goes to FIG. 2. The flow off of point 36 is to regenerate the argon drier beds, and as shown in FIG. 2 is working on argon drier bed 142, this flow will go to atmosphere 433. The flow off of point 37 will warm up the vent valve to atmosphere off of the separator 13 shown as flow 423 in FIG. 2.

THE OXYGEN FILTER HOUSE. Some air separation plant sites have built-in heat pumps and gel trap filters to remove solid concentrations in the liquid oxygen at the reboiler. Some plants have a filter to the transport trailers at the filling station. Some plants have a filter to the storage system. Those plant sites will not necessarily need the liquid oxygen filter house illustrated in FIG. 8, although the present oxygen filter house will reduce the losses and manpower needs of the existing system after the plant switches to the new liquefier of the present invention.

The inventor's new liquefier takes almost all the oxygen production out of the air separation plant as gas. This will leave behind a small amount of liquid oxygen that has some solid contamination which must be removed to hold down the concentration of the contamination. The oxygen filter house system has two gases and one liquid to move around without blending. The gases here are pure nitrogen gas, and atmosphere air, and the liquid is pure liquid oxygen. To do this, each system must be protected. The best known way to protect a purity is to keep the pressure above atmosphere pressure, and then to use a blocking system, or a way to stop one flow from moving into the next one. Since the pressures here are above atmosphere pressure, a double block and bleed system is used. This will stop flow by a valve whose exit is to atmosphere. If a valve that is used to block a flow were to leak, then that flow could leak but only to the atmosphere, and not to the next product. All the double block and bleed nest of valves must have a relief valve.

The liquid oxygen flow from the air separation plant comes in from FIG. 1 to the oxygen filter house in FIG. 8 as a subcooled liquid, at point 302. There is a check valve 335 on the entry to the filter house, which is provided to prevent a back flow of liquid oxygen. If the liquid oxygen in line 302 is not pure enough to put to storage, or if both filters have clogged, the liquid oxygen must go somewhere. One place the liquid oxygen with a bad purity should go is to the dump. But, if the filters are being worked on and are not able to be used, then there is a bypass to allow the solids to go to storage during a short time the filters are being worked on.

If the oxygen produced by the air separation plant is to be dumped, the whole system is assumed to be or going bad. Quick action must be taken, and all the valves to be closed at once are 313, 316, 381, 61, 63, 69, 64, 70, 343, 357, 346, 360, 377, 378, 339, 372, 351, 365, 352, 366, 342, 355, and 369. In addition, all the valves to open at the same time are 68, 338, 345, 376, 359, 315, 66, 72, 341, 350, 364, 354, 368, 371, and 380. The valves to control the flows are valves 312, 68, 336, and 177. Valve 312 controls the height of the tube side of the oxygen production flash pot vessel 147 (FIG. 4). Valve 68 controls the warm nitrogen flow seen at flow meter 60 to a flow of 100 SCFH but will see zero flow signal making the valve 68 to auto flow control to a wide open. Valve 336 controls the liquid height of the reboiler bath vessel 116 (FIG. 1). Then the vent pressure control valve 382 on the storage tank, which will hold a one PSIG on the storage tank. This will vent all trapped gas and liquids to a total dump to protect the storage tank from contamination.

When the purity is established, the system of opening the different subsystems starts. The largest flow will be the liquefier oxygen (from FIG. 4, point 305) to storage. On production dump the flow from the liquefier past check valve 310 to dump is controlled by valve 312. When the purity is good from the liquefier, valve 312 continues to dump while auto level control valve 313 is opened in manual mode. The flow to valve 313 just opened will vent out of the bleed valve 315. Once the liquid oxygen is at a steady flow out of bleed valve 315, valve 316 is slowly opened, while valve 315 is closed. The flow will then go out the bleed valve 380. Once the liquid flow is steady from bleed valve 380 and the purity is still good, then valve 381 to storage is opened. The amount of liquid now moving to storage and to dump will cause the auto level control valve 312 to see a lower level than the set point and begin to close. When valve 312 is about 5 percent auto open, valve 313 is put into auto level control auto mode. Auto level control valve 312 is to be set to a higher liquid level control point than valve 313 and is to be kept in auto control mode in case the flow out of the vessel 147 starts to back up so the liquid oxygen will have a place to go. The system as just described has now put liquid oxygen to storage from the liquefier.

When the purity of the air separation plant's liquid oxygen is good, then for a short time the oxygen with all the solids will go to storage during the time the filters are being worked on. The filters must be opened slowly, and dumping or bypass liquid to storage can continue. In the embodiment shown in FIG. 8, filter 175 will be set up to filter, and filter 176 will be put on reactivation. All of the valves in the filter system will be positioned as if you are going to dump with the air separation plant liquid oxygen, and going to storage with the liquefier liquid oxygen, to here. Liquid oxygen from the production plant comes in from FIG. 1, point 302 to a check valve 335 leading to a shell side reboiler level control valve 336 connected to a dump valve 338. Opening valve 342 will cause a backward flow of liquid oxygen out bleed valve 341. Once a steady flow of liquid oxygen is seen exiting bleed valve 341, then valve 339 is opened and valves 341 and 338 are closed. The system is now set up so that the production plant liquid oxygen is bypassing the filters and going to storage. Flow control is still provided from liquid level control valve 336.

Setting up filter 175 for service. The liquid oxygen is at a good purity and first open reboiler auto level controller valve 343 in manual mode is opened about 25%. This will vent liquid oxygen out bleed valve 345. When a steady stream of liquid oxygen is detected, then valve 346 is opened, and bleed valve 345 is closed. This will vent liquid oxygen out bleed valve 350. The line supplying bleed valve 350 is small and it should take a few minutes to cool down enough to allow a steady flow of liquid oxygen to exit. A close eye must be kept on the active liquid controller, as it is very possible to over draw the liquid from the reboiler, and if this is starting to happen the auto controller valve 336 will close. If the liquid from the reboiler is being overdrawn, then for a short time valve 350 should be closed until the reboiler height is reestablished and the auto controller valve 336 reopens. Then, valve 350 is reopened. By monitoring the temperature sensor 348, the cooling process can be tracked. After the liquid oxygen is flowing at a steady stream out valve 350 and the purity is still satisfactory, then valve 352 is opened to vent out bleed valve 354 and valve 350 is closed. After a steady stream of liquid oxygen is seen exiting valve 354 then open valve 355 and close valve 354. The reboiler auto controller valve 336 is also then set to a higher level and reboiler auto level controller 343 is set to auto mode with a set point at normal reboiler height. The bypass line is then closed by closing valves 342 and 339 and then opening valves 338 and 341. The system is now filtering the solids out of the liquid oxygen from the air separation plant, and the liquefier liquid oxygen is joined to storage.

Next, filter 176 is reactivated, going from the same sequence as above. Recap closed valves are 61, 63, 64, 69, 70, 345, 357, 360, 377, 378, 339, 350, 351, 372, 365, 354, 366, 342, 369, 380, and 315. The valves open at this time are 338, 341, 346, 352, 355, 376, 371, 359, 364, 368, 316 and 381. The valves in auto control are 68, 313, 312, 343, 336, and 382.

Bleed valve 364 is open so any liquid could vent, but to make sure valve 61 is opened so that a flow will be started and seen by flow monitor 60. Flow monitor 60 will be set to 100 SCFH and for now valve 68 will control the flow. Then flow controller valve 69 is opened in manual mode to 25% open, and the gas nitrogen will vent out of valve 72. Auto flow controller valve 68 will then start to close, because valve 69 is taking some of the flow. Then, valve 70 is opened, and valve 72 is closed. Auto control valve 68 is set to 90 SCFH and auto flow controller valve 69 is adjusted to a set point of 100. If the flow falls below 90 SCFH then valve 68 will be called to open. If valve 68 is called to open, then the operator will be notified. The solid contamination the filter removes will turn to gas before the filter temperature 362 hits-90 degrees Fahrenheit. When the temperature hits-80 degrees Fahrenheit the reactivation is finished. Now, valves 69, 70, and 364 are closed, and valve 72 is opened. Valve 68 is in control and set to open if the flow goes below 90 SCFH as seen by flow monitor 60. Closing valve 61 therefore will stop the entry of nitrogen gas and by default valve 68 will auto open.

Moving to the cool down of filter 176, the cleaned exit flow of filter 175 is used to cool down filter 176. Opening valve 351 will vent liquid oxygen out bleed valve 371. Once a steady stream of liquid oxygen is seen exiting valve 371, valve 371 is closed, and auto flow control valve 372 is opened, and will be open 25% in manual mode. This will pass a liquid oxygen flow through a check valve (373), to a flow monitor (375), and exit valve 376. Once a steady flow of liquid oxygen is seen exiting valve 376, then valves 378 and 364 are opened. The cool down flow will be seen on flow meter 375.

Auto flow controller valve 372 will be put into auto control mode and be set to 100 SCFH controlling the flow seen at flow meter 375. The cooling process will be seen on temperature monitor 362. This process of cooling the filter will take hours due to the small flow. Once the temperature monitor 362 reaches a-250 then the cool down mode is complete, and the filter 176 will be put on standby mode.

To set up a standby mode for filter 176, the flowing valves must be closed; 351, 372, 378, 364, and the valves to be open are 371 and 376. The process of standby is to let a cooled filter 176 sit with valves closed. If there is any gas expansion, the vessel is protected by relief valve 363. In addition, there will be a cycling of opening and closing valve 364 once every ten minutes, since protecting a vessel with only a relief valve may be insufficient in reducing the expansion of gas trapped.

The next mode of operation of the liquid oxygen filters is dull filter running, which is how to move the filtration from one filter to the next. The standby mode is stopped. The only valve in operation on filter 176 is valve 364, which will open and close on a timer once every 10 minutes for one tenth of a second. This will stop on an open sequence, and valve 357 will open in manual control to 25% open. A flow of oxygen liquid will be seen coming out of bleed valve 359. Then valve 360 is opened and valve 359 is closed. Liquid oxygen will go out through valve 364. During the startup of filter 176 the amount of liquid oxygen to be used will cause auto level control valve 343 to start closing. If valve 343 were to close, then the valve opening on auto level control valve 357 which is in manual mode is reduced to 10%. After liquid oxygen is exiting valve 364 then valve 366 is opened, and bleed valve 364 is closed. Liquid oxygen will flow out of bleed valve 368. After that valve 369 is opened. Now both filters 175 and 176 are filtering.

The next step is to stop filter 175. Level controller valve 343 in manual is set at 5% open, and level controller valve 357 is put into auto mode with a set point of the reboiler height. This will take about 3 to 5 minutes to settle out, and then valves 343, 346, 351, 352, and 355 are closed, and valves 354, 350, and 354 are opened.

Filter 175 is drained, with any liquid oxygen in filter 175 will drain out of valve 350 as the liquid turns to gas. In addition, valve 61 is opened and auto control valve 63 is set to 100 SCFH. This will vent nitrogen gas out of valve 66. Then valve 64 is opened and valve 66 is closed. Auto flow control valve 68 is set to open below 90 SCFH, and auto control valve 63 is set to open below 100 SCFH. This should cause valve 68 to close because the flow will be above the set point. The liquid in filter 175 will be draining out of valve 350.

Filter 175 is put in to heat up, after the liquid is drained out of valve 350. Then the flow will stay the same. The point to monitor is the filter temperature sensor 348. When the filter temperature hits-80 degrees Fahrenheit, the heat up is done. To put filter 175 into cool down, the heat up is stopped by closing valves 61 and 63. This will cause auto flow control valve 68 to open due to a loss of flow. The set point for valve 68 is open below 90 SCFH. Valve 64 is then closed, and bleed valve 66 is opened. Using the clean liquid oxygen out of filter 176, valve 365 is opened to bleed valve 371 is closed. After valve 371 has a steady flow of liquid oxygen exiting it, then valve 372 is opened and valve 371 is closed. Valve 372 is put in manual mode and open 10%, and once liquid oxygen comes out of valve 376, open valve 377 and close valve 376. Flow meter 375 will show a flow and should be set to a flow rate of 100 SCFH and auto flow control valve 372 will be used to control the flow. The flow will exit valve 350. Once the flow cools down the filter to −250° F. as seen on temperature sensor 348 then the cool down is done.

Put filter 175 to standby mode. Stop cool down and close valves 365, 372, 377, and 350. Open bleed valves 371, and 376. Now cycle valve 350 open and closed once every ten minutes to stop an over pressure.

Put filter 175 into dull operation mode. When needed filter 175 will be put into dull operation with filter 176. First open auto level control valve 343 in manual mode at ten percent open. This will vent liquid oxygen out of bleed valve 345. When a steady flow of liquid oxygen exits bleed valve 345, then open valve 346, and close bleed valve 345. The flow will exit valve open valve 350. The temperature monitor 348 will show the progression of cool down to operation. Once the flow out of valve 350 shows a steady stream of liquid oxygen then open valve 352 and close valve 350. The flow will now exit bleed valve 354. Once bleed valve 354 shows a steady flow of liquid oxygen then open valve 355, and close valve 354. Now put auto level controller valve 343 into auto mode and set auto level controller valve 357 into manual mode at five percent open. Once the system is working for a few minutes and is stable, then put the filter 176 into stop mode. Put valve 357 into auto level control.

Put filter 176 into a stop mode. The system just switched over from filter 176 on line to filter 175 on line. Now stop filter 176 and close all valves 357, 360, 366, and 369. Now open 368, 364, and 359. Any liquid in filter 176 will be able to drain out of valve 364. Then again go through the warmup steps above.

During the operation of the filters there is a differential pressure gauge to show filter clogging. This should be monitored and logged to find out how long the filter can be in operation. The differential pressure gauge for filter 175 is 347, and the filter 176 has differential pressure gauge 361. This is a list of relief valves found on FIG. 8. On the liquid oxygen from the liquefier to the filter house is relief valve 311 to protect the line if valves 312, 313, and check valve 310 closed with liquid oxygen trapped and changing state to a gas. Relief valve 314 is there to protect the line if valves 313, 315, and 316 closed with liquid oxygen trapped and changing state to a gas. Relief valve 340 is there to protect the line if valves 339, 342, and 341 closed with liquid oxygen trapped and changing state to a gas. Relief valve 349 is there to protect the line and filter 175 if valves 352, 351, 350, 64, 346, and 377 closed with liquid oxygen trapped and changing state to a gas. Relief valve 370 is there to protect the line if valves 371, 351, 365, and 372 closed with liquid oxygen trapped and changing state to a gas. Relief valve 374 is there to protect the line if valves 372, check valve 373, 378, 376, and 377 closed with liquid oxygen trapped and changing state to a gas. Relief valve 344 is there to protect the line if valves 343, 354, and 346 closed with liquid oxygen trapped and changing state to a gas. Relief valve 358 is there to protect the line if valves 360, 357 and 359 closed with liquid oxygen trapped and changing state to a gas. Relief valve 356 is there to protect the line if valves 357, 343, 336, and check valve 335 closed with liquid oxygen trapped and changing state to a gas. Relief valve 67 is there to protect the line if valves 69, 68, check valve 62, and 63 closed with liquid oxygen trapped and changing state to a gas. Relief valve 71 is there to protect the line if valves 72, 70, and 69 closed with liquid oxygen trapped and changing state to a gas. Relief valve 363 is there to protect the filter 176 and the lines if valves 366, 365, 364, 70, 360, and 378 closed with liquid oxygen trapped and changing state to a gas. Relief valve 367 is there to protect the line if valves 366, 368, and 369 closed with liquid oxygen trapped and changing state to a gas. Relief valve 379 is there to protect the line if valves 381, 380, 342, 355, 369, and 316 closed with liquid oxygen trapped and changing state to a gas. Relief valve 353 is there to protect the line if valves 352, 354, and 355 close with liquid oxygen trapped and changing state to a gas. Relief valve 65 is there to protect the line if valves 63, 64, and 66 closed with liquid oxygen trapped and changing state to a gas. Relief valve 337 is there to protect the line if valves 336, 338, and 339 closed with liquid oxygen trapped and changing state to a gas.

Figure 9:
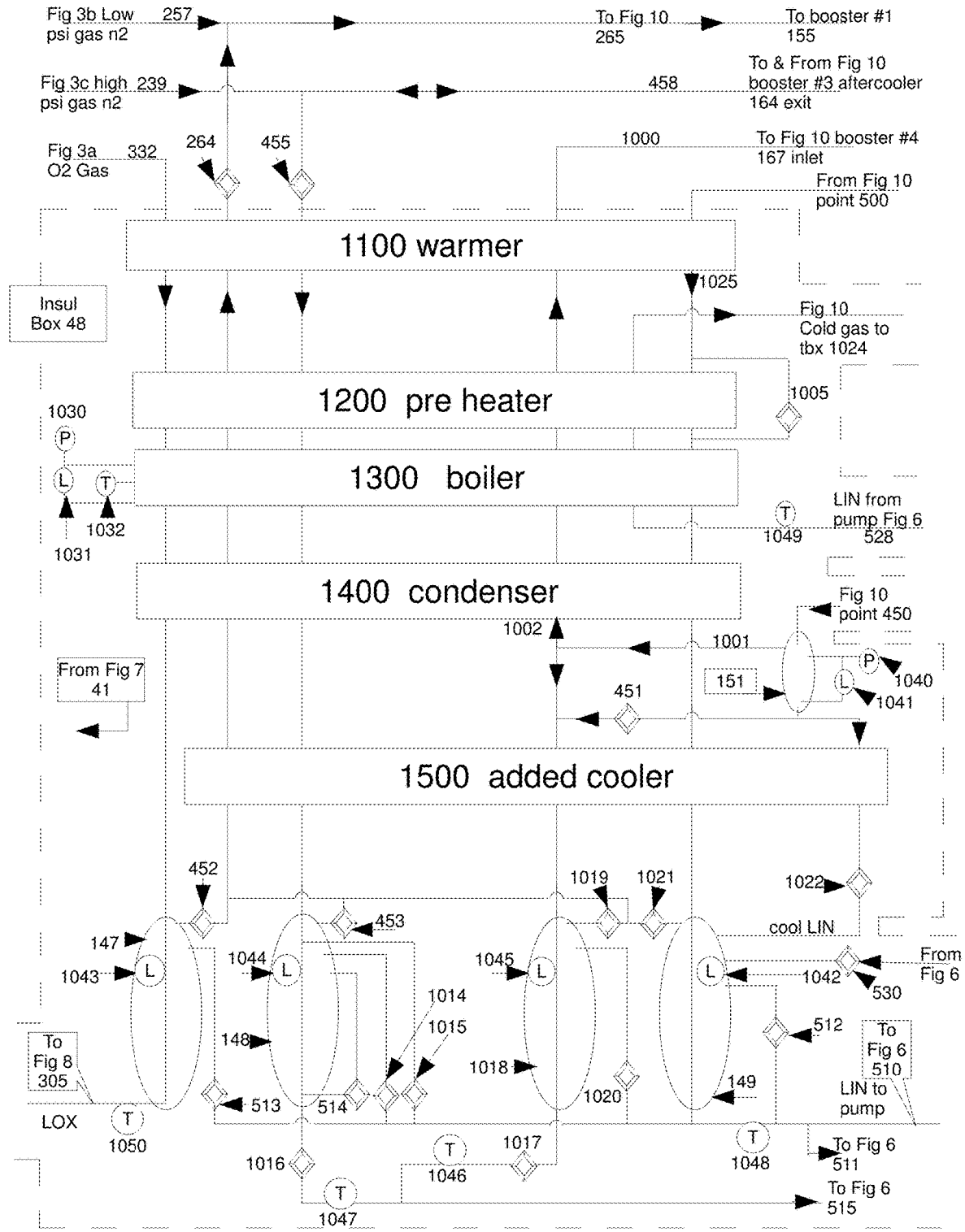
FIG. 9 is a schematic diagram of the heat exchangers of another embodiment of the liquefier device of the present invention.
Figure 10:
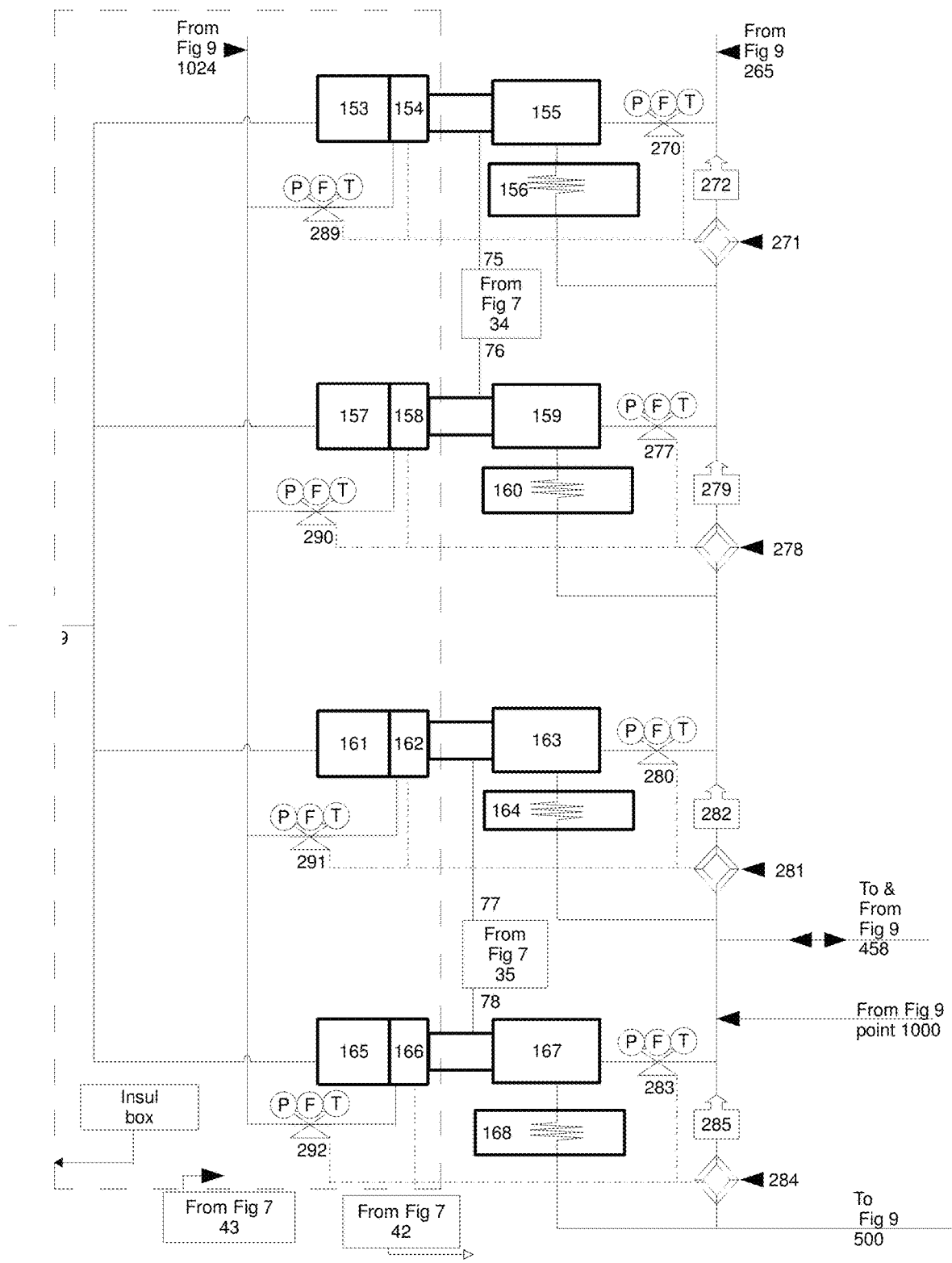
FIG. 10 is a schematic diagram of the turbine and booster system of the embodiment of the liquefier device shown in FIG. 9.

FIGS. 9-10 illustrate another embodiment of the liquefier device heat exchangers and turbine package of the present invention. In this embodiment, there is a reduction in the turbine booster overall flows, which will further reduce the cost of running the turbine expanders and boosters. In addition, a smaller turbine and booster can be used. By taking the flow of high-pressure column nitrogen gas from the air separation unit via inlet piping system point 239, FIG. 3c and combining this flow with a flow exiting the third turbine booster connected in series, and then directing the combined flow through an auto pressure control valve 455 and a pass through the heat exchangers 1100, 1200, 1300, 1400, 1500 from the warm side, with a change of phase in the condenser 1400, into the nitrogen production flash pot 148, and then joining another line coming off of the auto control valve 1015 in a single tube bank such that both flows will exit flash pot 148 as a subcooled liquid nitrogen which passes through control valve 1016 and across temperature sensor where the temperature is logged. This subcooled liquid nitrogen will combine with another flow of subcooled liquid nitrogen from a load control nitrogen flash pot tube side exit 1018 through a valve pressure reduction 1017 and across temperature sensor 1046 where the temperature is logged, then the combined flow goes to the nitrogen low pressure storage tank, FIG. 6 point 515. In this embodiment, there is no need to boost the pressure of the flow of the high-pressure column nitrogen gas from the air separation unit from point 239, FIG. 3c any higher, as it can be liquified at the exiting pressure. Also, the exit pressure of the flow out of the third booster is the same as the high-pressure column nitrogen gas inlet flow from the air separation unit. This is another way to unload the last turbine booster connected in series, which will also unload the turbine expander side. At times, the daily ambient temperature will vary higher and lower, which will lead to loading or unloading the last turbine. The last turbine will be designed to normally run at about 85% full load.

In FIG. 9, a low-pressure gas nitrogen stream from the warm side of the main heat exchanger of the air separation unit comes into the liquefier device in an inlet line at point 257, FIG. 3b. The inlet line containing the low-pressure gas nitrogen stream from point 257, FIG. 3b joins another line containing a low-pressure gas nitrogen flow coming off of the warm side of counter current flow heat exchanger or warmer 1100, after passing through an auto pressure control valve 264. The combined or joined flow of low-pressure nitrogen gas then connects in a line to an inlet to the first turbine booster 155 arranged in series, FIG. 10, point 265. An oxygen gas stream from the air separation unit comes into the liquefier device in an inlet line from point 332, FIG. 3a. The inlet line containing the oxygen gas stream enters the liquefier box directly into the warm side of warmer 1100 and exits the cold side. A high-pressure gas nitrogen stream from the air separation unit comes into the liquefier device in an inlet line from point 239, FIG. 3c. This inlet line containing a high-pressure gas nitrogen stream will join a line containing a high-pressure gas nitrogen flow coming to and from point 458, FIG. 10 and connecting to an exit line containing a nitrogen gas flow from turbine booster aftercooler 164 after passing through turbine booster 163. This combined high-pressure gas nitrogen flow is connected to pass in a line containing auto pressure control valve 455 into the warm side of the warmer 1100.

In the exemplary embodiment, starting with the oxygen flash pot 147, the oxygen gas coming from the air separation unit (ASU) is running about 37° F. with about 5.2 PSIG. This oxygen gas will enter the warmer 1100 warm end and exit the cold end at −184° F. Then, the oxygen gas flow will enter the preheater 1200 warm side at −184° F., and exit this heat exchanger at −240° F. The flow of oxygen gas will enter a tube bank of the boiler 1300 at −240° F. and exit at −250° F. The oxygen gas flow will then enter the warm side of the condenser 1400 at −250° F. and exit the cold side at −285° F. The flow of oxygen gas will then enter the oxygen production flash pot 147 at −285° F., where it will condense to a liquid, and then be subcooled to about −300° F. The oxygen production flash pot 147 will have to be about 15 feet higher than the liquid oxygen line coming from the ASU to the storage line to give it a hydraulic boost to join the line after the oxygen filter that exits to the oxygen storage tank. The condensing action will come from the liquid nitrogen bath in the oxygen production flash pot 147. This liquid nitrogen bath is supplied in the line containing valve 513 connecting from the liquid exit of the nitrogen pump flash pot 149 exit, and will enter the oxygen production flash pot at −310° F. This liquid nitrogen will form a bath and the level will be monitored by level controller 1043, and the liquid nitrogen will vaporize as the liquid oxygen is being condensed. The vaporized nitrogen gas will exit to an auto pressure controlling valve 452. The exiting vaporized nitrogen gas will exit the oxygen production flash pot at −310° F. The exit of the pressure control valve 452 will enter a joined low pressure gas nitrogen line coming from the other flash pots 148, 149, and 1018 after passing through nitrogen pressure control valves 453, 1019, and 1021, respectively.

The vaporized joined nitrogen gas from flash pots 147, 148, 149, and 1018 will pass through exit pressure control valves 452, 453, 1919, and 1021 and then enter the added cooler cold side at about −310° F., then will exit to the condenser 1400 cold side at about −285° F. At the warm side exit of the condenser 1400 this low-pressure nitrogen gas flow will be at −250° F. The low pressure gas nitrogen will then enter a tube bank in the boiler 1300. At the exit of the boiler, the low pressure gas nitrogen should be −250° F. showing no temperature change. The low pressure nitrogen stream then enters the cold side of the preheater 1200, and exits at about −186° F. The low pressure nitrogen gas stream then enters the cold side of warmer 1100 at about −186 OF, then exits to auto pressure control valve 264 at a temperature close to the temperature of the flow at point 500 from FIG. 10 to the warm side entry to warmer 1100. This temperature is close to 90° F. The low pressure gas nitrogen that is pressure regulated by valve 264 will blend with a low pressure gas nitrogen coming from FIG. 3b, point 257, and the combined flow will go to FIG. 10, point 265.

The next flow is the high pressure column gas nitrogen coming in at point 239, FIG. 3c. At a location close to the insulated box 48, the flow is joined with a flow in a line at point 458, from FIG. 10, from the exit of booster aftercooler 164. This joined flow from point 458 can go either into the warm side of the warmer 1100 or to the turbine boosters and is a balance point depending on the heat of the day. Higher heat will affect the pressure at the turbine booster inlets, and in response the computer control system will open auto pressure controller valve 455 further. On normal running the flow will come from both points 239 and 458, although the flow from point 239 will be the larger amount of the flow. The combined flow will enter auto pressure control valve 455 at about 60° F., which flow then enters the warm side of warmer 1100, and exits the cold side at about −184° F.

The combined high pressure flow then enters the warm side of the preheater 1200 at about −184° F. and exits the cold side at about −240° F. The combined high pressure flow then enters a tube bank inside of the boiler 1300, and at the exit of the tube bank the temperature should be −250° F. The combined high pressure flow then enters the warm side of the condenser 1400, and at the exit the The combined high pressure flow then enters the warm side of the pre heater 1200 at about ~ 184° F. and exits the cold side at about −240° F. The combined high pressure flow then enters a tube bank inside of the boiler 1300, and at the exit of the tube bank the temperature should be −250° F. The combined high pressure flow then enters the warm side of the condenser 1400, and at the exit the temperature should be −280° F. and now a two phase liquid and gas stream. The combined high pressure flow then enters the warm side of the added cooler 1500 at a temperature of close to −280° F. and exits at about −300° F. as a single phase liquid, still needing sub cooling. The combined high pressure flow then enters the tube side of the nitrogen production flash pot 148, which flash pot has a nitrogen bath at low pressure. The single phase liquid nitrogen flow enters at about −300° F. and exits at about −315° F. holding about 60 PSIG. This is cold enough to put into a one PSIG nitrogen storage tank without a lot of gas off.

In FIG. 9 a flow at point 1001 from the turbine phase separator 151 feeds a branch line at point 1002 that goes to the condenser 1400 on the cold side, which flow will exit the warm side. The flow then enters one of five tube banks inside the boiler 1300. At the exit of this flow's boiler tube bank, it then connects to enter the cold side of the preheater 1200 and then exits the warm side which feeds to the cold side of the warmer 1100. The flow then exits the warm side of warmer 1100 and is sent to the point 1000, FIG. 10. Also in FIG. 9, from point 500, FIG. 10, there is a pressurized nitrogen gas flow to the warmer heat exchanger 1100 warm side. This flow exits the cold side of heat exchanger 1100 at point 1025 to a branch line. One side of the branch line is to an auto temperature controller bypass valve 1005, while the other branch line enters the warm side of preheater 1200. Bypass valve 1005 will add more heat to the boiler 1300 if needed.

Referring still to FIG. 9, a line containing a flow of gas coming from FIG. 10, point 450 connects from an exit of the turbine expanders to an inlet into turbine exhaust phase separator 151. A line containing a flow of exhaust nitrogen gas at point 1001 connects from an exit of turbine exhaust phase separator 151 to a branch line, with one branch side connecting into the cold side of condenser at point 1002, and the other branch side connecting to a flow exiting from auto level controller valve 451, which joined flows are directed into the warm side of added cooling heat exchanger 1500, or added cooler. This combined flow to the added cooler 1500 is a cold nitrogen gas and will change to a two-phase flow inside the added cooler 1500. The two-phase flow will exit the added cooler 1500 on the cold side and then enter a tube bank of load control flash pot 1018 to produce liquid nitrogen. The load control flash pot 1018 will be oversized and will be set up to condense 40% of the total gas flow coming off the turbine exhaust phase separator 151 from point 1001. At the exit of the tube bank of load control flash pot 1018, the liquid nitrogen is subcooled enough to be depressurized down to a pressure of one PSIG with very low flash loss. The tube side will exit to control valve 1017 where there will be a pressure loss, then the temperature will be logged by 1046, now joining the exit of valve 1016 with temperature logged by 1047 going to the nitrogen storage tank, line 515, FIG. 6.

A flow of nitrogen gas at point 1002 in the other branch side is directed into condenser 1400 on the cold side and exits on the warm side. The branch then is connected to pass the flow of nitrogen gas from point 1002 into one of five tube banks inside boiler 1300. At the exit of this boiler tube bank, the line then connects into the cold side of preheater 1200, and then at the exit of preheater 1200 on the warm side to the cold side of warmer 1100. The flow exits the warm side of warmer 1100 in a line at point 1000 which connects to an inlet line to the last turbine booster 167 connected in series, shown in FIG. 10. Also in FIG. 10, a pressurized nitrogen flow in a line exiting aftercooler 168 after passing through the last turbine booster 167, reference FIG. 10 to FIG. 9, point connects to the warm side of warmer 1100. This line exits the cold side of warmer 1100 at point and then as indicated above branches to a line into the warm side of preheater 1200, and another line including a bypass auto temperature controller valve 1005 which connects back to the other branch line upon exiting the cold side of preheater 1200.

Warmer 1100 in the exemplary embodiment is a multi-pass counter current flow heat exchanger comprising five passes. One pass is the flow of low-pressure gas oxygen in the inlet line from FIG. 3a, point 332, that enters on the warm side and exits on the cold side. Another pass is the flow of low-pressure gas nitrogen in the line that enters on the cold side and exits on the warm side and connects to the inlet line of low pressure gas nitrogen from FIG. 3b, point 257 after passing through valve 264 on the warm side. Another pass is the combined flow of high-pressure gas nitrogen in a line connecting from high-pressure gas nitrogen inlet line, FIG. 3c, point 239 and from the turbine booster 163 and aftercooler 164, point 458, FIG. 10 that enters on the warm side after passing through valve 455 and exits on the cold side. Another pass is the gas nitrogen flow from the branch at point 1002 that as described above enters the cold side of condenser 1400 to the warm side, then enters one of the five tube banks in the boiler 1300 and exits to the warm side, and then enters to the cold side of pre heater 1200 and exits the warm side, then enters to the cold side of the warmer 1100 and exits to the warm side in a line at point 1000 to the inlet line to turbine booster 167. Another pass is the pressurized nitrogen from FIG. 10, point 500 to the warm side of the warmer 1000 that exits to the cold side shown at point 1025. The main purpose of warmer 1100 is to process flows having multi-inlet temperatures close to ambient and multi-pressures on the warm side so that the flows exit the cold side at about −180° F., and so that on the cold side nitrogen gas enters at about −185° F. and exits on the warm side at Ambient temperatures.

Preheater 1200 in the exemplary embodiment is a multi-pass counter current flow heat exchanger with six passes. Three passes enter preheater 1200 on the warm side at a temperature of about −180° F. and exit on the cold side at about −245° F., and three passes enter pre heater 1200 on the cold side at about −250° F. and exit the warm side at about −185° F. As discussed above, there is also a bypass line around preheater 1200 from point 1025 containing bypass auto temperature controller valve 1005. The purpose of the bypass line is to enable the liquefier device control system to monitor and control the temperature of cold nitrogen gas exiting the preheater warm side in a line connecting to the turbine expanders, point 1024, FIG. 10. Bypass auto temperature control valve 1005 controls the bypass line and is set to hold the temperature of this cold nitrogen gas at around −184° F. ±2° F. The valve 1005 will be controlled by the average temperature of the mass flow sensors 289, 290, 291, and 292 in inlet lines to the turbine expanders 153, 157, 161, and 165, in FIG. 10. The action of the bypass valve 1005 is to open if the flow warms and to close if the flow is too cold, wherein the amount of movement will ordinarily be small to open or close, with no major moves.

Boiler 1300 in the exemplary embodiment is a shell and five-tube bank heat exchanger, wherein as illustrated diagrammatically in FIG. 9 the shell side holds a liquid nitrogen bath with a level controller 1031, a temperature sensor 1032, and a pressure sensor 1030. Liquid nitrogen is supplied by the nitrogen pump system described above with reference to FIG. 6, in a line containing inlet temperature monitor 1049 connecting from point 528, FIG. 6 to the boiler 1300, FIG. 9. There are five tube banks inside the exemplary boiler 1300, which will be set to either condense a little gas or boil a lot of liquid. Oxygen gas moving through one of the tube banks is from the oxygen gas stream in the inlet line from point 332, FIG. 3a after passing through warmer 1100 and preheater 1200 from the warm side to the cold side. This oxygen gas pass is a heat pass to the boiler 1300 and the tube bank will be located in the bottom of the boiler 1300 covered by liquid nitrogen. Another pass is the combined flow of high-pressure gas nitrogen from the inlet line from point 239, FIG. 3c and from point 458, after passing through warmer 1100 and pre heater 1200 from the warm side to the cold side, which has a tube bank that is a heat flow to the boiler 1300 and will also be located on the bottom of the boiler 1300 covered by liquid nitrogen. Another tube bank receives the pressurized gas nitrogen flow from the point 1025, after passing through warmer 1100 and preheater 1200 from the warm side to the cold side, which comprises the largest heat flow to the boiler 1300 and will also be covered by the boiler's bath. There are two tube banks which will not be covered by the bath of liquid nitrogen. One contains the low-pressure gas nitrogen from flash pots 147, 148, 149, and 1018 which is in its own tube bank which is not covered by the liquid nitrogen bath due to its cold gas which will now condense the just boiled gas. The other tube bank not covered by the liquid nitrogen bath is the flow from point 1002 which contains exhaust gas from the turbine exhaust phase separator 151 to point 1001 then to point passing through the condenser 1400 from the cold side. This tube bank will be on the top of the boiler 1300 and will condense a small amount of gas back to liquid. Not all of the tube banks will cause the boiler to boil, but the presently described arrangement will allow larger flow upsets without massive over shooting of the pressure or temperature.

Condenser 1400 in the exemplary embodiment is also a multi-pass counter current flow heat exchanger, wherein the temperature of the warm side will be set to run at about −250° F., and the temperature of the cold side will be set to run at about −287±5° F. Condenser 1400 comprises five passes, three of which provide heat to the exchanger, and two of which are cooling passes. The major cooling flow to the condenser 1400 comes from the turbine phase separator 151 in the line from point 1002. Another pass is the gas oxygen from point 332, FIG. 3a after passing through the warmer 1100, preheater 1200, and boiler 1300 from the warm side to the cold side. This oxygen gas pass through the condenser 1400 from the warm side has to be sloped higher on its exit than its entry in order to stop a possible flooding of liquid oxygen, as the exit pipe to the flash pot 149 will be elevated about 15 feet. The condenser 1400 has to be placed at a higher elevation than the flash pots 148, 1018, and 149 with the passes sloped to the added cooler 1500 to prevent flooding.

Another pass contains the low-pressure gas nitrogen from valves 452, 453, 1019, and 1021 of the flash pots 147, 148, 149, and 1018 after passing through the added cooler 1500 from the cold side to the warm side. Another pass is the combined flow of high-pressure gas nitrogen from the inlet line from point 239, FIG. 3c and from point 458, after passing through warmer 1100, preheater 1200, and boiler 1300 from the warm side to the cold side. Another pass is from FIG. 10, point 500 to the warm side of the condenser 1400 after passing through warmer 1100, preheater 1200 with a bypass valve 1005, and boiler 1300 from the warm side to the cold side as shown.

As indicated, the turbine phase separator 151 receives a very cool nitrogen gas flow in a line from point 450, FIG. 10 exiting the turbine expanders. This flow is near its vapor pressure point at the exit of the turbines. Due to piping turbulence and a minor drop of pressure in this line, the cool nitrogen gas flow will develop droplets that can be removed from the flow, sometimes in quantities of more than 200 gallons per hour. The turbine phase separator 151 has a liquid level sensor 1041 that will control two valves. One is valve 1022 in a line exiting the turbine phase separator 151, that has a shared signal with level sensor 1042 in nitrogen pump flash pot 149. A full level signal from level sensor 1042 will cause the control system for the liquefier device to close valve 1022, and a low level at liquid level sensor 1041 will also signal valve 1022 to close. The second valve is valve 451, which is controlled by the liquid level controlled by liquid level sensor 1041. Valve 451 is called open when liquid level sensor 1041 shows about 75% full and will close again when liquid level sensor 1041 shows about 60% full.

Added cooling heat exchanger or added cooler 1500 is another multi pass counter current flow heat exchanger which in the illustrated embodiment has five passes. Added cooling heat exchanger 1500 will be positioned at a higher elevation than the top of the flash pots 147, 148, 149, and 1018 but at a lower elevation than the condenser 1400. The warm side of added cooler 1500 is running at a temperature of about −287±5° F. and the cold side is running at a temperature of about −318±5° F. All the passes of added cooler 1500 must be sloped to the flash pots to prevent flooding. One pass to the cold side of added cooler 1500 contains the low-pressure gas nitrogen from valves 452, 453, 1019 and 1021 of the flash pots 147, 148, 149, and 1018. Another pass to the warm side of added cooler 1500 contains the combined flow of high-pressure gas nitrogen from the inlet line from point 239, FIG. 3c and from point 458, after passing through warmer 1100, preheater 1200, boiler 1300, and condenser 1400 from the warm side to the cold side. Another pass is from FIG. 10, point 500 to the warm side of the added cooler 1500 after passing through warmer 1100, preheater 1200, boiler 1300, and condenser 1400 from the warm side to the cold side as shown. Another pass to the warm side of added cooler 1500 is from the branch containing the joined flow of cold nitrogen gas from point 1001 and from auto level controller valve 451. Another pass to the warm side of added cooler 1500 is a line from phase separator 151 to pump flash pot 149 containing valve 1022.

Oxygen production flash pot 147 in the exemplary embodiment has a shell and tube bank design. The shell side is holding a liquid nitrogen bath, and the level of this liquid nitrogen bath is controlled by a liquid sensor 1043. Auto level control valve 513 in a line connecting from nitrogen pump flash pot 149 exit responds to the level set point of the liquid sensor 1043. There is a temperature sensor 1050 located in a line at the exit of the tube side of the oxygen production flash pot 147. This temperature sensor 1050 is used by the control system to adjust the oxygen production flash pot shell side exit gas pressure by adjusting exit gas valve 452. Opening the exit gas valve 452 will lower the pressure, causing the liquid nitrogen bath shell side to run colder. If there is a larger surface coverage, the liquid in the tube side of the oxygen production flash pot will hit a more stable and colder exit temperature. Due to the just formed liquid oxygen in the tube side of the oxygen production flash pot 147 being at a low pressure, the oxygen production flash pot 147 will need a hydraulic head pressure to join at the exit of the oxygen filter house, shown in FIG. 8. This is done by raising the oxygen production flash pot 147 at least fifteen feet higher than the oxygen filter house. In addition, being that the oxygen production flash pot 147 is now higher than the condenser 1400, the gas oxygen in the line must not condense to liquid droplets until it makes its way into the tubes of the oxygen flash pot 147. If the gas oxygen condenses prior to the oxygen production flash pot 147, the line or pipe feeding the gas oxygen will flood back into the condenser 1400.

High pressure gas nitrogen exiting the cold side of the added cooler 1500 enters the nitrogen production flash pot 148 tube side as a two-phase gas liquid stream. The nitrogen production flash pot 148 in the exemplary embodiment is a shell and tube design having a liquid nitrogen shell side. The high-pressure nitrogen gas is located in the tubes, and inside the shell another flow will join the high pressure nitrogen flow from auto level controller 1015. A shell side liquid nitrogen bath will boil away to gas as the high-pressure gas nitrogen is condensed to a single-phase liquid. The shell side liquid nitrogen bath is monitored by a liquid level sensor 1044. If the liquid level sensor 1044 detects that the liquid nitrogen bath level is at about 65% of its max filled level, the liquefier device control system will open valve 1014, while if the liquid level sensor 1044 detects that the liquid nitrogen bath level is at about 75% full level, the control system will close valve 1014. If the nitrogen bath level falls below 60%, then the control system will open valve 514, and valve 514 will be closed when the nitrogen bath level rises to about 70% full level. The exit temperature of the high-pressure nitrogen now liquid exiting production flash pot 148 is monitored by a temperature sensor 1047, which temperature sensor 1047 will control the shell side gas of take valve 453. As valve 453 removes more pressure from the shell side of the production flash pot 148, the exiting high-pressure nitrogen which is now liquid will be further subcooled. There is a pressure control on the liquid nitrogen storage tank which opens the vent on the storage tank, which vent should not open a lot. The temperature recorded on temperature sensor 1047 should be set to react colder or warmer depending on the storage tank venting. In addition, the storage tank should run at about one pound of pressure and never below 0.5 PSIG. Therefore, this temperature sensor 1047 should have a set point to control the nitrogen storage tank vent valve 583, FIG. 6. Valve 538 opening and closing is logged.

Load control flash pot 1018 in the exemplary embodiment is also a shell and tube design. A branch line off of the turbine phase separator 151 with a possible flow from branch line flow off of the auto level control valve 451 is directed to the added cooling heat exchanger 1500 warm side, and then to the tube side of the load control flash pot 1018. The shell side of load control flash pot is holding a liquid nitrogen level, which level is sensed by the level sensor 1045. As the gas in the tubes is condensed to a single-phase liquid, the liquid on the shell side will gas off, which gas will be removed through the valve 1019 to the low pressure gas nitrogen line. There is a temperature sensor 1046 on the exit of the newly formed subcooled liquid nitrogen line. Temperature sensor 1047 will be the major controller over temperature sensor 1046, so that whatever temperature sensor 1047 sees as a tank vent controlling temperature then temperature sensor 1046 will adjust to that temperature by venting the flash pot 1018 shell side more or less through valve 1019. Valve 1020 is in a line connected to replenish the shell side liquid nitrogen level of load control flash pot 4081018, which liquid nitrogen level is sensed by level controller 1045.

Nitrogen pump flash pot 149 in the exemplary embodiment is a shell and tube design with the shell holding a replenishing liquid nitrogen level controlled by a level sensor number 1042. The level is replenished by three valves 1022, 530, and 512. On starting one of the nitrogen pumps and 170 in FIG. 6 there is a need to prime the pump, just after the liquid sensor 1042 shows a level of 20%. The priming of the pump is done by opening the pump discharge valve 530 to a lower pressure being the shell side of the pump flash pot 149. After the boiler level sensor number 1031 sees a 5% level then the pump is said to be primed and valve 530 will close. During the priming stage, the liquid level sensor 1042 will close valve 512 and allow valve 1022 to feed if it can but the level can never be allowed to exceed 90% full. At 90% full all replenishing valves are to be closed. The pump priming will have to go to the boiler on a normal path if the nitrogen pump flash pot 149 shows a 90% shell side level. When the shell side of nitrogen pump flash pot 149 shows a level on 1042 to be below 70% then valve 512 will add liquid nitrogen to the flash pot 149 and stop at 75%. Valve 1022 will normally be open under a control signal from two level controllers being 1042 (to a max 90% then close) and 1041 (close at 10% level seen on turbine phase separator vessel 151). If valve 1022 is signaled to close and the pump flash pot 149 is below 90% full, and the pump is not priming then valve 512 will start to open at 70% level seen on level sensor 1042. This pump flash pot shell side will have a normal liquid level of 80%. The tube side of pump flash pot 149 contains the pressurized gas nitrogen flow, which flow is coming off of the added cooling heat exchanger 4$4-1500 as a two phase mostly gas with a little liquid nitrogen in its stream. This stream will change to a subcooled liquid nitrogen stream at the exit of the tube side of the nitrogen pump flash pot 149. The exit of the tube side of pump flash pot 149 has a temperature monitor 1048, which temperature will be controlled by the gas pressure of the shell side liquid nitrogen bath. The shell side of the pump flash pot 149 has a venting valve 1021 that is controlled by the temperature monitor 1048, where the venting valve 1021 will reduce the temperature as it further opens or will raise the temperature by being further closed, but should never totally close unless there is a safe warm shut down. The temperature of subcooled liquid nitrogen on the temperature monitor 1048 must be set to hold a running temperature that when the liquid nitrogen is pumped to the boiler 1300 the inlet temperature monitor 1049 of the liquid nitrogen is within ±5° F. to the boiler running temperature seen on monitor 1032.

Referring now to FIG. 10, point 1024 from FIG. 9, this line contains the cool gas nitrogen stream coming off of the warm side of the preheater 1200. This cool gas nitrogen stream should be about −184±2° F. and is directed to temperature, pressure, and flow sensors 289, 290, 291, and 292 for each turbine. The inlet pressure to all turbines will be about 400 PSIG. There is also a guide vane 154, 158, 162, 166 to each turbine expander 153, 157, 161, and 165, respectively, that will control the turbine speed and flow. The exit pressure from the turbine expanders is about 60 PSIG holding −287±5° F. An exit manifold will direct all of the exhausting gases in a line to point 450, FIG. 9, which as indicated above is connected to the turbine phase separator 151.

The line from point 265, FIG. 9, contains the joined ambient temperature low pressure gas nitrogen flow. This low pressure gas nitrogen flow, now on FIG. 10, will combine with the flow through surge control valve 271 and check valve 272 if it is in an active mode, and is directed to inlet temperature pressure flow sensor 270 in a line connecting into turbine booster 155. The boosted flow will exit to the booster aftercooler 156. Out of the booster aftercooler 156 the flow branches off to the surge control valve 271 or to the next turbine booster 159 connected in series. Prior to the inlet of turbine booster 159 there is a possible gas return from the surge control valve 278 that goes through check valve 279 to the turbine booster inlet temperature pressure flow sensor 277, then to the turbine booster 159, exiting the booster 159 to the turbine booster aftercooler 160. At the exit of the turbine booster aftercooler 160 the flow will branch to the surge control valve 278 and to the next booster 163 connected in series. At the inlet to turbine booster 163 there is a possible flow from the surge control valve 281 through the check valve 282 which joins the flow off of booster aftercooler 160, which flow now will go into a line containing temperature pressure flow sensor 280 which is an inlet to the booster 163. At the exit of the booster 163 the flow goes though the booster aftercooler 164. The exit flow from booster aftercooler 164 will branch to the surge control valve if needed, or to the next booster 167 connected in series. Some of this flow to booster 167 can also be stripped off or added through the line to and from point 458, FIG. 9. If the nitrogen production flash pot 148 is adjusted to condense less, then the flow to valve 455 will be less, and the high pressure nitrogen gas inlet flow from FIG. 3c, point 239 will go to point 458 and more flow will go to the last booster 167 inlet. When the flash pot 148 is able to condense more flow not needed to the booster 167 then valve 455 will draw the flow. When the surge controller across booster 167 opens valve 284 then there is normally too little flow to the inlet of the booster 167. In addition, a large flow will be added to the line to the next booster 167 from point 1000, FIG. 9. If the surge control valve 284 is called into action, a flow of gas will go through check valve 285. Any flow from the aftercooler 164 not used by the surge control valve 281, plus any flow from the point 458, plus the flow from point 1000, plus the flow from the surge control check valve 285 will go into the temperature pressure flow sensor 283, then to booster 167, and then to booster aftercooler 168. At the exit of booster after cooler 168, the flow splits to the surge controller 284 or goes to point 500, FIG. 9.

The flow from the FIG. 10, point 450 is a super critical flow that exits the turbines as a gas that is at a temperature and pressure within a degree OF or two from condensing to a liquid. As the flow moves down a short exit pipeline, the flow experiences a slight pressure drop, and turbulence in the flow causes liquid condensation to form inside the pipe. This flow may comprise over 200 gallons per hour of liquid nitrogen. As indicated above, this flow is connected to enter into a phase separator 151 where the liquid nitrogen is separated and will fall to the bottom of the phase separator for use later. Nitrogen gas in this flow will be stripped off the top of the phase separator 151 to point 1001, FIG. 9. This separated gas from point 1001 will go to a header that branches off to two places. One place the separated gas from point 1001 will go is in a line to point 1002 into the condenser 1400, then into the boiler 1300, preheater 1200, and warmer 1100. The separated gas is then directed in a line connecting to a so-called "pressure zone" in the line connecting between an exit of the second to last booster aftercooler 164 and the inlet to the last turbine booster 167. This pressure zone has a changing pressure due to ambient temperature changes. As the pressure increases, the second flow off of the phase separator 151 at point 1001 into the added cooler 1500 comes into action. This second flow will pick up any additional flow exiting from valve 451 and enter the warm side of the added cooler 1500. At the exit of the added cooler 1500 cold side, the second flow will enter the tube side of the load control flash pot 1018. The load control flash pot 1018 is a shell and tube design where the gas exit of the added cooler 1500 cold side enters the tube side of flash pot 1018. The shell side has a low-pressure liquid bath used to condense the gas to a subcooled liquid before it exits. The exiting liquid nitrogen joins the nitrogen production flash pot 148 tube side exiting liquid nitrogen, and the combined flow is directed to the low pressure liquid nitrogen storage tank.

From the liquid nitrogen pump system illustrated in FIG. 6, liquid nitrogen in line 528 connects to the shell side of the boiler 1300 in FIG. 9, point 528. There is a temperature sensor 1049 in this line. The shell side of boiler 1300 has a liquid nitrogen level indicated on level sensor 1031, and a temperature indicated on temperature sensor 1032. These two sensors 1031 and 1032 help control the nitrogen pumping operation used to feed the boiler 1300 with the right amount of liquid nitrogen. There is also a pressure sensor 1030 on the boiler 1300, which is used to better guide the withdrawal of gas from boiler 1300 to the turbines.

Liquid nitrogen from the pump system is fed into the boiler 1300 as a replenishment of liquid boiled away. In order not to disrupt the boiling action, temperature sensor 1032 will be used to control the pump flash pot shell side liquid level, and a change in temperature will be seen on the liquid nitrogen inlet to the boiler 1300 seen on temperature sensor 1049. There needs to be a coordinated temperature between sensors 1049 and 1032 by moving the liquid level of the nitrogen pump flash pot 149 higher or lower. The level of liquid inside the flash pot shell side will change the quantity of liquid on the tube side, the temperature of the liquid is due to the shell side pressure.

As the boiler 1300 is in action, a nitrogen gas is produced off of the liquid nitrogen. This gas will exit the upper side of the boiler and is connected to enter the preheater 1200 on the cold side. This nitrogen gas must be preheated prior to entering the turbines, since if the gas was not preheated, it would recondense back to a liquid in the turbines due to a rapid decompression across the turbine wheel, which would destroy the turbine wheel. The preheater 1200 needs to warm the boiler exiting gas to about −184±4° F. This temperature will be recorded at each turbine inlet by a mass flow sensor 289, 290, 291, 292. If the temperature goes warmer, then the flow across auto temperature controller valve 1005 connecting from point 1025 and bypassing the preheater 1200 will open guided by the mass flow sensor on the inlet to the turbines.

There will be liquid nitrogen at the bottom of the turbine exhaust phase separator 151 if the pressure to the turbine inlet is high enough and temperature is low enough. The liquid nitrogen that is found in the turbine exhaust phase separator 151 is detected by the liquid sensor 1041 and the pressure is determined by sensor 1040. As a liquid nitrogen level is seen on liquid sensor 1041, an auto level controller valve 1022 can open causing a flow of liquid nitrogen to travel through the added cooler 1500 to the shell side of the nitrogen pump flash pot 149. The auto control valve 1022 will have two control signals, namely, liquid sensor 1041 to indicate that liquid nitrogen in the phase separator 151 is available, and sensor 1042 shell side of the pump flash pot 149 to indicate there is too much liquid in the pump flash pot 149. If the liquid nitrogen level inside of the phase separator 151 starts to rise past 50% full, then auto liquid control valve 451 will start opening to slowly drain excess liquid to the load controller flash pot 1018.

Oxygen production flash pot 147 is a shell and tube heat exchanger having a shell side and a tube side. The shell side holds a liquid nitrogen bath of low pressure, and the liquid nitrogen will boil away and be replenished based on the level detected by an auto level control valve 513, which level is seen on sensor 1043. As the oxygen production flash pot 147 is in action nitrogen gas off will exit the top, which as indicated above is piped to auto temperature control valve 452, which valve gets its signal from temperature sensor 1050. The vent valve on the liquid oxygen storage tank is an indication of the temperature of the tank, and if the tank is warm then the vent stays open. The vent on the liquid oxygen storage tank therefore will be monitored by the computer control system. If the oxygen storage tank is too warm, then the shell side of the oxygen production flash pot 147 liquid nitrogen level needs to rise a little and the exit pressure needs to be reduced until the oxygen storage tank vent only opens every now and again. It is very possible to make the oxygen storage tank go into a vacuum, which is very bad to do, as this will pull in air and contaminate the tank. The storage tank is at one PSIG.

Nitrogen production flash pot or vessel 148 is a shell and tube heat exchanger. The shell side holds a liquid nitrogen bath of low pressure, and the liquid nitrogen will boil away and be replenished. The shell side of production flash pot 148 has two liquid feed lines. One feed line is from the tube side of the nitrogen pump flash pot 149 exit having valve 1014 in the feed line. The other feed line contains valve 514 and is a return to the just cooled tube side to the shell side. The shell side gas off is to valve 453 to control the liquid nitrogen bath temperature. The tube side of the nitrogen production flash pot 148 has two feeds. One feed line is from the exit of the pump flash pot tube side through valve 1015, and the other feed line contains the flow exiting through valve 455. The feed through valve 1014 is the preferred, while the flow through valve 514 is the coldest liquid nitrogen for this vessel. The liquid nitrogen level sensor for this vessel is indicated by reference numeral 1044. As the nitrogen production flash pot 1048 is in action, the gas off will exit the top, and is piped to an auto temperature control valve 453, which valve gets its signal from temperature sensor 1047. This is a shell and tube heat exchanger with a shell side holding a bath of liquid nitrogen.

In this system, the gas off each flash pot will all go to a header. Valve 452 will control the exit pressure of flash pot 147, valve 453 will control the pressure in the flash pot 148, valve 1019 will control the pressure in the flash pot 1018, and valve 1021 will control the pressure in the 449 flash pot 149. Pressure control valves 452, 453, 1019, and 1021 control the shell side liquid nitrogen baths, and this gives an exit temperature on the tube side for the flows' next step. All of the low pressure gas exiting the flash pot's shell side goes to the common header, then to the cold side of the added cooler 1500. After passing through all of the heat exchangers and boiler the gas stream exits to valve 264. The flow from FIG. 3b, line 257 is a low pressure nitrogen stream that will combine with the exiting flow of the valve 264, and all of the flow will go to the inlet of the first turbine booster. The turbines are used to produce a lowered exit gas pressure and a temperature close to its liquid phase. The turbine side is coupled to a booster as a braking action stopping the turbine from spinning wildly out of control. Thus, a large supply of very cold gas is required to make all the liquid. The speed of the turbines in the exemplary embodiment is controlled by the boosters. The boosters will take in a gas and compress the gas so it can be reused again. Once the cold temperature is warmed up back to ambient conditions, and the power of the pressure is close to ambient pressure, it could be just thrown away, but here the turbine booster will be used to bring the pressure back up, the aftercooler will remove the heat of compression down to +10° F. of ambient temperature. The present invention therefore provides a system wherein the nitrogen can be used over and over again.

Regarding the high pressure gas nitrogen inlet flow to the third turbine booster aftercooler 164 exit, the gas off the main heat exchanger of the ASU comes off at below ambient temperatures, but with pressure. The gas from the high pressure column of the ASU has about 60 to 80 PSIG pressure. This is sent to the take or vent system in FIG. 3c, then to FIG. 9, point 239, and the gas now has enough pressure to be liquefied, it just needs to be cool enough. This same pressure is coming off of booster aftercooler 164, and the temperature from booster aftercooler 164 is above ambient temperature now to the point 458. The flow of booster aftercooler 164 therefore can be combined with the flow from point 239, FIG. 3c. In addition, nitrogen production flash pot 148 is set up to deliver a subcooled liquid nitrogen to storage. The shell side will have a liquid nitrogen bath with a controllable liquid level, the bath temperature will be controlled by the retained pressure on the bath, the lower the pressure the colder the bath. The tube side of the flash pot 148 will have small tubes giving more surface area for heat transfer per tube, and there will be enough tubes to over handle the flow and result is a very little pressure drop. This will condense the incoming two-phase liquid and gas exit of the cold side of the added cooler 1500, the action of the condensing of the gas will cause a lowering of the supply gas pressure. This lowering of supply pressure will give a controllability to the auto pressure controller valve 455. The entry to valve 455 will be a higher pressure than the exit, and allow the gas from both point 239 and point 458 to feed into the valve 455.

TABLE

| Temperature (Fahrenheit) | Pressure (psig) | Flow (scfh) | Ref. No. | Location (Fig. No.) | Notes |
|---|---|---|---|---|---|
| ref | ref | ref | ref | ref | all of the nitrogen that enters the liquefier |
| 45.10 | 78.44 | 15500.000000 | 2 | FIG. 1&7 | instrument air removal (psig). To FIG. 2 |
| 45.1 | 78.44 | 15500.000000 | 2 | FIG. 7&1 | Instrument air feed just after MS's filters FIG. 1 |
| 43.93 | 77.09 | 780000.000000 | 3 | FIG. 1 | warm side MHE (psig) point 113 |
| −277.12 | 73.17 | 780000.000000 | 4 | FIG. 1 | exit MHE 113 enter HPC 114 (psig) |
| −275.94 | 73.44 | 437000.000000 | 5 | FIG. 1 | Liquid at the bottom of the HPC 114 (psig) |
| −280.00 | 51.50 | 437000.000000 | 6 | FIG. 1 | HPC 114 bottom liquid raised 55' now entering the SC 117 (psig) |
| −292.00 | 48.61 | 437000.000000 | 7 | FIG. 1 | HPC 114 bottom liquid exiting the SC 117 (psig) |
| −305.00 | 35.00 | 437000.000000 | 8 | FIG. 1 | Raised 45' split to control valves feeding POINTS 9 & 10. (psig) |
| −308.00 | 23.61 | 252000.000000 | 9 | FIG. 1 | Liquid into POINT 120, shell side (psia) |
| −309.28 | 18.83 | 185000.000000 | 10 | FIG. 1 | From POINT 114 bottom liquid after control valve into the POINT 116 tray 44, (psia) |
| −307.80 | 26.11 | 2000.000000 | 11 | FIG. 1 | liquid exiting the point 120 to its control valve (psia) |
| −308.51 | 18.97 | 2000.000000 | 12 | FIG. 1 | liquid from the POINT 120 after the control valve now entering the POINT 116 tray 42 (psia) |
| −307.00 | 20.50 | 250000.000000 | 13 | FIG. 1 | gas exit the POINT 120 to a control valve. (psia) |
| −308.90 | 18.90 | 250000.000000 | 14 | FIG. 1 | Gas from the POINT120 control valve to POINT 116 to tray 43 (psia) |
| −301.55 | 20.27 | 206300.000000 | 15 | FIG. 1 | LPC 114 tray 24 gas to CRA 118 (psia) |
| −300.00 | 23.27 | 199013.839220 | 16 | FIG. 1 | liquid exit CRA 118 (psia) |
| −301.55 | 20.27 | 199013.839220 | 17 | FIG. 1 | liquid from CRA 118 after the control valve to LPC 116 tray 24 (psia) |
| 80 | 78.42 | 15500.000000 | 19 | FIG. 7 | check valve to the instruments |
| 80 | 78.4 | 15500.000000 | 20 | FIG. 7 | all the gas needed to run the instruments system. normally air. |
| 80 | 78.38 | 15500.000000 | 21 | FIG. 7 | Feeds auto valves |
| 80 | 66.93 | 0.000000 | 30 | FIG. 7 | instrument nitrogen to instrument air pressure regulator |
| 80 | 65 | 0.000000 | 31 | FIG. 7 | backup nitrogen check valve |
| 80 | 66.95 | 16810.000000 | 32 | FIG. 7 | check valve inlet gas nitrogen to purge system |
| 37.00 | 66.97 | 16810.000000 | 33 | FIG. 3&7 | Nitrogen from valve 238 to FIG. 7 the nitrogen to purge system |
| 37.00 | 66.97 | 16810.000000 | 33 | FIG. 7&3 | from FIG. 3 |
| 80.00 | 65.00 | 4000 | 34 | FIG. 5&7 | Seal gas from FIG. 7 to feed points 75 and 76 |
| 80 | 65 | 4000.000000 | 34 | FIG. 7&5 | Seal gas to turbines on FIG. 5 |
| 80.00 | 65.00 | 4000 | 35 | FIG. 5&7 | Seal gas from FIG. 7 to feed points 77 and 78 |
| 80 | 65 | 4000.000000 | 35 | FIG. 7&5 | Seal gas to turbines FIG. 5 |
| 80.00 | 65.00 | 6500.000000 | 36 | FIG. 2 | pure nitrogen gas from FIG. 7 to argon dryer bed on reactivation. |

TABLE-continued

| Temperature (Fahrenheit) | Pressure (psig) | Flow (scfh) | Ref. No. | Location (Fig. No.) | Notes |
|---|---|---|---|---|---|
| 80 | 65 | 6500.000000 | 36 | FIG. 7&2 | Argon drier regeneration FIG. 2 |
| 80.00 | 15.00 | 200.000000 | 37 | FIG. 2&7 | nitrogen gas purge flow to warm up vent valve for 423 flow. |
| 80 | 65 | 200.000000 | 37 | FIG. 7&2 | Warming purge to the refined argon separator nitrogen vent valve FIG. 2 |
| 80 | 65 | 200.000000 | 38 | FIG. 7 | Warming purge to the instrument nitrogen back up tank 174 vent valve |
| 80.00 | 65.00 | 200.000000 | 39 | FIG. 1 | from FIG. 7 gas nitrogen to warm the burst disk and relief valve |
| 80 | 65 | 200.000000 | 39 | FIG. 7&1 | Warming purge for low pressure column vent and relieve valve FIG. 1 |
| 80.00 | 65.00 | 800.000000 | 40 | FIG. 1&7 | this is a nitrogen gas to purge the cold box coming from FIG. 7 |
| 80 | 65 | 800.000000 | 40 | FIG. 7&1 | Cold box casing purge FIG. 1 |
| 80.00 | 65.00 | 200.000000 | 41 | FIG. 4&7 | nitrogen purge flow from FIG. 7 to liquefier box purge |
| 80 | 65 | 200.000000 | 41 | FIG. 7&4 | Liquefier casing purge FIG. 4 |
| 80.00 | 65.00 | 400.000000 | 42 | FIG. 5&7 | FIG. 5 turbine duct casing purge from FIG. 7 |
| 80 | 65 | 400.000000 | 42 | FIG. 7&5 | Turbine duct casing purge FIG. 5 |
| 80.00 | 65.00 | 10.000000 | 43 | FIG. 5&7 | FIG. 5 nitrogen pressure to the oil accumulator from FIG. 7 |
| 80 | 65 | 10.000000 | 43 | FIG. 7&5 | to FIG. 5 turbine oil accumulator |
| 80 | 65 | 300.000000 | 44 | FIG. 7&8 | To oxygen filters, warming nitrogen purge and case purge FIG. 8 point 44 |
| 80.00 | 65.00 | 300.000000 | 44 | FIG. 8&7 | from FIG. 7, warming nitrogen and purge inlet psig |
| 80 | 60 | 0.000000 | 45 | FIG. 7 | purge backup pressure regulator |
| 80 | 125 | 0.000000 | 46 | FIG. 7 | Back up nitrogen tank 174 vent |
| 80.00 | 65.00 | 200.000000 | 47 | FIG. 8 | oxygen filter case purge FIG. 8 psig |
| 80.00 | 0.10 | 100.000000 | 48 | FIG. 4 & 5 | liquefier insulated cold box |
| 80.00 | 0.10 | 100.000000 | 49 | FIG. 1 | air separation unit cold box |
| −311.60 | 18.39 | 37900.000000 | 50 | FIG. 1 | waste nitrogen from tray 10 from point 116 LPC to SC 117 |
| −282.00 | 17.64 | 37900.000000 | 51 | FIG. 1 | waste nitrogen from SC 117 to MHE 113 (psia) |
| 37.00 | 16.50 | 37900.000000 | 52 | FIG. 1 | Waste nitrogen exit MHE 113 to a flow control valve then MS bed (psia) |
| 37.00 | 15.90 | 37900.000000 | 53 | FIG. 1 | waste nitrogen flow, after control valve to the MS reactivation heater 122 (psia) |
| 37.00 | 15.90 | 37900.000000 | 54 | FIG. 1 | hot or cold waste nitrogen to mol sieve bed on reactivation |
| 80.00 | 14.70 | 37900.000000 | 55 | FIG. 1 | waste nitrogen to vent after the mol sieve on reactivation |
| 80.00 | 14.73 | 100.000000 | 56 | FIG. 8 | oxygen filter insulated box |
| 80.00 | 65.00 | 100.000000 | 60 | FIG. 8 | warming nitrogen inlet flow meter psig |

TABLE-continued

| Temperature (Fahrenheit) | Pressure (psig) | Flow (scfh) | Ref. No. | Location (Fig. No.) | Notes |
|---|---|---|---|---|---|
| 80.00 | 65.00 | 100.000000 | 61 | FIG. 8 | auto valve for warming nitrogen inlet psig |
| 80.00 | 64.99 | 100.000000 | 62 | FIG. 8 | warming nitrogen inlet flow check valve psig |
| 80.00 | 64.98 | 0.000000 | 63 | FIG. 8 | warming nitrogen auto valve to filter number 175 psig |
| −298.00 | 23.92 | 0.000000 | 64 | FIG. 8 | shut off valve for warming nitrogen on filter number 175 psia |
| 80.00 | 14.70 | 0.000000 | 65 | FIG. 8 | warming nitrogen relief valve psia |
| 80.00 | 14.70 | 0.000000 | 66 | FIG. 8 | warming nitrogen auto double block and bleed vent psia |
| 80.00 | 64.98 | 0.000000 | 67 | FIG. 8 | warming nitrogen header relief valve psig |
| 80.00 | 64.98 | 0.000000 | 68 | FIG. 8 | warming nitrogen header vent psig |
| 80.00 | 64.97 | 100.000000 | 69 | FIG. 8 | warming nitrogen auto valve to filter number 176, psig |
| 80.00 | 64.96 | 100.000000 | 70 | FIG. 8 | shut off valve for warming nitrogen on filter number 176, psig |
| 80.00 | 64.96 | 0.000000 | 71 | FIG. 8 | warming nitrogen relief valve psig |
| 80.00 | 64.96 | 0.000000 | 72 | FIG. 8 | warming nitrogen auto double block and bleed vent psig |
| 80.00 | 65.00 | 2,000.000000 | 75 | FIG. 5 | Nitrogen gas from point 34 for seal gas to turbine 153 |
| blank | blank | 2,000.000000 | 76 | FIG. 5 | Nitrogen gas from point 34 for seal gas to turbine 157 |
| 80.00 | 65.00 | 2,000.000000 | 77 | FIG. 5 | Nitrogen gas from point 35 for seal gas to turbine 161 |
| blank | blank | 2,000.000000 | 78 | FIG. 5 | Nitrogen gas from point 35 for seal gas to turbine 165 |
| 72.81 | 14.50 | 795754.864039 | 100 | FIG. 1 | Air separation filter house 795,754.8 scfh air flow (psia) |
| 168.00 | 85.51 | 795754.738708 | 101 | FIG. 1 | exit the 4th stage (psig) |
| 168.00 | 60.00 | 0.125331 | 102 | FIG. 1 | The three intercoolers condensation will strip away this. The solubility of this gas in the first waters. (psig) |
| 168.00 | 85.51 | 0.000000 | 103 | FIG. 1 | MAC VENT (psig) |
| 90.00 | 83.31 | 795754.738708 | 104 | FIG. 1 | exit aftercooler (psig) |
| 38.00 | 82.81 | 795754.738708 | 105 | FIG. 1 | chiller unit exit |
| 38.00 | 82.31 | 795746.763479 | 106 | FIG. 1 | chilled air out of the water separator (psig) |
| 38.00 | 82.81 | 7.975229 | 107 | FIG. 1 | water separator water blow down (psig) |
| 50.00 | 80.51 | 246.763478 | 108 | FIG. 1 | molecular sieve beds and dust filter removes this (psig) |
| vessel | vessel | vessel | 109 | FIG. 1 | second mol sieve vessel |
| 45.47 | 78.51 | 795500.000000 | 110 | FIG. 1 | the exit of the dust filter (psig) |
| 44.74 | 77.24 | 780000.000000 | 111 | FIG. 1 | Main flow meter (psig) |
| 45.10 | 78.44 | 15500.000000 | 112 | FIG. 1 | open or closed valve to instrument air system |
| vessel | vessel | 0.000000 | 113 | FIG. 1 | the main heat exchanger five pass heat exchanger |
| vessel | vessel | vessel | 114 | FIG. 1 | vessel the high pressure column |
| vessel | vessel | vessel | 115 | FIG. 1 | this is the high pressure reboiler in the low pressure column |
| vessel | vessel | 0.000000 | 116 | FIG. 1 | vessel the low pressure column |

TABLE-continued

| Temperature (Fahrenheit) | Pressure (psig) | Flow (scfh) | Ref. No. | Location (Fig. No.) | Notes |
|---|---|---|---|---|---|
| vessel | vessel | 0.000000 | 117 | FIG. 1 | the sub cooler, five pass heat exchanger |
| vessel | vessel | vessel | 118 | FIG. 1 | vessel the crude argon column |
| vessel | vessel | vessel | 119 | FIG. 1 | this is the crude argon column reboiler in the argon condenser |
| vessel | vessel | 0.000000 | 120 | FIG. 1 | Vessel the crude argon condenser, two pass heat exchanger, phase exchanger |
| vessel | vessel | 0.000000 | 121 | FIG. 1 | Vessel the crude argon phase separator |
| heater | heater | heater | 122 | FIG. 1 | heater for mol sieve |
| −295.00 | 20.00 | 38670.824876 | 123 | FIG. 2 | REF ARGON TRANSPORT TRAILER |
| −295.00 | 20.00 | 1299339.715842 | 124 | FIG. 2 | REF ARGON STORAGE TANK |
| heat exchanger | heat exchanger | heat exchanger | 125 | FIG. 2 | argon recondenser exchanger side |
| liquid holder | liquid holder | 0.000000 | 126 | FIG. 2 | argon recondenser liquid nitrogen side |
| hydrogen separator | hydrogen separator | hydrogen separator | 127 | FIG. 2 | ARGON HYGROGEN SEPERATOR |
| −297.00 | 26.00 | 14191.128395 | 128 | FIG. 2 | argon reboiler tube side |
| −297.00 | 26.00 | 7095.564197 | 129 | FIG. 2 | outer shell holding liquid argon |
| vessel | vessel | 0.000000 | 130 | FIG. 2 | ARGON PURE COLUMN |
| heat exchanger | heat exchanger | 0.000000 | 131 | FIG. 2 | pure argon condenser heat exchanger |
| −307.00 | 24.70 | 7587.889152 | 132 | FIG. 2 | pure argon phase separator |
| heat exchanger | heat exchanger | heat exchanger | 133 | FIG. 2 | crude and combusted argon heat exchanger |
| 98.00 | 15.00 | 7491.413203 | 134 | FIG. 2 | argon compressor |
| 98.00 | 56.90 | 7491.413203 | 135 | FIG. 2 | argon compressor aftercooler |
| 80.00 | 3500.00 | 240000.000000 | 136 | FIG. 2 | hydrogen tube trailer |
| 88.00 | 56.00 | 7844.826016 | 137 | FIG. 2 | argon flame arrester |
| 87.00 | 56.00 | 7844.826016 | 138 | FIG. 2 | oxygen and hydrogen catalyst bed |
| heat exchanger | heat exchanger | 0.000000 | 139 | FIG. 2 | deoxo water cooled aftercooler |
| heat exchanger | heat exchanger | 0.000000 | 140 | FIG. 2 | combusted argon water phase separator |
| 95.00 | 55.00 | 7368.313118 | 141 | FIG. 2 | one of two dryer vessels this one is on line |
| 80.00 | 65.00 | 6500.000000 | 142 | FIG. 2 | one of two dryer vessels this one is on reactivation |
| vessel | vessel | vessel | 143 | FIG. 2 | argon dust filter |
| heat exchanger | heat exchanger | heat exchanger | 144 | FIG. 4 | Four pass heat exchanger called the oxygen cooler |
| heat exchanger | heat exchanger | heat exchanger | 145 | FIG. 4 | Five pass heat exchanger called the boiler |
| heat exchanger | heat exchanger | heat exchanger | 146 | FIG. 4 | Six pass heat exchanger called the condenser |
| flash pot | flash pot | flash pot | 147 | FIG. 4 | Shell and tube heat exchanger called the oxygen production flash pot |
| flash pot | flash pot | flash pot | 148 | FIG. 4 | Shell and tube heat exchanger called the nitrogen production flash pot |
| flash pot | flash pot | flash pot | 149 | FIG. 4 | Shell and tube heat exchanger called the nitrogen pump flash pot |
| heat exchanger | heat exchanger | heat exchanger | 150 | FIG. 4 | Three pass heat exchanger called the added cooling heat exchanger |
| phase separator | phase separator | phase separator | 151 | FIG. 4 | Exhaust of the turbines phase separator |

TABLE-continued

| Temperature (Fahrenheit) | Pressure (psig) | Flow (scfh) | Ref. No. | Location (Fig. No.) | Notes |
|---|---|---|---|---|---|
| heat exchanger | heat exchanger | heat exchanger | 152 | FIG. 4 | Four pass heat exchanger called the per heater |
| −155.00 | 420.00 | 180,000.000000 | 153 | FIG. 5 | turbine expander inlet |
| −287.00 | 84.00 | 180,000.000000 | 153 | FIG. 5 | turbine expander outlet |
| guide vanes | guide vanes | guide vanes | 154 | FIG. 5 | inlet guide vanes |
| 55.00 | 14.90 | 398,184.701923 | 155 | FIG. 5 | 155 turbine booster inlet |
| 245.00 | 26.74 | 398,184.701923 | 155 | FIG. 5 | 155 turbine booster outlet |
| 245.00 | 26.74 | 398,184.701923 | 156 | FIG. 5 | 156 turbine after cooler inlet |
| 90.00 | 25.74 | 398,184.701923 | 156 | FIG. 5 | 156 turbine after cooler outlet |
| −155.00 | 420.00 | 180,000.000000 | 157 | FIG. 5 | turbine expander inlet |
| −287.00 | 84.00 | 180,000.000000 | 157 | FIG. 5 | turbine expander outlet |
| guide vanes | guide vanes | guide vanes | 158 | FIG. 5 | inlet guide vanes |
| 87.00 | 25.74 | 398,184.701923 | 159 | FIG. 5 | inlet to turbine 159 |
| 255.00 | 42.32 | 398,184.701923 | 159 | FIG. 5 | outlet of turbine 159 to aftercooler |
| 255.00 | 42.32 | 398,184.701923 | 160 | FIG. 5 | into aftercooler 160 |
| 90.00 | 41.32 | 398,184.701923 | 160 | FIG. 5 | exit of 160 aftercooler |
| −155.00 | 420.00 | 180,000.000000 | 161 | FIG. 5 | turbine expander inlet |
| −287.00 | 84.00 | 180,000.000000 | 161 | FIG. 5 | turbine expander outlet |
| guide vanes | guide vanes | guide vanes | 162 | FIG. 5 | inlet guide vanes |
| 90.00 | 41.32 | 398,184.701923 | 163 | FIG. 5 | flow into turbine booster 163 |
| 265.00 | 66.52 | 398,184.701923 | 163 | FIG. 5 | flow out of 163 |
| 265.00 | 66.52 | 398,184.701923 | 164 | FIG. 5 | turbine booster after cooler 164 inlet |
| 90.00 | 65.52 | 398,184.701923 | 164 | FIG. 5 | turbine booster after cooler 164 outlet |
| −155.00 | 420.00 | 360,000.000000 | 165 | FIG. 5 | turbine expander inlet |
| −287.00 | 84.00 | 360,000.000000 | 165 | FIG. 5 | turbine expander outlet |
| guide vanes | guide vanes | guide vanes | 166 | FIG. 5 | inlet guide vanes |
| 50.00 | 65.00 | 1,465,374.701923 | 167 | FIG. 5 | flow into turbine booster 167 |
| 250.00 | 112.82 | 1,465,374.701923 | 167 | FIG. 5 | flow out of turbine booster 167 |
| 250.00 | 112.82 | 1,465,374.701923 | 168 | FIG. 5 | flow into turbine booster after cooler 168 |
| 90.00 | 111.82 | 1,465,374.701923 | 168 | FIG. 5 | flow out of turbine booster after cooler 168 |
| pump | pump | pump | 169 | FIG. 6 | liquid nitrogen pump |
| pump | pump | pump | 170 | FIG. 6 | liquid nitrogen pump |
| −320.00 | 1.00 | 0.000000 | 171 | FIG. 6 | LIQUID NITROGEN STORAGE TANK |
| 80.00 | 14.70 | 0.000000 | 172 | FIG. 6 | NITROGEN TANK PUMP BACK PUMP |
| −280 | 120 | 1163160.000000 | 174 | FIG. 7 | NBT Backup liquid nitrogen storage tank HOLD 36 HOURS |
| filter | filter | filter | 175 | FIG. 8 | oxygen filter number 1 |
| filter | filter | filter | 176 | FIG. 8 | oxygen filter number 2 |
| tank | tank | tank | 177 | FIG. 8 | oxygen storage tank |
| 80 | 80 | 0.000000 | 178 | FIG. 7 | tube side nitrogen evaporators |
| −290.89 | 70.00 | 841180.060000 | 200 | FIG. 1 | total gas exiting the top of the HPC 114 (psig) |
| −290.89 | 70.00 | 630180.060000 | 201 | FIG. 1 | nitrogen gas split off of 200 going to the reboiler 115. (psig) |
| −290.89 | 70.00 | 211000.000000 | 202 | FIG. 1 | this is the gas at the top of the HPC 114 that is removed to the entry MHE 113 cold side (psig) |
| 37.00 | 67.00 | 211000.000000 | 203 | FIG. 1&3 | high pressure nitrogen off of MHE 113 warm side. (psig) to FIG. 3 |
| 37.00 | 67.00 | 211000.000000 | 203 | FIG. 3&1 | From 113 MHE high pressure column gas nitrogen from FIG. 1 controlled by the ASU |

TABLE-continued

| Temperature (Fahrenheit) | Pressure (psig) | Flow (scfh) | Ref. No. | Location (Fig. No.) | Notes |
|---|---|---|---|---|---|
| −317.40 | 17.31 | 362637.548954 | 210 | FIG. 1 | top of the LPC 116 pure nitrogen gas exit (psia) |
| 80.00 | 17.30 | 0.000000 | 211 | FIG. 1 | Low pressure column common line to a burst disk and a relief valve |
| 80.00 | 14.70 | 0.000000 | 212 | FIG. 1 | burst disk to protect the low pressure column |
| 80.00 | 14.70 | 0.000000 | 213 | FIG. 1 | relief valve to protect the low pressure column |
| −317.40 | 17.31 | 371184.701923 | 214 | FIG. 1 | Low pressure nitrogen blended flow to the SC 117 (psia). |
| −282.00 | 17.10 | 371184.701923 | 215 | FIG. 1 | combined pure nitrogen low pressures exit the SC 117 to MHE 113 cold side (psia) |
| 37.29 | 14.94 | 371184.701923 | 216 | FIG. 1&3 | exit of MHE 113 low pressure pure nitrogen gas to FIG. 3 (psia) |
| 37.29 | 14.94 | 371184.701923 | 216 | FIG. 3&1 | Low pressure nitrogen flow from 113 MHE FIG. 1 |
| −292.59 | 75.97 | 630180.060000 | 220 | FIG. 1 | liquid nitrogen removed from the POINT 115 reboiler. (psig) |
| −292.59 | 75.97 | 498180.060000 | 221 | FIG. 1 | liquid to the top tray #38 of the POINT 114, cold cap. (psig) |
| −292.59 | 75.97 | 132000.000000 | 222 | FIG. 1 | Pure liquid nitrogen from POINT 115 to the POINT 117 subcooler. (psig) |
| −303.00 | 54.10 | 132000.000000 | 223 | FIG. 1 | The POINT 115 pure liquid nitrogen exit SC 117 raise 45' to auto control valve. (psig) |
| −317.40 | 17.31 | 132000.000000 | 224 | FIG. 1 | liquid nitrogen out control valve (psia) |
| −317.40 | 17.31 | 134345.000000 | 225 | FIG. 1 | combined liquid nitrogen to LPC 116 (psia) |
| 37.00 | 66.99 | 211000.000000 | 231 | FIG. 3 | High pressure column gas nitrogen flow meter flow set by ASU |
| 37.00 | 66.99 | 211000.000000 | 232 | FIG. 3 | inlet to liquefier auto valve |
| 37.00 | 66.98 | 0.000000 | 233 | FIG. 3 | High pressure column gas nitrogen over load flow meter |
| 37.00 | 14.70 | 0.000000 | 234 | FIG. 3 | relief valve EXIT |
| 37.00 | 14.70 | 0.000000 | 235 | FIG. 3 | over load auto vent valve EXIT |
| 37.00 | 66.98 | 211000.000000 | 236 | FIG. 3 | inlet to liquefier check valve |
| 37.00 | 66.97 | 211000.000000 | 237 | FIG. 3 | inlet flow meter to liquefier high pressure column gas nitrogen and purge system |
| 37.00 | 66.97 | 16810.000000 | 238 | FIG. 3 | Open or closed valve, for the nitrogen purge system |
| 37.00 | 66.96 | 194190.000000 | 239 | FIG. 3&4 | High pressure column gas nitrogen to FIG. 4 the liquefier |
| 37.00 | 66.96 | 194190.000000 | 239 | FIG. 4&3 | higher pressure from FIG. 3 point 239 |
| 37.29 | 14.93 | 371184.701923 | 250 | FIG. 3 | low pressure nitrogen flow meter set by ASU |
| 37.29 | 14.93 | 371184.701923 | 251 | FIG. 3 | inlet to liquefier auto flow control valve |
| 37.29 | 14.93 | 0.000000 | 252 | FIG. 3 | Low pressure nitrogen over load flow meter |
| 37.29 | 14.93 | 0.000000 | 253 | FIG. 3 | relief valve EXIT |
| 37.29 | 14.93 | 0.000000 | 254 | FIG. 3 | over load auto vent valve EXIT |
| 37.29 | 14.93 | 371184.701923 | 255 | FIG. 3 | inlet to liquefier check valve |

TABLE-continued

| Temperature (Fahrenheit) | Pressure (psig) | Flow (scfh) | Ref. No. | Location (Fig. No.) | Notes |
|---|---|---|---|---|---|
| 37.29 | 14.93 | 371184.701923 | 256 | FIG. 3 | Into liquefier low pressure gas nitrogen flow meter |
| 37.29 | 14.93 | 371184.701923 | 257 | FIG. 3&4 | low pressure gas nitrogen inlet to liquefier to FIG. 4 |
| 37.29 | 14.93 | 371184.701923 | 257 | FIG. 4&3 | low pressure nitrogen gas from inlet or vent FIG. 3 point 257 |
| −255.00 | 17.00 | 5000.000000 | 260 | FIG. 4 | low pressure nitrogen gas through 260 from 147 shell side |
| −255.00 | 17.00 | 0.000000 | 261 | FIG. 4 | low pressure nitrogen gas through 261 = zero due to low pressure |
| −255.00 | 17.00 | 15000.000000 | 262 | FIG. 4 | low pressure nitrogen gas through 262 from 149 shell side |
| −255.00 | 17.00 | 0.000000 | 263 | FIG. 4 | low pressure nitrogen gas through 263 = zero due to low pressure |
| 50.00 | 15.00 | 27000.000000 | 264 | FIG. 4 | lower pressure gas nitrogen through 145 boiler then to 144 oxygen cooler then through valve 264 |
| 45.00 | 14.90 | 398184.701923 | 265 | FIG. 4&5 | all low pressure gas nitrogen to FIG. 5 point 265 |
| 55.00 | 14.90 | 398,184.701923 | 265 | FIG. 5&4 | From FIG. 4 low pressure nitrogen feed to 270 |
| 55.00 | 14.90 | 398,184.701923 | 270 | FIG. 5 | 155 booster inlet flow controller |
| 80.00 | 25.74 | 0.000000 | 271 | FIG. 5 | 155 turbine surge controller inlet |
| 80.00 | 14.90 | 0.000000 | 271 | FIG. 5 | 155 turbine surge controller outlet |
| 80.00 | 14.90 | 0.000000 | 272 | FIG. 5 | 155 turbine surge check valve outlet |
| 80.00 | 14.90 | 0.000000 | 272 | FIG. 5 | 155 turbine surge check valve inlet |
| 90.00 | 25.74 | 1000.000000 | 273 | FIG. 4&5 | hot gas from 156 FIG. 5 to here |
| 90.00 | 25.74 | 1,000.000000 | 273 | FIG. 5&4 | hot gas from 156 outlet to FIG. 4, 274 control valve |
| 90.00 | 25.74 | 1000.000000 | 274 | FIG. 4 | Control valve hot gas into 152 |
| −260.00 | 25.74 | 1000.000000 | 275 | FIG. 4&5 | cooler gas exit 152 to FIG. 5 |
| −240.00 | 25.74 | 1,000.000000 | 275 | FIG. 5&4 | from FIG. 4 exit of 152, to here after check valve 276. |
| 88.00 | 25.74 | 397,184.701923 | 276 | FIG. 5 | flow into 276 check valve. |
| 88.00 | 25.74 | 397,184.701923 | 276 | FIG. 5 | Flow from 276, to turbine flow controller 277 |
| 87.00 | 25.74 | 398,184.701923 | 277 | FIG. 5 | flow controller 277, booster inlet 159 |
| 80.00 | 41.32 | 0.000000 | 278 | FIG. 5 | inlet to 159 surge controller |
| 80.00 | 25.74 | 0.000000 | 278 | FIG. 5 | outlet of 159 surge controller |
| 80.00 | 25.74 | 0.000000 | 279 | FIG. 5 | flow exit check valve 279 surge control inlet to 159 |
| 90.00 | 41.32 | 398,184.701923 | 280 | FIG. 5 | flow through flow controller 280 |
| 90.00 | 65.52 | 0.000000 | 281 | FIG. 5 | turbine booster surge controller inlet 281 |
| 80.00 | 41.32 | 0.000000 | 281 | FIG. 5 | turbine booster surge controller 281 exit. |
| 80.00 | 41.32 | 0.000000 | 282 | FIG. 5 | exit of the surge check valve 282 |
| 80.00 | 41.32 | 0.000000 | 282 | FIG. 5 | turbine booster surge check valve 282 inlet |

TABLE-continued

| Temperature (Fahrenheit) | Pressure (psig) | Flow (scfh) | Ref. No. | Location (Fig. No.) | Notes |
| --- | --- | --- | --- | --- | --- |
| 50.00 | 65.00 | 1,465,374.701923 | 283 | FIG. 5 | flow through flow controller 283 START MAJOR FLOW |
| 90.00 | 111.82 | 0.000000 | 284 | FIG. 5 | turbine booster surge controller 284 inlet. |
| 80.00 | 65.00 | 0.000000 | 284 | FIG. 5 | turbine booster surge controller 284 exit. |
| 80.00 | 65.00 | 0.000000 | 285 | FIG. 5 | turbine booster surge controller check valve outlet |
| 80.00 | 65.00 | 0.000000 | 285 | FIG. 5 | turbine booster surge check valve 285 inlet |
| −155.00 | 420.00 | 900000.000000 | 288 | FIG. 4 | temp out of 152 pre heater on gas nitrogen to turbine expanders FIG. 5, (510 FLOW = 528 FLOW) |
| −155.00 | 420.00 | 900,000.000000 | 288 | FIG. 5&4 | from FIG. 4 point 288, to here |
| −155.00 | 420.00 | 180,000.000000 | 289 | FIG. 5 | inlet flow controller, sets the guide veins |
| −155.00 | 420.00 | 180,000.000000 | 290 | FIG. 5 | inlet flow controller, sets the guide veins |
| −155.00 | 420.00 | 180,000.000000 | 291 | FIG. 5 | inlet flow controller, sets the guide veins |
| −155.00 | 420.00 | 360,000.000000 | 292 | FIG. 5 | inlet flow controller, sets the guide vanes |
| −292.66 | 37.93 | 2000.000000 | 300 | FIG. 1 | liquid oxygen removed from LPC 116 to SC 117 (psia) |
| −298.00 | 34.93 | 2000.000000 | 301 | FIG. 1 | liquid oxygen from SC 117 to auto control valve (open or closed) (psia) |
| −298.00 | 23.93 | 2000.000000 | 302 | FIG. 1&8 | liquid oxygen to oxygen filter system. FIG. 8 (psia) |
| −298.00 | 23.93 | 2,000.000000 | 302 | FIG. 8&1 | ASU liquid oxygen to filter box, from FIG. 1 psia |
| −298.00 | 24.00 | 161521.037842 | 305 | FIG. 4&8 | Liquid oxygen to FIG. 8 |
| −298.00 | 24.00 | 161,521.037842 | 305 | FIG. 8&4 | inlet liquid oxygen from liquefier from FIG. 4 psia |
| −298.00 | 23.89 | 161521.037842 | 310 | FIG. 8 | inlet check valve liquid oxygen to filter box FIG. 8, psia |
| −298.00 | 23.89 | 0.000000 | 311 | FIG. 8 | relief valve on the liquid oxygen header psia |
| −298.00 | 23.89 | 0.000000 | 312 | FIG. 8 | auto control valve liquid oxygen to dump system psia |
| −298.00 | 23.89 | 161521.037842 | 313 | FIG. 8 | auto control valve liquid oxygen to storage system psia |
| −298.00 | 23.88 | 0.000000 | 314 | FIG. 8 | relief valve on the double block and bleed psia |
| −298.00 | 23.88 | 0.000000 | 315 | FIG. 8 | auto control valve double block and bleed vent psia |
| −298.00 | 23.88 | 161521.037842 | 316 | FIG. 8 | auto control valve liquid oxygen to storage system psia |
| −292.66 | 21.93 | 161521.037842 | 320 | FIG. 1 | gas oxygen removed from LPC 116. To cold side of MHE 113.(psia) |
| 37.00 | 19.93 | 161521.037842 | 321 | FIG. 1&3 | gas oxygen removed from MHE 113 warm side to FIG. 3 point 321. (psia) |
| 37.00 | 19.93 | 161521.037842 | 321 | FIG. 3&1 | Low pressure oxygen gas flow from 113 FIG. 1 |
| 37.00 | 19.92 | 161521.037842 | 325 | FIG. 3 | Inlet flow meter, control feed flow set by ASU |
| 37.00 | 19.90 | 161521.037842 | 326 | FIG. 3 | Oxygen inlet to liquefier auto flow control valve |

TABLE-continued

| Temperature (Fahrenheit) | Pressure (psig) | Flow (scfh) | Ref. No. | Location (Fig. No.) | Notes |
|---|---|---|---|---|---|
| 37.00 | 19.89 | 0.000000 | 327 | FIG. 3 | over load flow meter |
| 37.00 | 14.70 | 0.000000 | 328 | FIG. 3 | relief valve EXIT |
| 37.00 | 14.70 | 0.000000 | 329 | FIG. 3 | over load auto vent valve EXIT |
| 37.00 | 19.89 | 161521.037842 | 330 | FIG. 3 | inlet to liquefier check valve |
| 37.00 | 19.87 | 161521.037842 | 331 | FIG. 3 | Gas oxygen to liquefier flow meter. |
| 37.00 | 19.86 | 161521.037842 | 332 | FIG. 3&4 | Oxygen inlet to liquefier FIG. 4 |
| 37.00 | 19.86 | 161521.037842 | 332 | FIG. 4&3 | Oxygen gas from FIG. 3 to here |
| −298.00 | 23.93 | 2000.000000 | 335 | FIG. 8 | liquid oxygen from asu to oxygen filter check valve psia |
| −298.00 | 23.93 | 0.000000 | 336 | FIG. 8 | entry to oxygen dump or bypass filters psia |
| 80.00 | 14.70 | 0.000000 | 337 | FIG. 8 | relief valve on the double block and bleed psia |
| 80.00 | 14.70 | 0.000000 | 338 | FIG. 8 | asu liquid oxygen to dump system psia |
| 80.00 | 14.70 | 0.000000 | 339 | FIG. 8 | liquid oxygen to bypass the filters psia |
| 80.00 | 14.70 | 0.000000 | 340 | FIG. 8 | bypass double block and bleed relief valve psia |
| 80.00 | 14.70 | 0.000000 | 341 | FIG. 8 | bypass double block and bleed vent valve psia |
| 80.00 | 14.70 | 0.000000 | 342 | FIG. 8 | bypass liquid oxygen exit to storage psia |
| −298.00 | 23.93 | 2000.000000 | 343 | FIG. 8 | asu liquid oxygen entry valve to filter 175, psia |
| −298.00 | 23.92 | 0.000000 | 344 | FIG. 8 | relief valve on the double block and bleed psia |
| −298.00 | 23.92 | 0.000000 | 345 | FIG. 8 | double block and bleed vent valve psia |
| −298.00 | 23.92 | 2000.000000 | 346 | FIG. 8 | inlet valve to filter 175, psia |
| −298.00 | 0.00 | 0.000000 | 347 | FIG. 8 | delta pressure controller for 175 |
| −298.00 | 0.00 | 0.000000 | 348 | FIG. 8 | temperature indicator and controller for 175 |
| −298.00 | 22.92 | 0.000000 | 349 | FIG. 8 | relief valve on the double block and bleed psia |
| −298.00 | 22.92 | 0.000000 | 350 | FIG. 8 | double block and bleed vent valve psia |
| −298.00 | 22.92 | 0.000000 | 351 | FIG. 8 | inlet to cool down system to 176 psia |
| −298.00 | 22.92 | 1999.101368 | 352 | FIG. 8 | inlet to double block and bleed exit psia |
| −298.00 | 22.91 | 0.000000 | 353 | FIG. 8 | relief valve on the double block and bleed psia |
| −298.00 | 22.91 | 0.000000 | 354 | FIG. 8 | double block and bleed vent valve psia |
| −298.00 | 22.91 | 1999.101368 | 355 | FIG. 8 | filter 175 to storage header psia |
| −298.00 | 23.93 | 0.000000 | 356 | FIG. 8 | inlet asu liquid oxygen header relief valve psia |
| −298.00 | 23.93 | 0.000000 | 357 | FIG. 8 | asu liquid oxygen entry valve to filter 176 psia |
| 80.00 | 14.70 | 0.000000 | 358 | FIG. 8 | relief valve on the double block and bleed psia |
| 80.00 | 14.70 | 0.000000 | 359 | FIG. 8 | double block and bleed vent valve psia |
| 80.00 | 14.70 | 0.000000 | 360 | FIG. 8 | inlet valve to filter 176, psia |
| 80.00 | 0.00 | 0.000000 | 361 | FIG. 8 | delta pressure controller for 176 |
| −155.00 | 0.00 | 0.000000 | 362 | FIG. 8 | temperature indicator and controller for 175 |
| −155.00 | 63.00 | 0.000000 | 363 | FIG. 8 | relief valve on the double block and bleed psig |
| −155.00 | 63.00 | 121.567188 | 364 | FIG. 8 | double block and bleed vent valve psig |
| −155.00 | 63.00 | 0.000000 | 365 | FIG. 8 | inlet to cool down system to 175, psig |

TABLE-continued

| Temperature (Fahrenheit) | Pressure (psig) | Flow (scfh) | Ref. No. | Location (Fig. No.) | Notes |
| --- | --- | --- | --- | --- | --- |
| −155.00 | 63.00 | 0.000000 | 366 | FIG. 8 | inlet to double block and bleed exit psig |
| 80.00 | 14.70 | 0.000000 | 367 | FIG. 8 | relief valve on the double block and bleed psia |
| 80.00 | 14.70 | 0.000000 | 368 | FIG. 8 | double block and bleed vent valve psia |
| 80.00 | 14.70 | 0.000000 | 369 | FIG. 8 | filter 176 to storage psia |
| 80.00 | 14.70 | 0.000000 | 370 | FIG. 8 | cool down double block and bleed relief valve psia |
| 80.00 | 14.70 | 0.000000 | 371 | FIG. 8 | cool down double block and bleed vent valve psia |
| 80.00 | 14.70 | 0.000000 | 372 | FIG. 8 | cool down auto flow control valve psia |
| 80.00 | 14.70 | 0.000000 | 373 | FIG. 8 | cool down check valve psia |
| 80.00 | 14.70 | 0.000000 | 374 | FIG. 8 | cool down system relief valve psia |
| 80.00 | 14.70 | 0.000000 | 375 | FIG. 8 | flow indicator and controller of the cool down system psia |
| 80.00 | 14.70 | 0.000000 | 376 | FIG. 8 | double block and bleed vent valve psia |
| 80.00 | 14.70 | 0.000000 | 377 | FIG. 8 | cool down auto valve inlet to 175, psia |
| 80.00 | 14.70 | 0.000000 | 378 | FIG. 8 | cool down auto valve inlet to 176, psia |
| −298.00 | 20.00 | 0.000000 | 379 | FIG. 8 | storage header relief valve psia |
| −298.00 | 20.00 | 0.000000 | 380 | FIG. 8 | double block and bleed vent and purge valve,psia |
| −298.00 | 19.99 | 163520.139210 | 381 | FIG. 8 | liquid oxygen to storage tank psia |
| −298.00 | 15.70 | 100.000000 | 382 | FIG. 8 | oxygen storage tank vent psia |
| −304.00 | 18.11 | 7286.413203 | 400 | FIG. 1&2 | Gas out Crude argon phase separator 112 (psia) to FIG. 2 |
| −304.00 | 18.11 | 7286.413203 | 400 | FIG. 2&1 | crude argon to AHE 133 cold side. |
| 98.00 | 15.00 | 7286.413203 | 401 | FIG. 2 | Crude argon out of the AHE 133 warm side |
| 102.00 | 50.50 | 7368.313118 | 402 | FIG. 2 | into the warm side of the combusted argon heat exchanger |
| 80.00 | 16.34 | 205.000000 | 403 | FIG. 2 | Out of the 128 to control valve hydrogen excess return |
| 98.00 | 15.00 | 7491.413203 | 404 | FIG. 2 | inlet to AP 134. crude Argon hydrogen |
| 240.00 | 60.00 | 7491.413203 | 405 | FIG. 2 | exit of AP 134 to aftercooler 135 |
| 88.00 | 58.00 | 7491.413203 | 406 | FIG. 2 | exit after cooler 135 |
| 80.00 | 3500.00 | 240000.000000 | 407 | FIG. 2 | From Hydrogen tube trailer 136 to control valve |
| 80.00 | 60.00 | 353.412813 | 408 | FIG. 2 | After control valve extra hydrogen feed |
| 88.00 | 56.00 | 7844.826016 | 409 | FIG. 2 | Blended crude argon and hydrogen into argon flash arrester 137 |
| 87.00 | 56.00 | 7844.826016 | 410 | FIG. 2 | into argon deoxo 138 |
| 900.00 | 55.00 | 7368.313118 | 411 | FIG. 2 | into combusted argon after cooler 139 |
| 88.00 | 54.50 | 7368.313118 | 412 | FIG. 2 | into combusted argon water separator 140 |
| 88.00 | 54.00 | 7368.313118 | 413 | FIG. 2 | into combusted argon dryer bed on line 141 |
| 104.00 | 52.00 | 7368.313118 | 414 | FIG. 2 | into combusted argon dust filter 143 |
| −282.00 | 42.15 | 7368.313118 | 415 | FIG. 2 | Out of the cold side of the combusted argon heat exchanger 113 to hydrogen separator 127 |

TABLE-continued

| Temperature (Fahrenheit) | Pressure (psig) | Flow (scfh) | Ref. No. | Location (Fig. No.) | Notes |
|---|---|---|---|---|---|
| −297.00 | 40.11 | 7163.313118 | 416 | FIG. 2 | Gas from 127 to hydrogen separator condenser tube side 128 |
| −297.00 | 40.11 | 7163.313118 | 417 | FIG. 2 | Liquid from 128 tube side hydrogen separator condenser return to 127 |
| −297.00 | 40.11 | 7163.313118 | 418 | FIG. 2 | Argon and nitrogen liquid from hydrogen separator 127 |
| −298.00 | 40.00 | 205.000000 | 419 | FIG. 2 | hydrogen gas from tube side of the 128 to a control valve |
| −297.00 | 25.11 | 7163.313118 | 420 | FIG. 2 | 418 liquid argon and nitrogen to tray 30 after control valve |
| −307.00 | 24.90 | 7587.889152 | 421 | FIG. 2 | Mostly gas nitrogen and hydrogen gas off the top of the pure argon column |
| −307.00 | 24.70 | 7587.889152 | 422 | FIG. 2 | All of the hydrogen gas, and nitrogen gas from the tube side of the 131 the condenser to the 132 separator |
| −307.00 | 14.70 | 67.748921 | 423 | FIG. 2 | All of the hydrogen gas and a little nitrogen gas from the 132 separator, vent to atm. |
| −307.00 | 24.70 | 7520.140231 | 424 | FIG. 2 | Liquid nitrogen from 132 phase separator back to the 38 tray of the 130 column |
| −297.00 | 26.00 | 7095.564197 | 425 | FIG. 2 | 129 overflow of pure liquid argon, now bottom liquid of the 130 column, Pure liquid argon to auto control valve to storage |
| −297.00 | 20.00 | 7734.164975 | 427 | FIG. 2 | total liquid argon after auto control valves to storage |
| −250.00 | 20.00 | 425.733852 | 428 | FIG. 2 | 124 Storage tank, gas off to auto control valve |
| −250.00 | 20.00 | 212.866926 | 429 | FIG. 2 | 123 Transport trailer, gas off to auto control valve |
| −250.00 | 19.50 | 638.600778 | 430 | FIG. 2 | 123 gas off, and 124 gas off, after the auto control valves to the tube side of the 125 argon recondenser |
| −297.00 | 27.60 | 638.600778 | 431 | FIG. 2 | 125 tube side recondensed liquid argon to auto control valve to storage |
| 87.00 | 55.05 | 0.000000 | 432 | FIG. 2 | combusted argon water out of phase separator |
| 80.00 | 65.00 | 6500.000000 | 433 | FIG. 2 | argon dryer bed reactivation vent |
| −287.00 | 84.00 | 900000.000000 | 450 | FIG. 4 & 5 | From FIG. 5 point 450 turbines exhaust to the 151 with 3% liquid droplets |
| −287.00 | 84.00 | 900,000.000000 | 450 | FIG. 5 | turbine discharge header |
| −286.00 | 80.00 | 2000.000000 | 451 | FIG. 4 | over produced liquid nitrogen in the 151, major flash off. |
| −286.00 | 80.00 | 5000.000000 | 452 | FIG. 4 | liquid nitrogen from 151 to oxygen flash pot 147 = high flash |
| −286.00 | 80.00 | 5000.000000 | 453 | FIG. 4 | liquid nitrogen from 151 to nitrogen production flash pot 148 |
| −286.00 | 80.00 | 15000.000000 | 454 | FIG. 4 | liquid nitrogen from 151 to pump flash pot 149 |
| 50.00 | 67.00 | 873000.000000 | 455 | FIG. 4 | higher pressure nitrogen gas out of 145 boiler to 144 oxygen cooler then through valve 455 |

TABLE-continued

| Temperature (Fahrenheit) | Pressure (psig) | Flow (scfh) | Ref. No. | Location (Fig. No.) | Notes |
|---|---|---|---|---|---|
| 45.00 | 66.50 | 1000.000000 | 45€ | FIG. 4 | branch off to pre heater 152 |
| 45.00 | 66.50 | 1066190.000000 | 457 | FIG. 4 | controlling valve to add back pressure for 456 to cross the pre heater 152 |
| 43.00 | 65.00 | 1067190.000000 | 458 | FIG. 4&5 | TEMP CHANGE, point 458 to FIG. 5 |
| 43.00 | 65.00 | 1,067,190.000000 | 458 | FIG. 5 | from point 458 FIG. 4 to here |
| −316.30 | 18.00 | 5000.000000 | 459 | FIG. 4 | gas nitrogen out of the 148 nitrogen production flash pot to 150 ADDED COOLING HEAT EXCHANGER |
| −300.00 | 18.00 | 15000.000000 | 460 | FIG. 4 | gas nitrogen out of shell side of 149 pump flash pot |
| −300.00 | 18.00 | 15000.000000 | 460 | FIG. 4 | low pressure cool nitrogen to 146 condenser from 149 shell side |
| −316.00 | 18.00 | 5000.000000 | 461 | FIG. 4 | gas nitrogen out of the shell side of the 147 oxygen production flash pot |
| −316.00 | 18.00 | 5000.000000 | 461 | FIG. 4 | low pressure cool nitrogen to condenser from 461 |
| 45.00 | 66.50 | 1067190.000000 | 462 | FIG. 4 | ref point 462 |
| 90.00 | 111.82 | 1465374.701923 | 500 | FIG. 4&5 | from FIG. 5, major flow into the liquefier from the 168 after cooler |
| 90.00 | 111.82 | 1,465,374.701923 | 500 | FIG. 5&4 | flow not taken by surge controller 284, now to 500. FIG. 4 |
| 90.00 | 111.82 | 1465374.701923 | 501 | FIG. 4 | one of three branch off of point 500, to the 144 oxygen cooler |
| 90.00 | 111.82 | 426895.739765 | 502 | FIG. 4 | one of three branch off of point 500, bypass |
| 90.00 | 111.82 | 300000.000000 | 503 | FIG. 4 | one of three branch off of point 500, to the 152 per heater |
| −299.00 | 100.00 | 900000.000000 | 510 | FIG. 4&6 | liquid nitrogen to the re-circulation pump FIG. 6, PUMP HOUSE |
| −299.00 | 100.00 | 900000.000000 | 510 | FIG. 6&4 | from FIG. 4, this is the pump inlet flow or bypass |
| −299.00 | 100.00 | 10892.152969 | 511 | FIG. 4&6 | liquid nitrogen to FIG. 6 feed to ASU |
| −299.00 | 100.00 | 10892.152969 | 511 | FIG. 6&4 | Liquid nitrogen from FIG. 4 to dump or return to asu |
| 0.00 | 0.00 | 0.000000 | 512 | FIG. 4 | liquid nitrogen to shell side of the 149 pump flash pot off of production = low flash |
| 0.00 | 0.00 | 0.000000 | 513 | FIG. 4 | liquid nitrogen to the shell side of the 147 oxygen production flash pot from production = low flash |
| 0.00 | 0.00 | 0.000000 | 514 | FIG. 4 | liquid nitrogen to the shell side of the 148 nitrogen production flash pot off of production = low flash |
| −310.00 | 90.00 | 554482.548954 | 515 | FIG. 4&6 | production liquid nitrogen to storage FIG. 6 |
| −310.00 | 90.00 | 554482.548954 | 515 | FIG. 6&4 | from FIG. 4, liquid nitrogen to storage or dump |
| −299.00 | 100.00 | 900000.000000 | 520 | FIG. 6 | valve inlet to pump 169 |
| −299.00 | 100.00 | 0.000000 | 521 | FIG. 6 | valve inlet to pump 170 |
| −299.00 | 100.00 | 0.000000 | 522 | FIG. 6 | pump bypass to 145 boiler FIG. 4 |
| −299.00 | 100.00 | 0.000000 | 523 | FIG. 6 | pump bypass to boiler check valve |

TABLE-continued

| Temperature (Fahrenheit) | Pressure (psig) | Flow (scfh) | Ref. No. | Location (Fig. No.) | Notes |
|---|---|---|---|---|---|
| −260.00 | 420.00 | 900000.000000 | 524 | FIG. 6 | outlet valve from pump 169 |
| 80.00 | 14.70 | 0.000000 | 525 | FIG. 6 | outlet valve from pump 170 |
| −260.00 | 420.00 | 900000.000000 | 526 | FIG. 6 | Pump 169 exit check valve |
| 80.00 | 14.70 | 0.000000 | 527 | FIG. 6 | Pump 170 exit check valve |
| −286.00 | 100.00 | 900000.000000 | 528 | FIG. 4&6 | pumped liquid nitrogen from FIG. 6 to the 145 boiler |
| −260.00 | 420.00 | 900000.000000 | 528 | FIG. 6&4 | liquid nitrogen to FIG. 4, for the 145 boiler |
| 0.00 | 0.00 | 0.000000 | 529 | FIG. 4&6 | pumped liquid nitrogen from FIG. 6 to the shell side of the 149 pump flash pot |
| −260.00 | 420.00 | 0.000000 | 529 | FIG. 6&4 | liquid nitrogen to pump flash pot 149 FIG. 4 |
| −286.00 | 90.00 | 0.000000 | 530 | FIG. 4 | Pumped liquid nitrogen inlet of the shell side of the 149 pump flash pot = high flash off. |
| 80.00 | 14.70 | 0.000000 | 535 | FIG. 6 | last purge point before inlet to nitrogen storage |
| 80.00 | 14.70 | 0.000000 | 536 | FIG. 6 | last purge valve |
| −310.00 | 90.00 | 554482.548954 | 537 | FIG. 6 | storage entry valve |
| −310.00 | 15.70 | 500.000000 | 538 | FIG. 6 | storage tank vent valve |
| 80.00 | 14.70 | 0.000000 | 539 | FIG. 6 | NITROGEN TANK PUMP BACK |
| 80.00 | 14.70 | 0.000000 | 540 | FIG. 6 | PUMP BACK VALVE |
| 80.00 | 14.70 | 0.000000 | 541 | FIG. 6 | PUMP BACK CHECK VALVE |
| −299.00 | 14.70 | 0.000000 | 542 | FIG. 6 | LIQUIFER NITROGEN TO DUMP |
| −299.00 | 100.00 | 10892.152969 | 543 | FIG. 6 | LIQUIFER NITROGEN TO ASU |
| −299.00 | 100.00 | 10892.152969 | 544 | FIG. 1&6 | from FIG. 6, liquid nitrogen from liquifer return flow to asu |
| −299.00 | 100.00 | 10892.152969 | 544 | FIG. 6&1 | to FIG. 1 liquid nitrogen return to ASU |
| −314.00 | 59.00 | 8547.152969 | 545 | FIG. 1&2 | CROSS OVER POINT 545 TO FIG. 4 (psia) |
| −314.00 | 59.00 | 8547.152969 | 545 | FIG. 2&1 | Liquid nitrogen from FIG. 1 to 126 and 131. |
| −314.00 | 35.00 | 747.152969 | 546 | FIG. 2 | liquid nitrogen after level control valve to 126 |
| −310.00 | 22.00 | 7800.000000 | 547 | FIG. 2 | Liquid nitrogen after level control valve to 131 |
| −314.00 | 59.00 | 2345.000000 | 548 | FIG. 1 | FIG. #1 part of the liquefier feed back to the plant before the control valve (psia) |
| −317.40 | 17.31 | 2345.000000 | 549 | FIG. 1 | liquid nitrogen from liquefier after control valve (psia) |
| −308.00 | 35.00 | 747.152969 | 555 | FIG. 2 | gas nitrogen off of the 126 to a pressure control valve |
| −310.00 | 22.00 | 7800.000000 | 556 | FIG. 2 | gas nitrogen off of the 131 to a pressure control valve |
| −315.00 | 17.80 | 8547.152969 | 557 | FIG. 2 | gas from 126 and 131 after the pressure control valves |
| −315.00 | 17.80 | 8547.152969 | 558 | FIG. 1 | gas nitrogen from the pure argon system, cross over from FIG. 4 (psia) |

TABLE-continued

| Temperature (Fahrenheit) | Pressure (psig) | Flow (scfh) | Ref. No. | Location (Fig. No.) | Notes |
|---|---|---|---|---|---|
| −315.00 | 17.80 | 8547.152969 | 558 | FIG. 2&1 | gas nitrogen to FIG. 1 |
| −280.00 | 80.00 | 873000.000000 | 450 − (452 + 453 + 454 + 451) | ref | turbine exhaust gas from 450 after 151 to 146 condenser |
| −316.00 | 18.00 | 7000.000000 | 459 + 451 | ref | low pressure cool nitrogen to condenser from 459 + 451 |
| ref | ref | 20000.000000 | 460 + 459 | ref | 460 + 459 cold gas nitrogen to added cooling heat exchanger |
| 90.00 | 65.52 | 398,184.701923 | ref | ref | flow not taken by surge controller 281, now to 283 |
| −255.00 | 17.00 | 27000.000000 | ref | ref | combined low pressure nitrogen gas to boiler |
| 90.00 | 41.32 | 398,184.701923 | REF | REF | flow not taken by surge controller 278, now to 280 |
| −245.00 | 80.00 | 873000.000000 | ref | ref | combined high pressure nitrogen gas to boiler |
| ref | ref | 900000.000000 | ref | ref | cold nitrogen gas to the condenser 146 |
| | | | 1000 | FIG. 9 | exit point from warmer 1100 to FIG. 10 |
| | | | 1001 | FIG. 9 | exit point from turbine phase separator 1001 |
| | | | 1002 | FIG. 9 | branch point to condenser 1400 cold side |
| | | | 1005 | FIG. 9 | auto temperature controller valve in branch from point 1025 |
| | | | 1014 | FIG. 9 | valve in line to flash pot 148 |
| | | | 1015 | FIG. 9 | auto control valve in line to flash pot 148 |
| | | | 1016 | FIG. 9 | valve in line from flash pot 148 to FIG. 6, point 515 |
| | | | 1017 | FIG. 9 | valve in line from flash pot 1018 to FIG. 6, point 515 |
| | | | 1018 | FIG. 9 | load control flash pot |
| | | | 1019 | FIG. 9 | venting valve in line from flash pot 1018 to low pressure nitrogen gas line |
| | | | 1020 | FIG. 9 | valve in line to shell side of flash pot 1018 |
| | | | 1021 | FIG. 9 | venting valve in line from flash pot 149 to low pressure nitrogen gas line |
| | | | 1022 | FIG. 9 | valve in line exiting turbine phase separator to flash pot 149 |
| | | | 1024 | FIG. 9 | cool gas nitrogen stream to point 1024, FIG. 10 inlet to turbine expanders |
| | | | 1025 | FIG. 9 | point exit cold side of warmer 1100 from FIG. 10, point 500 |
| | | | 1030 | FIG. 9 | pressure sensor boiler 1300 |
| | | | 1031 | FIG. 9 | level controller boiler 1300 |
| | | | 1032 | FIG. 9 | temperature sensor boiler 1300 |
| | | | 1040 | FIG. 9 | pressure sensor turbine phase separator 151 |
| | | | 1041 | FIG. 9 | level controller turbine phase separator 151 |
| | | | 1042 | FIG. 9 | liquid level sensor in flash pot 149 |

TABLE-continued

| Temperature (Fahrenheit) | Pressure (psig) | Flow (scfh) | Ref. No. | Location (Fig. No.) | Notes |
|---|---|---|---|---|---|
| | | | 1043 | FIG. 9 | liquid level sensor in flash pot 147 |
| | | | 1044 | FIG. 9 | liquid level sensor in flash pot 148 |
| | | | 1045 | FIG. 9 | liquid level sensor in flash pot 1018 |
| | | | 1046 | FIG. 9 | temperature sensor in line from exit of flash pot 1018 |
| | | | 1047 | FIG. 9 | temperature sensor in line from exit of flash pot 148 |
| | | | 1048 | FIG. 9 | temperature monitor shell side pump flash pot 149 |
| | | | 1050 | FIG. 9 | temperature sensor in line from exit of flash pot 147 |
| | | | 1100 | FIG. 9 | Five pass heat exchanger called the warmer |
| | | | 1200 | FIG. 9 | Six pass heat exchanger called the pre heater |
| | | | 1300 | FIG. 9 | Six pass heat exchanger called the boiler |
| | | | 1400 | FIG. 9 | Five pass heat exchanger called the condenser |
| | | | 1500 | FIG. 9 | Five pass heat exchanger called the added cooling heat exchanger |

The liquefier presented herein will boil liquid nitrogen to generate running gas pressures for the turbines. The liquefier is designed to work with an air separation plant, running at a stable state. The air separation plant will supply a steady stream of gaseous nitrogen and oxygen from the main heat exchanger warm end. Then, from the new liquefier, a stream of sub cooled liquid nitrogen and liquid oxygen will be sent to storage, along with a small amount of liquid nitrogen that will be returned to the air separation plant to make liquid oxygen in the low pressure column, and liquid argon both to storage. The air separation plant will be running at a reduced pressure due to the low pressure column's lower pressure. The air separation plant will be running on a maximum oxygen gas removal mode. The air separation plant, with a MAC flow like shown above, and this presented liquefier will produce liquid argon, and 2,000 SCFH oxygen liquid needed to keep the hydrocarbons under 5% and remove all the krypton and xenon solids that would normally build up in the low pressure column's reboiler and be cleaned up in the oxygen filters. The plant can run a lower pressure by having almost all the oxygen removed as a gas, then oxygen gas will be liquefied in this invention, then put to storage as sellable product. The liquefaction of the oxygen gas from the low pressure column, that is not needed for a pipeline gas customer can then take place in the present liquefier. All the gas nitrogen that is not needed for a pipeline customer can be liquefied in the present liquefier.

The presented liquefier will produce sellable liquid for less cost than what is being used today. The compressing of gas to a pressure needed to make liquid costs a lot of money. The temperature of the liquids to storage can be adjusted to meet the storage tank positive pressure requirements. The sub cooler in the distillation cold box has no control passed original design for reducing the liquid oxygen to storage temperature. This invention gives the control. The oxygen filter system can be used on any plant making liquid oxygen. This will produce liquid oxygen with less contamination. This liquefier can be placed at the end of a long pipeline to liquid at remote location. This will reduce shipping cost and reduce truck traffic around the main plant. This liquefier can also be placed on-board a ship moving liquefied natural gas. This will keep the liquid cold to stop the venting.

While the present invention has been described at some length and with considerable particularity with respect to the several described embodiments and particularly with respect to the particular and principal intended embodiment, it is not intended that it should be limited to any such particulars or embodiments or any particular preferred embodiment but is to be construed with reference to the particular appended claims so as to provide the broadest possible interpretation of such claims in view of the prior art and, therefore, to effectively encompass the effective and intended scope of the invention with respect both to apparatus for practicing the invention and to methods of performing and practicing the invention. As used throughout, ranges are used as shorthand for describing each and every value that is within the range. Any value within the range can be selected as the terminus of the range.

What is claimed is:

1. A liquefier device for producing liquid oxygen and liquid nitrogen comprising:
    a plurality of multi pass counter-current flow heat exchangers including a warmer, a pre-heater, a condenser, and an added cooler;
    a plurality of shell and tube heat exchangers including; a boiler, an oxygen production flash pot, a nitrogen production flash pot, a load control flash pot, and a pump flash pot, wherein a shell side of each of the shell and tube heat exchangers holds a nitrogen bath;
    a turbine assembly including a plurality of turbine expanders connected in parallel and exiting to a common header, and a plurality of turbine boosters connected in series, each of the turbine boosters having an associated aftercooler;

the warmer, pre-heater, boiler, and condenser configured to receive and cool an oxygen gas flow supplied from an oxygen gas inlet line and directing the cooled oxygen gas flow into a tube side of the oxygen production flash pot to produce subcooled liquid oxygen;

a first of the turbine boosters connected in series configured to receive a flow of gas nitrogen to be increased in pressure and supplied from a low pressure nitrogen gas inlet line and another line containing nitrogen gas exiting the shell side of one or more of the oxygen production flash pot, nitrogen production flash pot, load control flash pot, and pump flash pot after being increased in temperature in the multi-pass counter current flow heat exchangers;

the multi-pass counter-current flow heat exchangers and boiler also configured to cool a combined flow of gas nitrogen supplied from a high pressure nitrogen gas inlet line and a return flow of equal pressure gas nitrogen in a line connecting from an exit of a second to last of the turbine booster aftercoolers, the combined flow of gas nitrogen then being fed into a tube side of the nitrogen production flash pot to produce subcooled liquid nitrogen;

the multi-pass counter current flow heat exchangers and boiler also configured to cool a nitrogen gas flow in a line exiting the aftercooler associated with last turbine booster connected in series and then feed the cooled nitrogen gas flow into a tube side of the pump flash pot to produce subcooled liquid nitrogen, at least some of which is then brought up in pressure and directed into the shell side of the boiler at an inlet temperature of within ±5° F. of a boiler running temperature and is boiled to a vapor pressure point, and then is directed into the pre-heater to produce a nitrogen gas stream having a temperature and a pressure to run the turbine expanders;

a pressure drop pipeline containing a nitrogen exit flow from the turbine expanders having an exit temperature close to a liquid phase connecting to an inlet to a phase separator in which nitrogen gas and liquid nitrogen droplets in the nitrogen exit flow are separated, and a flow of gas nitrogen off of the phase separator is directed in either a first branch line connecting sequentially through the condenser, boiler, pre heater, and warmer and then connecting to the turbine boosters connected in series between an exit of the second to last turbine booster aftercooler and inlet to the last turbine booster, or in a second branch line connecting to a tube side of the load control flash pot to produce subcooled liquid nitrogen; and another exit line from the phase separator connected to direct separated liquid nitrogen through the added cooler to the shell side of the pump flash pot, or into another line including an overflow valve and connecting to the second branch line from the phase separator.

2. The liquefier device of claim 1, wherein the turbine assembly includes four turbine expanders connected in parallel and four turbine boosters connected in series.

3. The liquefier device of claim 1, wherein the subcooled liquid oxygen produced by the oxygen production flash pot is directed to an oxygen filter house and joins a separate flow of liquid oxygen filtered by the oxygen filter house prior to storage.

4. The liquefier device of claim 1, wherein the return flow of gas nitrogen from the second to last turbine booster aftercooler exit will reduce a work load of the last turbine booster connected in series and a work load of the turbine expanders.

5. The liquefier device of claim 1, wherein a volume of liquid nitrogen droplets formed in the pressure drop pipeline can exceed 200 gallons per hour.

6. The liquefier device of claim 1, wherein a line connecting between the second to last turbine booster aftercooler exit and the last turbine booster inlet further comprises a pressure zone having a variable pressure due to ambient temperature changes.

7. The liquefier device of claim 6, wherein as the variable pressure in the pressure zone increases, increased condensing in the load control flash pot will cause the flow of gas nitrogen off of the phase separator in the second branch line connecting to the tube side of the load control flash pot to increase, increasing production of the subcooled liquid nitrogen.

8. The liquefier device of claim 1, wherein the subcooled liquid nitrogen exiting the nitrogen production flash pot and the load control flash pot is joined in a line to a low pressure liquid nitrogen storage tank.

9. The liquefier device of claim 1 further comprising a temperature sensor in a line directing liquid nitrogen into the shell side of the boiler, the boiler having a liquid nitrogen level sensor and a temperature sensor configured for controlling a flow of the liquid nitrogen into the shell side of the boiler, and a pressure sensor on the boiler for monitoring the pressure of the nitrogen gas stream exiting the boiler to a pass of the pre-heater to an inlet to the turbine expanders.

10. The liquefier device of claim 1, wherein the flow of gas nitrogen supplied from the high pressure nitrogen gas inlet line enters the liquefier device at a temperature below an ambient temperature and the return flow of equal pressure gas nitrogen exits the second to last turbine booster aftercooler at above the ambient temperature.

11. The liquefier device of claim 1 further comprising a pressure control valve for controlling a pressure of the combined flow of gas nitrogen from the high pressure nitrogen gas inlet line and the return flow of equal pressure gas nitrogen from the next to last turbine booster aftercooler exit into the warmer, wherein the combined flow of gas nitrogen will have a lower pressure after passing through the pressure control valve as a result of condensing of the combined flow of gas nitrogen in the nitrogen production flash pot.

12. The liquefier device of claim 1, wherein the turbine expanders are coupled to the turbine boosters such that a speed of the turbine expanders is controlled by the turbine boosters.

13. The liquefier device of claim 1, wherein the nitrogen exit flow from the turbine expanders is at a temperature a degree Fahrenheit or two from a condensing temperature and experiencing a pressure drop and turbulence with liquid condensation inside the pressure drop pipeline forming the liquid nitrogen droplets, the phase separator configured to separate the liquid nitrogen droplets from the nitrogen exit flow which fall to a bottom of the phase separator.

* * * * *